(12) United States Patent
Olkkonen et al.

(10) Patent No.: US 7,590,086 B2
(45) Date of Patent: Sep. 15, 2009

(54) AD HOC NETWORK DISCOVERY MENU

(75) Inventors: Mikko Olkkonen, Kirkkonummi (FI); Kai Nyman, Espoo (FI); Stephane Bouet, Tokyo-To (JP)

(73) Assignee: Nokia Corporation, Espoo (FI)

( * ) Notice: Subject to any disclaimer, the term of this patent is extended or adjusted under 35 U.S.C. 154(b) by 870 days.

(21) Appl. No.: 10/979,253

(22) Filed: Nov. 3, 2004

(65) Prior Publication Data

US 2005/0088980 A1 Apr. 28, 2005

Related U.S. Application Data

(63) Continuation of application No. 09/891,382, filed on Jun. 27, 2001, now Pat. No. 6,842,460.

(51) Int. Cl.
*H04W 4/00* (2009.01)
(52) U.S. Cl. ........................ 370/328; 370/389; 455/41.2
(58) Field of Classification Search ........................ None
See application file for complete search history.

(56) References Cited

U.S. PATENT DOCUMENTS

| | | | |
|---|---|---|---|
| 5,822,309 A | 10/1998 | Ayanoglu et al. | |
| 6,104,712 A | 8/2000 | Robert et al. | |
| 6,134,587 A | 10/2000 | Okanoue | |
| 6,304,556 B1 | 10/2001 | Haas | |
| 6,411,815 B1 | 6/2002 | Balasuriya | |
| 6,459,894 B1 | 10/2002 | Phillips et al. | |
| 6,532,368 B1 | 3/2003 | Hild et al. | |
| 6,587,835 B1 | 7/2003 | Treyz et al. | |
| 6,611,259 B1 | 8/2003 | Tillgren et al. | |
| 6,614,350 B1 | 9/2003 | Lunsford et al. | |
| 6,654,720 B1 * | 11/2003 | Graham et al. | ............... 704/270 |
| 6,792,467 B2 * | 9/2004 | Hale et al. | ................... 709/229 |

(Continued)

FOREIGN PATENT DOCUMENTS

WO WO 01/37497 5/2001

OTHER PUBLICATIONS

Miller et al, "Bluetooth Revealed", 2001 Prentice Hall PTR; pp. 164-176 and 217-222.

*Primary Examiner*—Jayanti K Patel
*Assistant Examiner*—Jung Park
(74) *Attorney, Agent, or Firm*—Locke Lord Bissell & Liddell LLP

(57) ABSTRACT

When an ad hoc network is formed between short range wireless devices, at least one device assumes the role of an ad hoc network information provider for the new piconet. In this role, the device allocates a browsing hierarchy of service classes in its service registry. The service classes will provide a record to characterize the ad hoc network. When a new wireless device arrives within the communication range of any member of the ad hoc network, its inquiry signals are answered by the first member detecting the inquiry. If that first member is an ad hoc network information provider, it responds with information accessed from its service registry characterizing the ad hoc network. If, instead, an ordinary device in the ad hoc network is the first to respond to the inquiry signals of the arriving device, the device responds with the address of the ad hoc network information provider. The arriving device then pages the ad hoc network information provider to obtain information characterizing the ad hoc network.

40 Claims, 42 Drawing Sheets

U.S. PATENT DOCUMENTS

| | | | | |
|---|---|---|---|---|
| 6,885,643 | B1* | 4/2005 | Teramoto et al. | 370/252 |
| 7,120,129 | B2* | 10/2006 | Ayyagari et al. | 370/255 |
| 7,164,885 | B2* | 1/2007 | Jonsson et al. | 455/41.2 |
| 7,243,356 | B1* | 7/2007 | Saulpaugh et al. | 719/330 |
| 2002/0012329 | A1* | 1/2002 | Atkinson et al. | 370/330 |
| 2002/0068604 | A1* | 6/2002 | Prabhakar et al. | 455/556 |
| 2002/0160712 | A1* | 10/2002 | Mooney | 455/41 |
| 2002/0163928 | A1* | 11/2002 | Rudnick et al. | 370/444 |
| 2002/0176366 | A1 | 11/2002 | Ayyagari et al. | |
| 2002/0184299 | A1* | 12/2002 | Chou et al. | 709/202 |

* cited by examiner

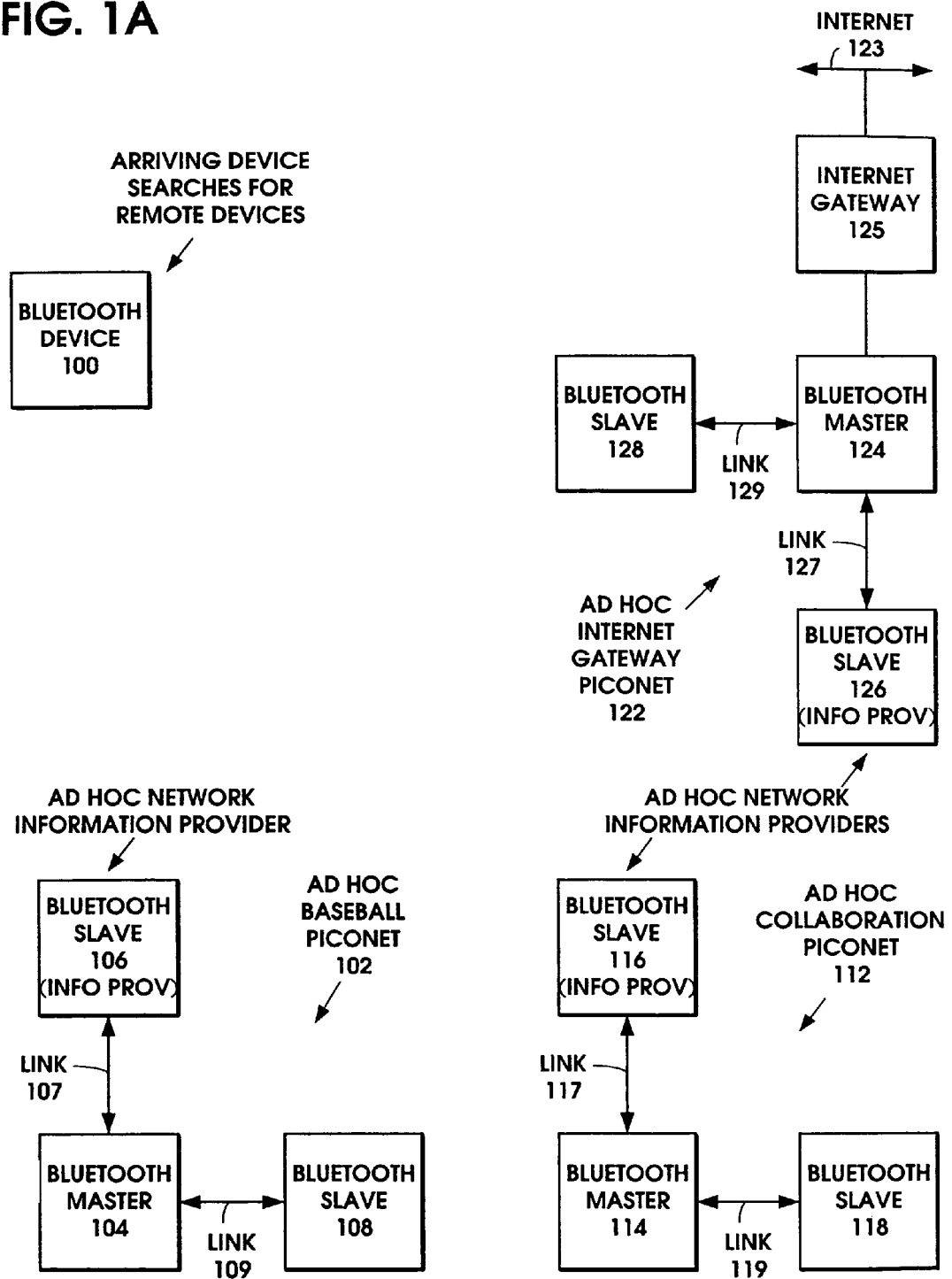

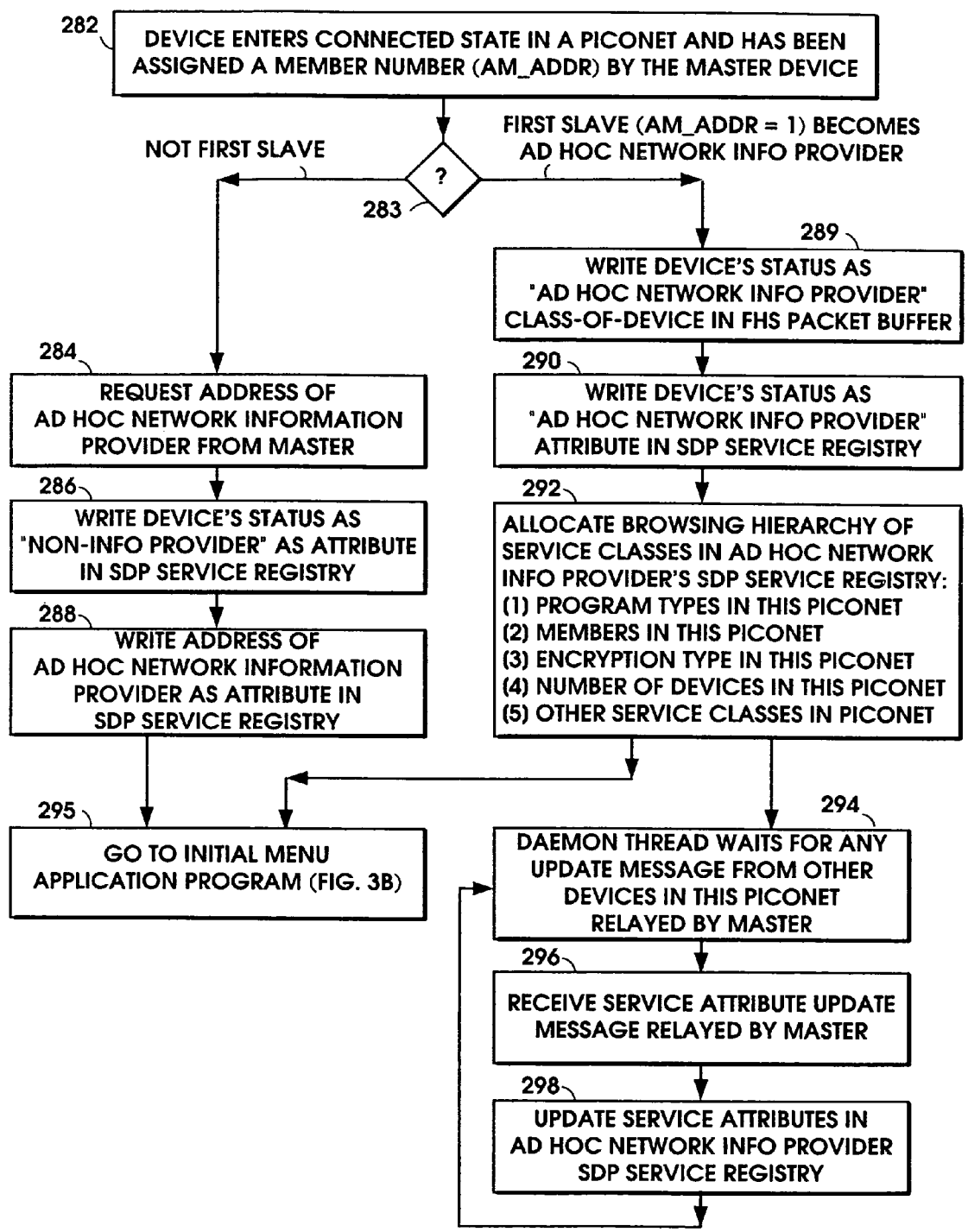
FIG. 3A CREATE REGISTRY FOR NEW MEMBER OF PICONET PROGRAM 280

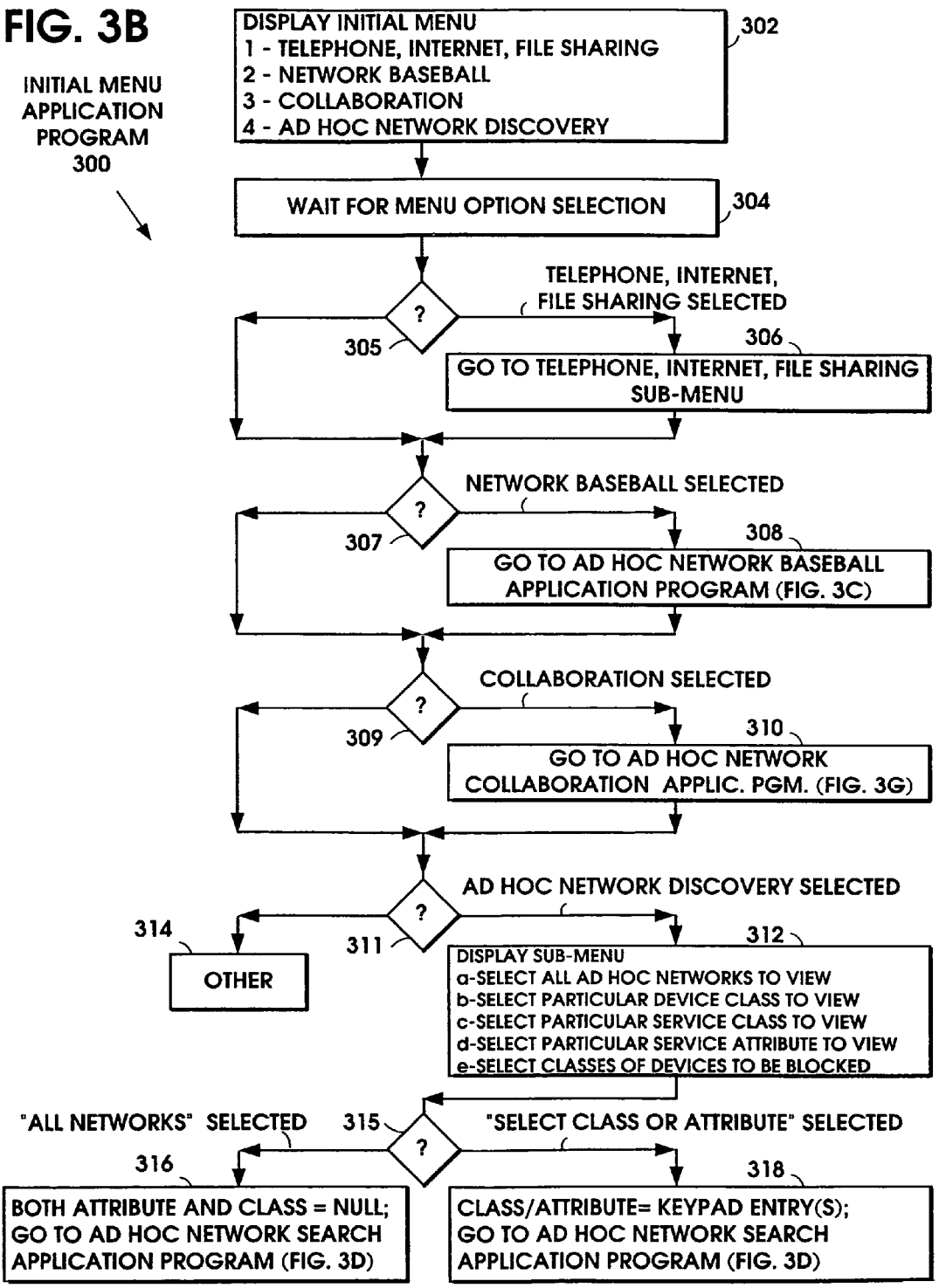

FIG. 3E

SERVICE RECORD
UPDATE
(APPLIC. PGM)
330

SERVICE RECORD UPDATE ROUTINE

SET VALUES FROM LOCAL AD HOC NETWORK APPLICATION PROGRAM
ServiceRecordHandle = HANDLE_UUID
ServiceClass = "NETWORK_SERVICE"
ProtocolDescriptorList = PROTOCOLS
AttributeIdentifier1 = ATTRIBUTE_ID_1
AttributeType1 = "STRING"
AttributeSize1 = SIZE
AttributeData1 = STRING_DATA
AttributeIdentifier2 = ATTRIBUTE_ID_2
AttributeType2 = "INTEGER"
AttributeSize2 = SIZE
AttributeData2 = PICONET_ACCESS_CODE WRITE UPDATED SERVICE RECORD TO LOCAL SDP SERVICE REGISTRY AS
ServiceRecordHandle / ServiceClass / ProtocolDescriptorList /
AttributeIdentifier1 / AttributeType1 / AttributeSize1 / AttributeData1 /
AttributeIdentifier2 / AttributeType2 / AttributeSize2 / AttributeData2

RETURN

BEGIN NETWORK DISCOVERY MENU APPLICATION IN ARRIVING DEVICE

DISPLAY NETWORK DISCOVERY MENU
OPTION      STRING
1           "BASEBALL CUBS VS. METS 3RD INNING SCORE 2 TO 2"
2           "CAD COLLABORATION NEED HELP DESIGNING BRIDGE TRUSS"
3           "INDIVIDUALS CONNECTED TO INTERNET GATEWAY DEVICE"
WAIT FOR SELECTION
IF OPTION = 1 THEN
SEND PAGE TO AD HOC BASEBALL PICONET MASTER DEVICE
      USING AD HOC BASEBALL PICONET_ACCESS_CODE
RECEIVE ID PACKET FROM AD HOC BASEBALL MASTER DEVICE
      WHICH ASSUMES TEMPORARY ROLE AS REMOTE SLAVE
      TO ARRIVING DEVICE WHICH ASSUMES TEMPORARY ROLE AS
      MASTER IN A TEMPORARY NEW PICONET
SET UP LINK BETWEEN ARRIVING DEVICE AND REMOTE DEVICE
REQUEST BY ARRIVING DEVICE TO SWITCH MASTER/SLAVE ROLES
ARRIVING DEVICE BECOMES SLAVE AND REMOTE DEVICE RESUMES
      MASTER ROLE IN AD HOC BASEBALL PICONET

ELSE IF OPTION = 2 THEN
SEND PAGE TO AD HOC COLLABORATION PICONET MASTER DEVICE
      USING AD HOC COLLABORATION PICONET_ACCESS_CODE
RECEIVE ID PACKET FROM AD HOC COLLABORATION MASTER
SET UP LINK BETWEEN ARRIVING DEVICE AND REMOTE DEVICE
REQUEST BY ARRIVING DEVICE TO SWITCH MASTER/SLAVE ROLES
ARRIVING DEVICE BECOMES SLAVE AND REMOTE DEVICE RESUMES
      MASTER ROLE IN AD HOC COLLABORATION PICONET

ELSE IF OPTION = 3 THEN
SEND PAGE TO AD HOC INTERNET GATEWAY PICONET MASTER DEVICE
      USING AD HOC INTERNET GATEWAY PICONET_ACCESS_CODE
RECEIVE ID PACKET FROM AD HOC INTERNET GATEWAY MASTER
SET UP LINK BETWEEN ARRIVING DEVICE AND REMOTE DEVICE
REQUEST BY ARRIVING DEVICE TO SWITCH MASTER/SLAVE ROLES
ARRIVING DEVICE BECOMES SLAVE AND REMOTE DEVICE RESUMES
MASTER ROLE IN AD HOC INTERNET GATEWAY PICONET

ELSE RETURN
```

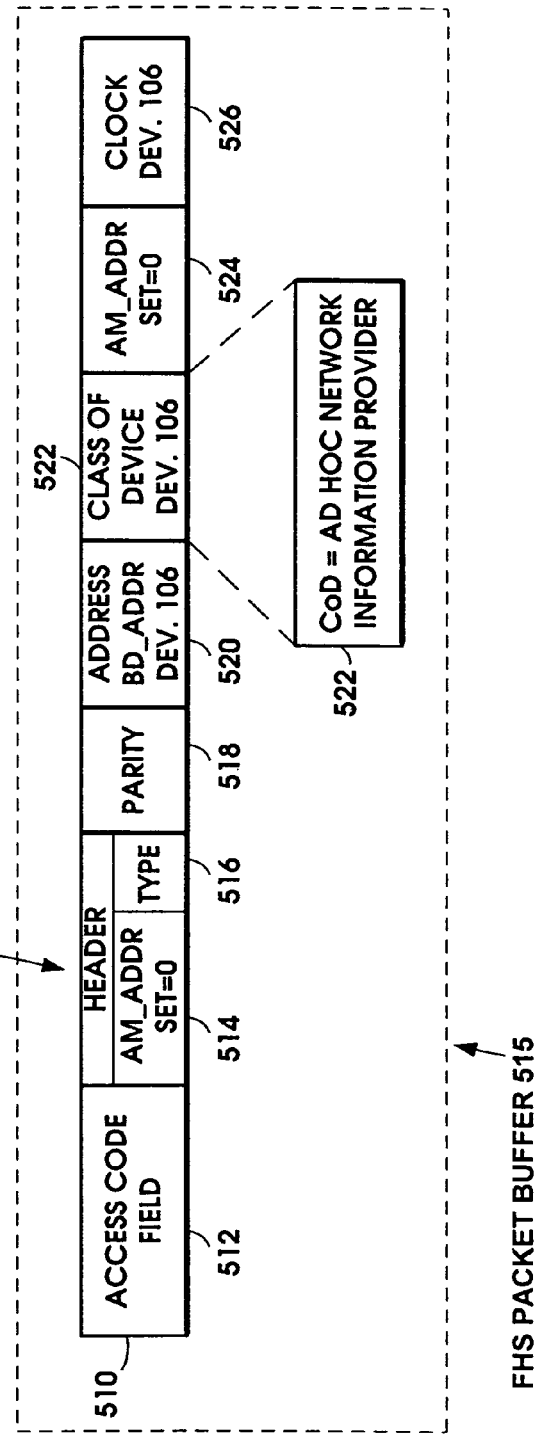

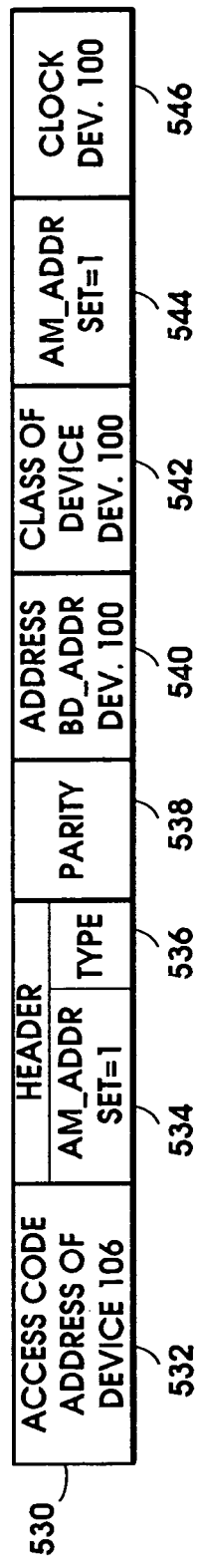
FIG. 4C BLUETOOTH PACKET STRUCTURE FOR A PAGING PACKET SENT BY ARRIVING DEVICE 100
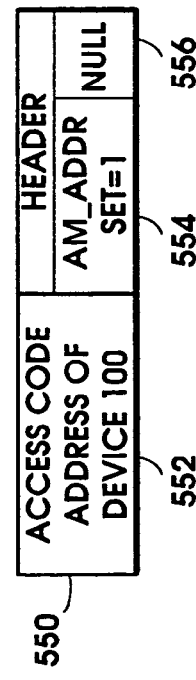
FIG. 4D BLUETOOTH PACKET STRUCTURE FOR A PAGE ACKNOWLEDGEMENT PACKET SENT BY AD HOC NETWORK INFORMATION PROVIDER 106

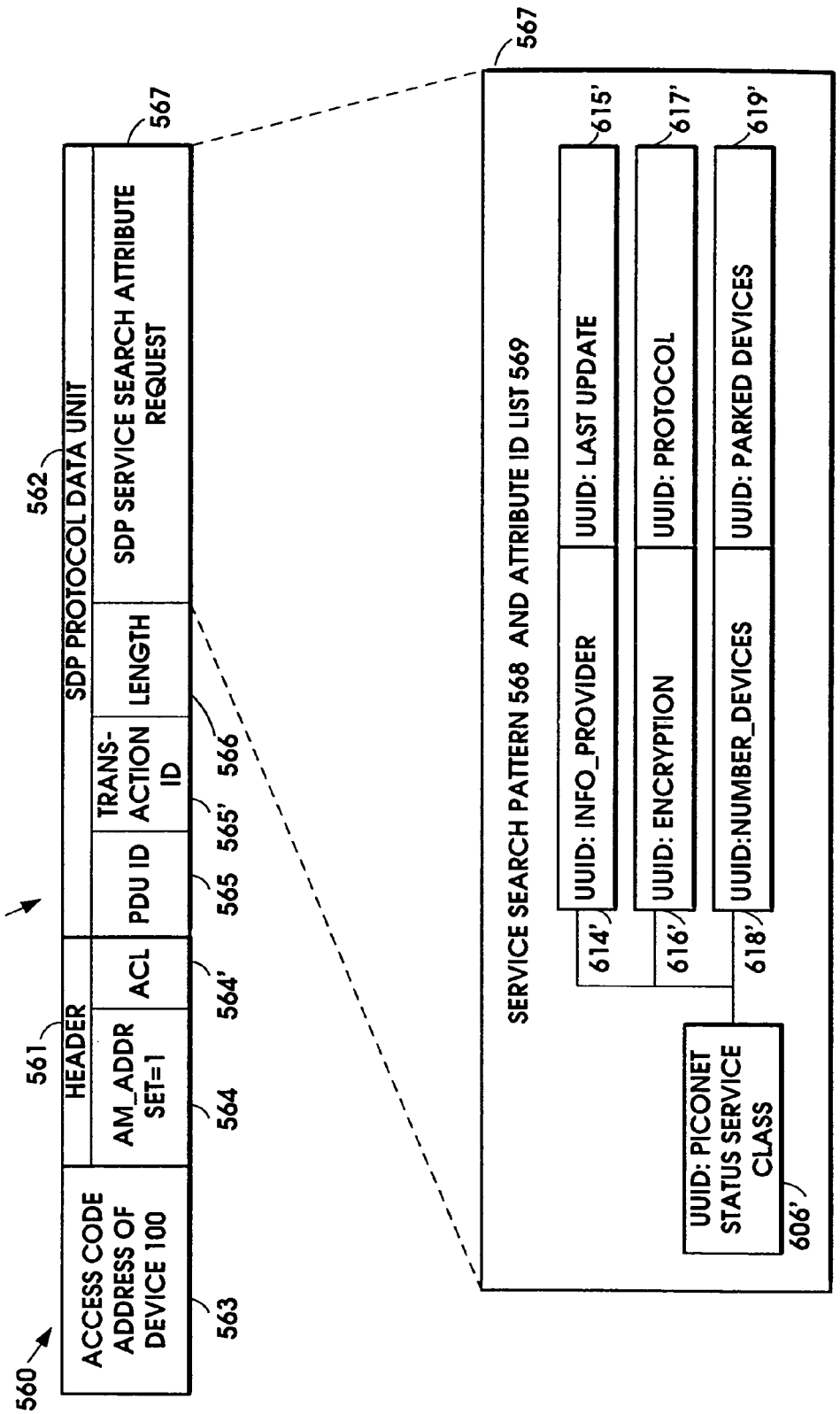

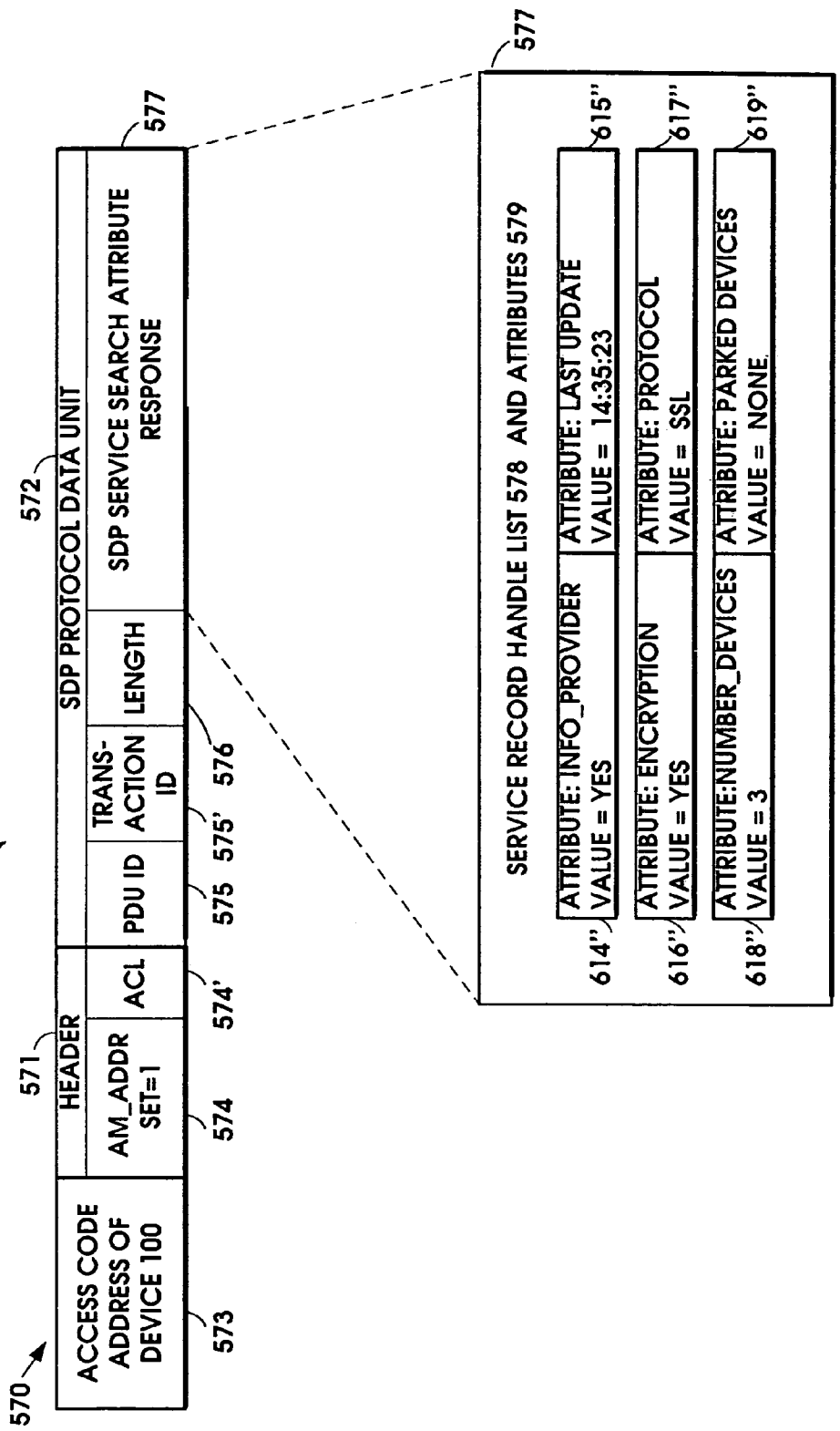
FIG. 4F  BLUETOOTH PACKET STRUCTURE FOR RESPONSE TO SDP SERVICE SEARCH ATTRIBUTE REQUEST, RESPONSE SENT BY AD HOC NETWORK INFORMATION PROVIDER 106 TO ARRIVING DEVICE 100

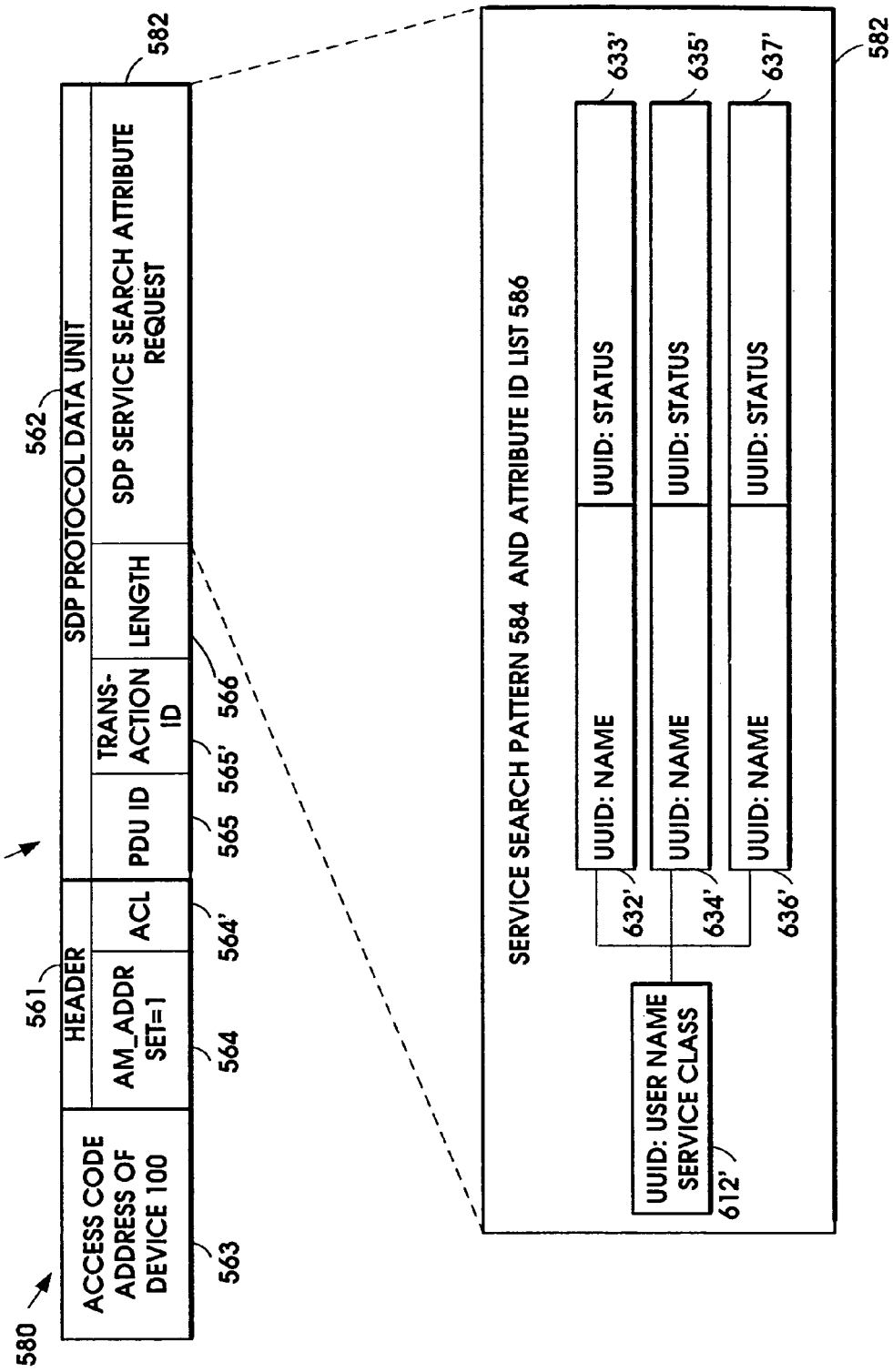
FIG. 4G  BLUETOOTH PACKET STRUCTURE FOR SDP SERVICE SEARCH ATTRIBUTE REQUEST PACKET SENT BY ARRIVING DEVICE 100 TO AD HOC NETWORK INFORMATION PROVIDER 106

BLUETOOTH PACKET STRUCTURE FOR RESPONSE TO SDP SERVICE SEARCH ATTRIBUTE REQUEST, RESPONSE SENT BY AD HOC NETWORK INFORMATION PROVIDER 106 TO ARRIVING DEVICE 100

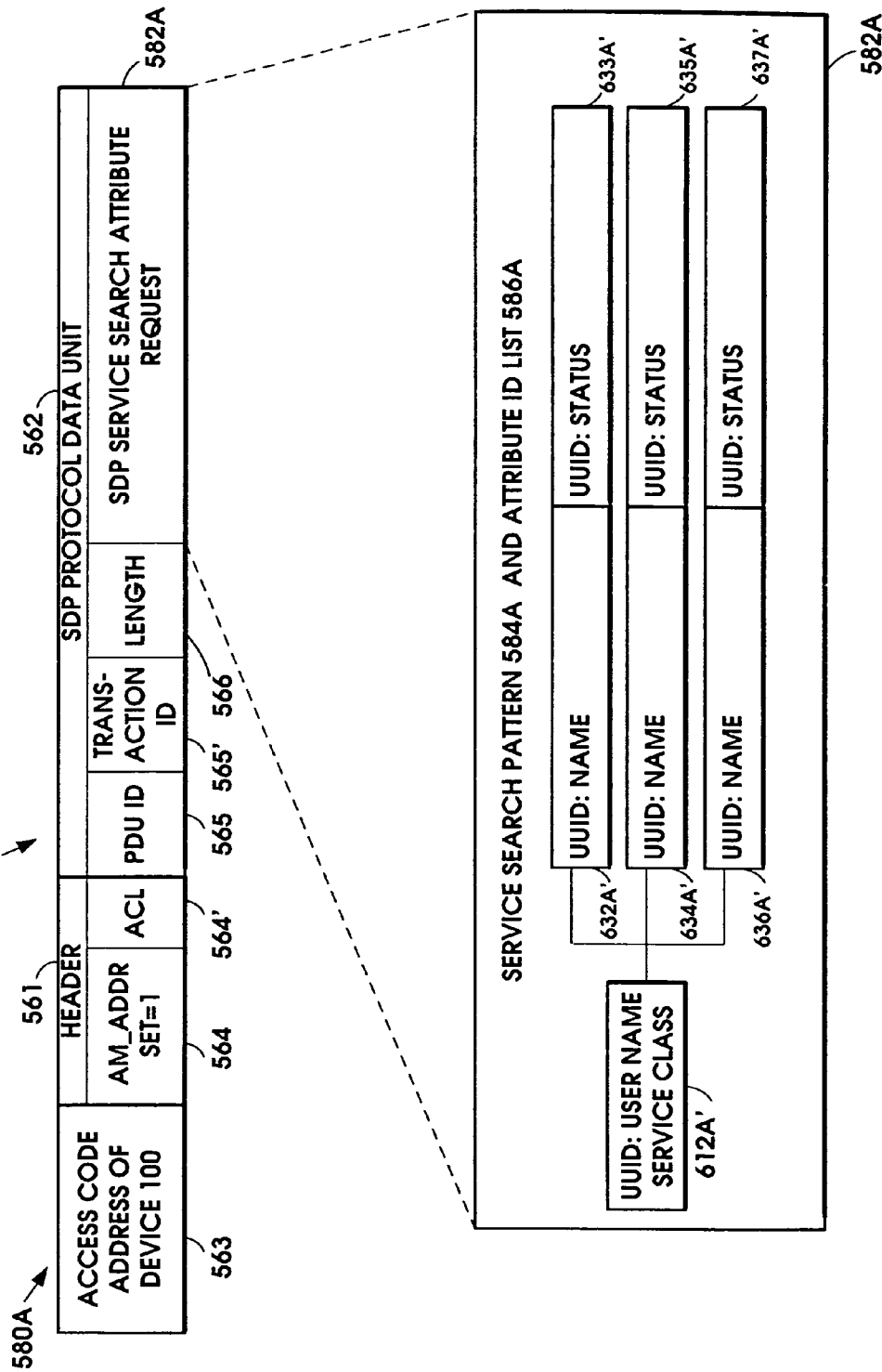

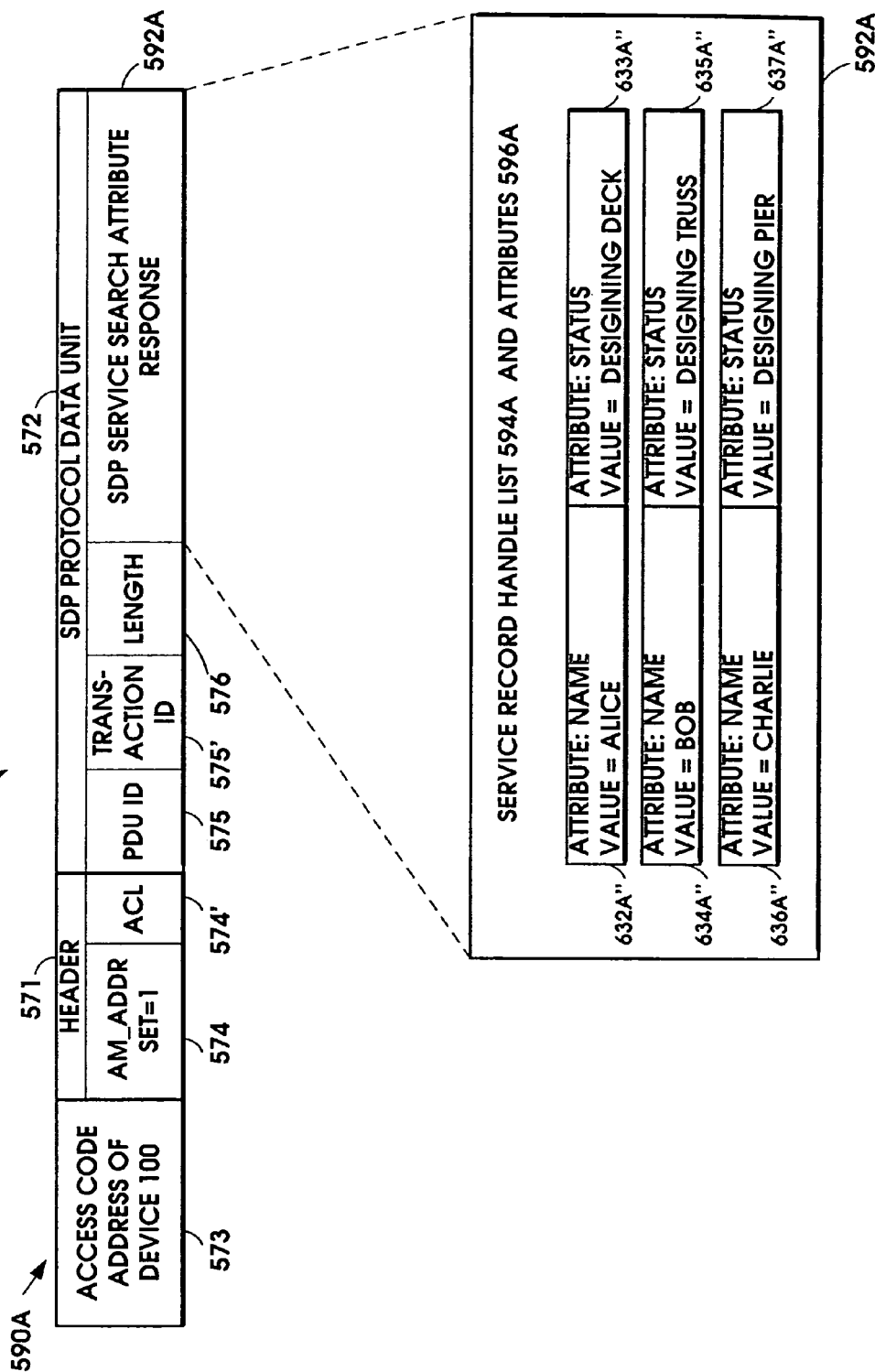

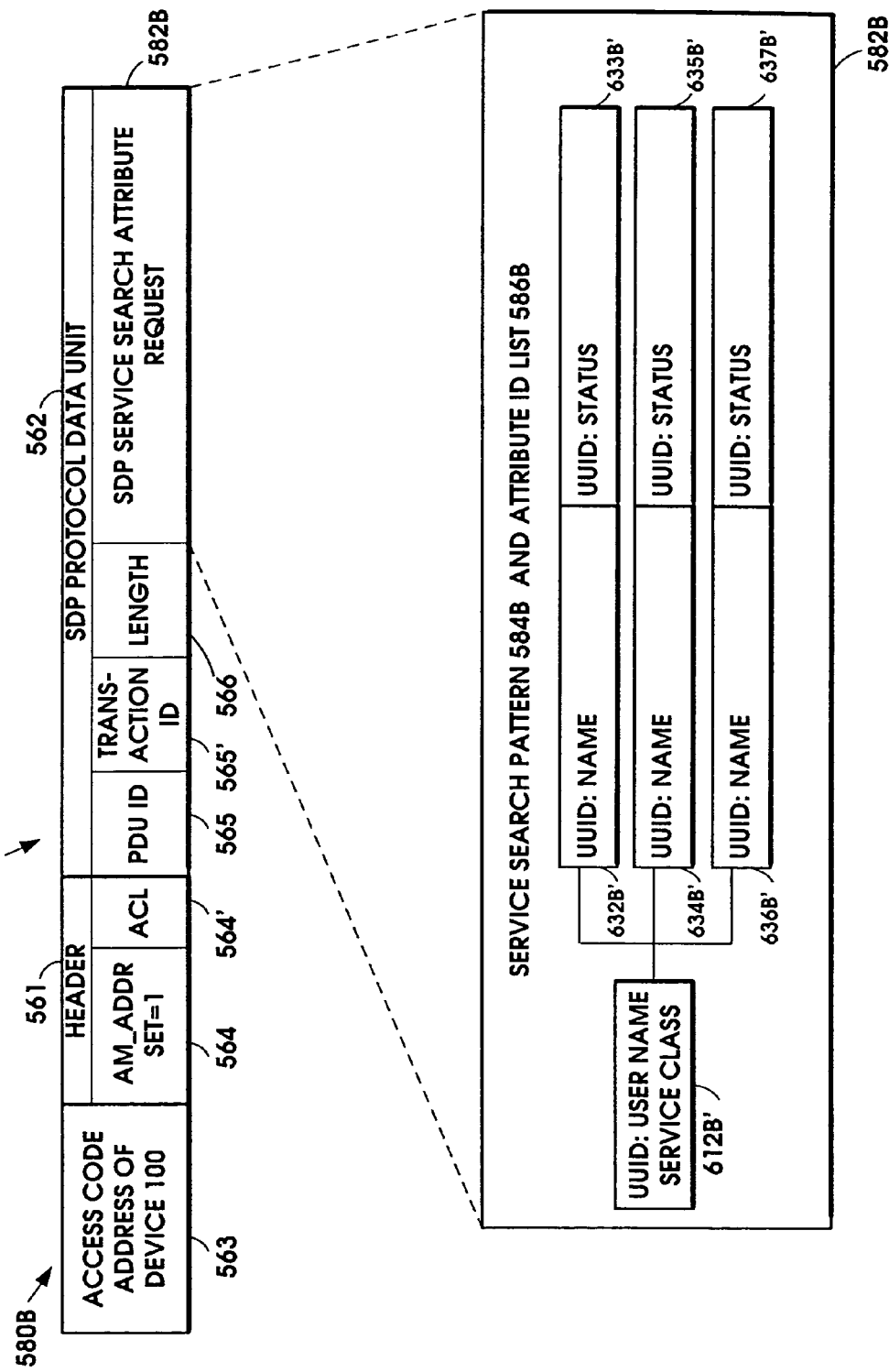
FIG. 4K  BLUETOOTH PACKET STRUCTURE FOR SDP SERVICE SEARCH ATTRIBUTE REQUEST PACKET SENT BY ARRIVING DEVICE 100 TO AD HOC NETWORK INFORMATION PROVIDER 126

BLUETOOTH PACKET STRUCTURE FOR RESPONSE TO
SDP SERVICE SEARCH ATTRIBUTE REQUEST,
RESPONSE SENT BY AD HOC NETWORK INFORMATION PROVIDER 126
TO ARRIVING DEVICE 100

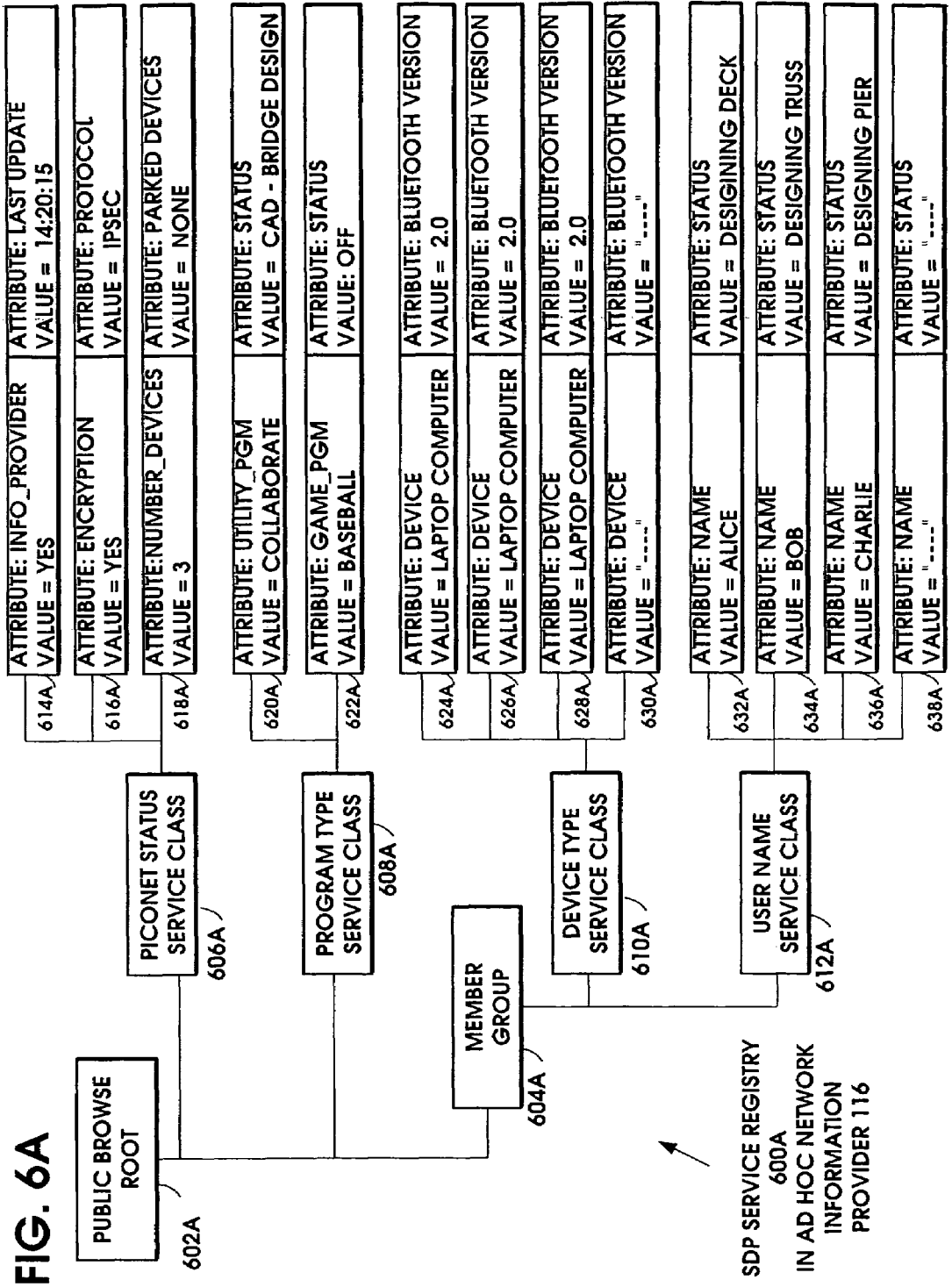
FIG. 6A  SDP SERVICE REGISTRY 600A IN AD HOC NETWORK INFORMATION PROVIDER 116

SDP SERVICE REGISTRY 600B
IN AD HOC NETWORK
INFORMATION
PROVIDER 126

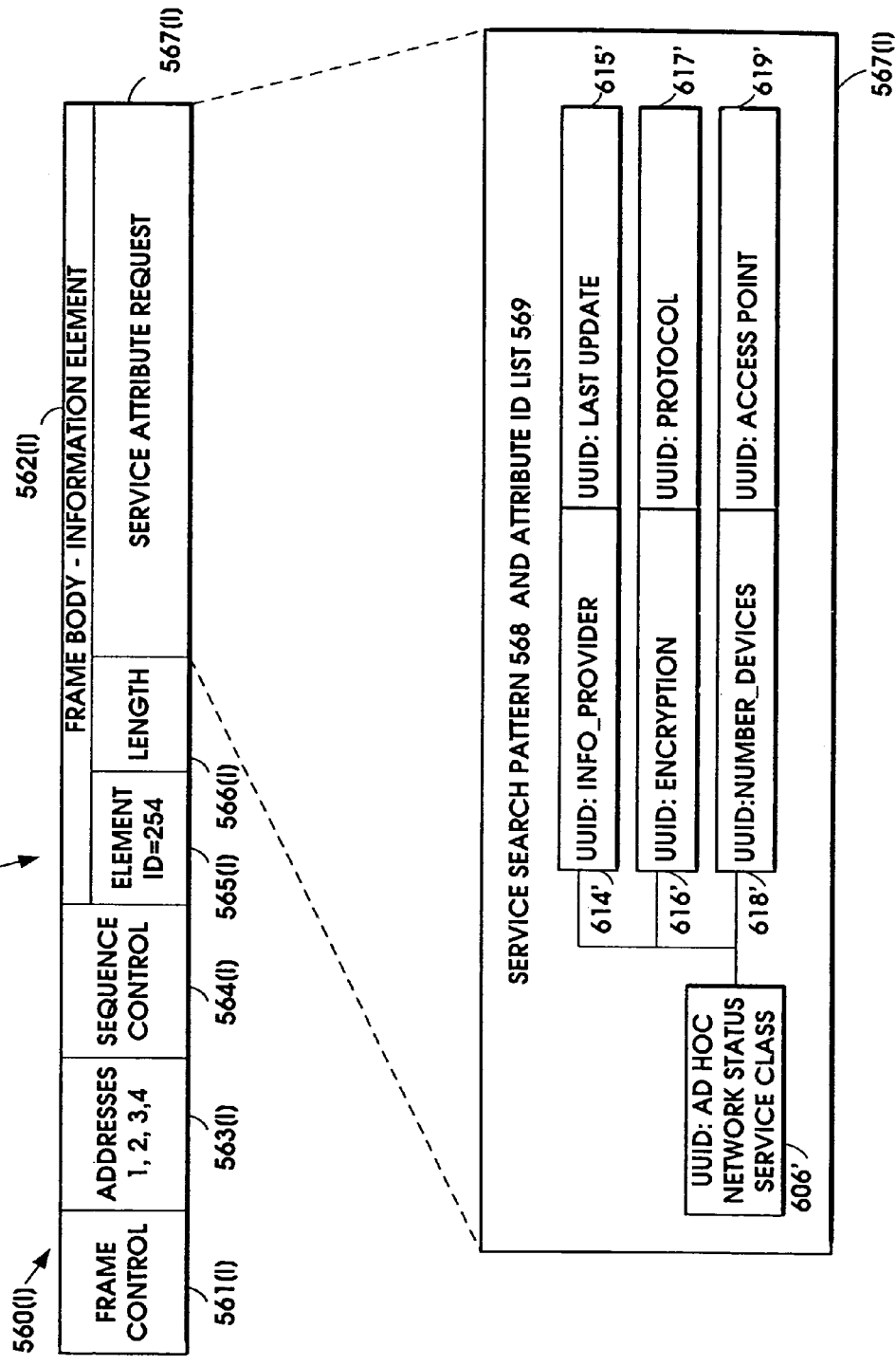

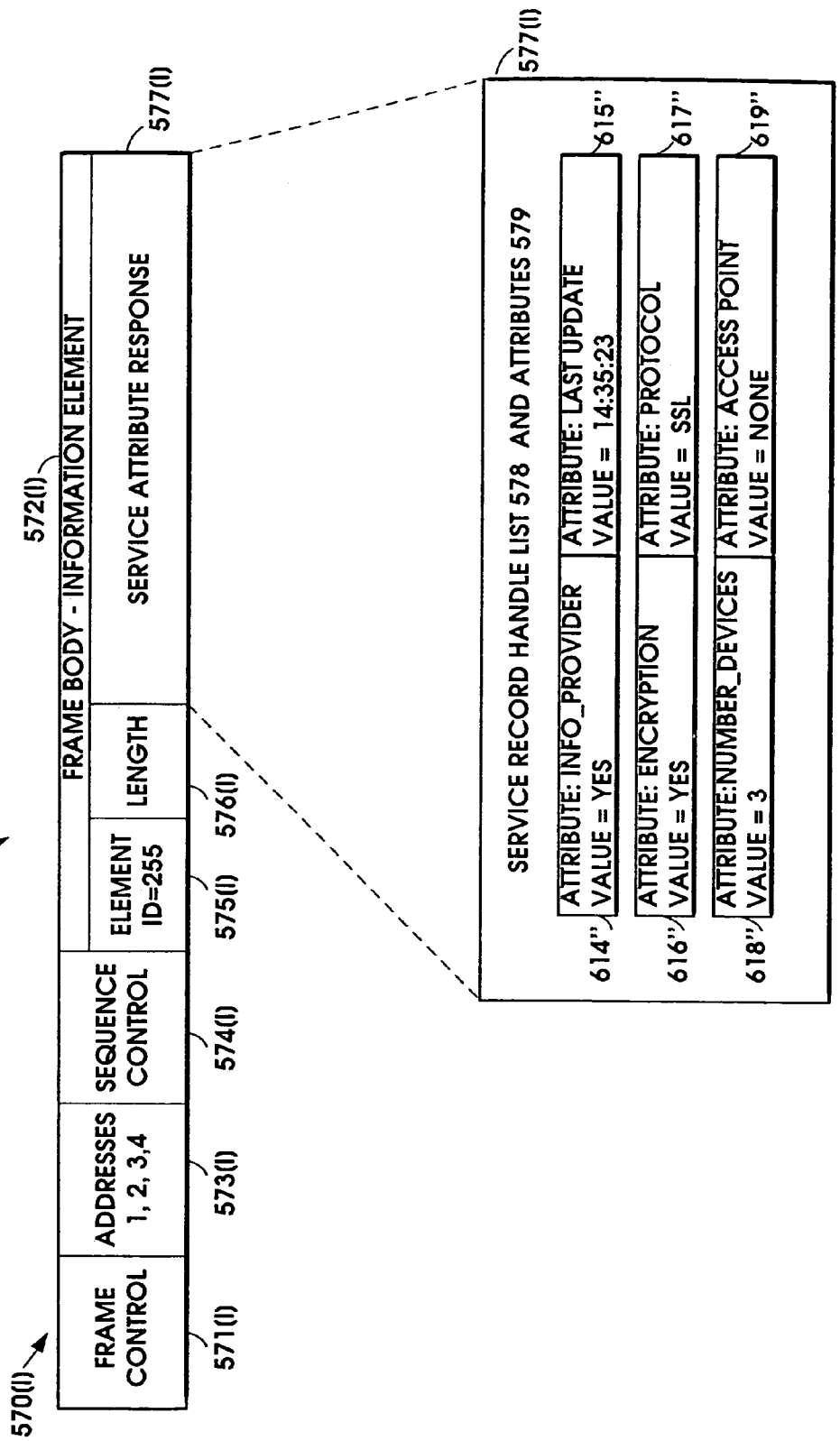

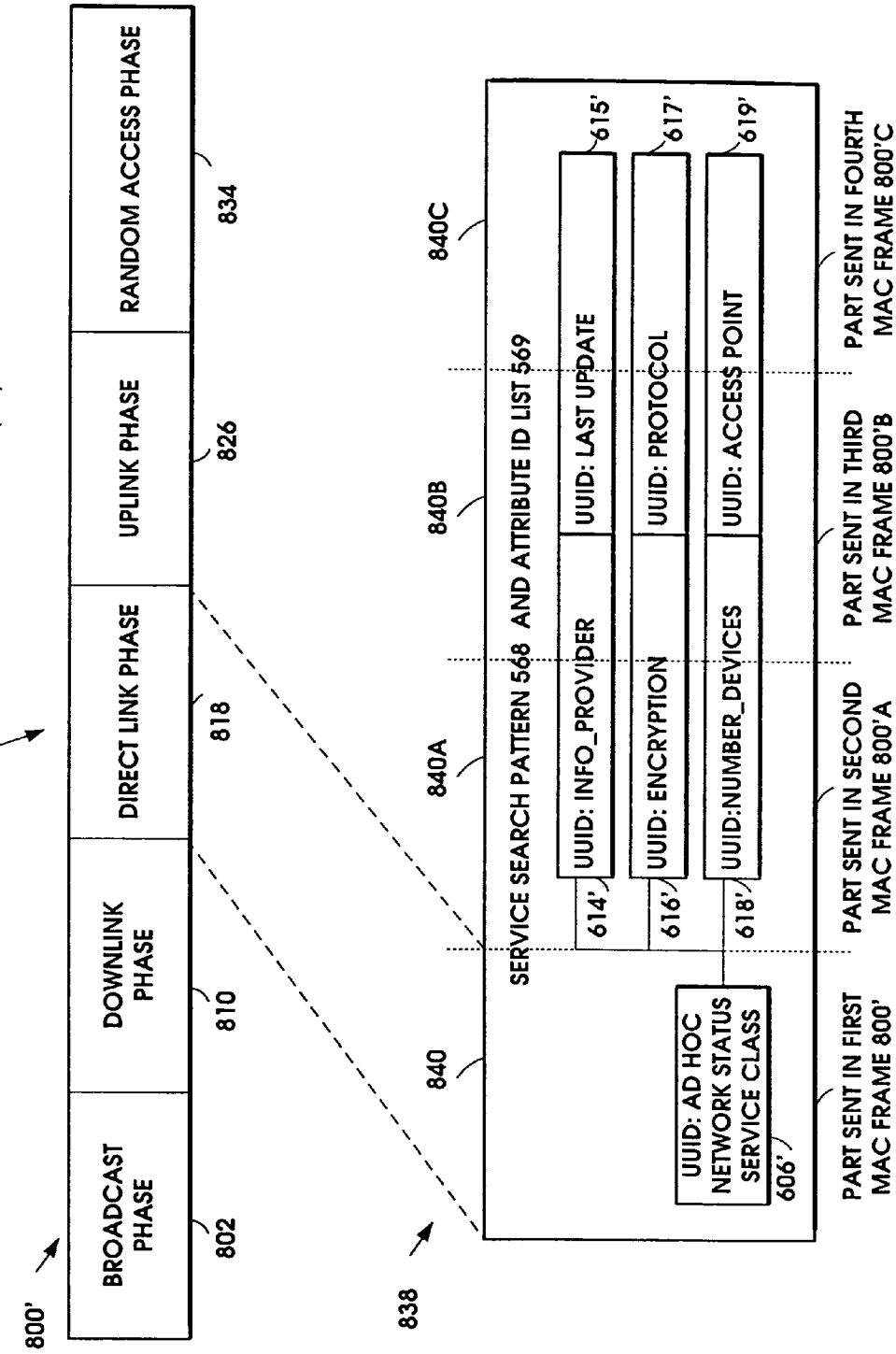

AD HOC NETWORK DISCOVERY MENU

CROSS REFERENCE TO A RELATED APPLICATION

This application for letters patent is a continuation application and hereby incorporates by reference the parent application, U.S. patent application Ser. No. 09/891,382, filed on Jun. 27, 2001 now U.S. Pat. No. 6,842,460, entitled "AD HOC NETWORK DISCOVERY MENU".

FIELD OF THE INVENTION

The invention disclosed broadly relates to ubiquitous computing and more particularly relates to improvements in short-range wireless systems.

BACKGROUND OF THE INVENTION

Short Range Wireless Systems

Short range wireless systems have a typical range of one hundred meters or less. They often combine with systems wired to the Internet to provide communication over long distances. The category of short range wireless systems includes wireless personal area networks (PANs) and wireless local area networks (LANs). They have the common feature of operating in unlicensed portions of the radio spectrum, usually either in the 2.4 GHz Industrial, Scientific, and Medical (ISM) band or the 5 GHz Unlicensed-National Information Infrastructure (U-NII) band. Wireless personal area networks use low cost, low power wireless devices that have a typical range of ten meters. The best known example of wireless personal area network technology is the Bluetooth Standard, which operates in the 2.4 GHz ISM band. It provides a peak air link speed of one Mbps and a power consumption low enough for use in personal, portable electronics such as PDAs and mobile phones. Wireless local area networks generally operate at higher peak speeds of between 10 to 100 Mbps and have a longer range, which requires greater power consumption. Wireless local area networks are typically used as wireless links from portable laptop computers to a wired LAN, via an access point (AP). Examples of wireless local area network technology include the IEEE 802.11 Wireless LAN Standard and the HIPERLAN Standard, which operates in the 5 GHz U-NII band.

Ad Hoc Networks

An ad hoc network is a short range wireless system composed primarily of mobile wireless devices which associate together for a relatively short time to carry out a common purpose. A temporary network such as this is called a "piconet" in the Bluetooth Standard, an "independent basic service set" (IBSS) in the IEEE 802.11 Wireless LAN Standard, a "subnet" in the HIPERLAN Standard, and generally a radio cell or a "micro-cell" in other wireless LAN technologies. Ad hoc networks have the common property of being an arbitrary collection of wireless devices which are physically close enough to be able to communicate and which are exchanging information on a regular basis. The networks can be constructed quickly and without much planning. Members of the ad hoc network join and leave as they move into and out of the range of each other. Most ad hoc networks operate over unlicensed radio frequencies at speeds of from one to fifty-four Mbps using carrier sense protocols to share the radio spectrum. The distance over which they can communicate ranges from ten meters for Bluetooth piconets to over one hundred meters for wireless LAN micro-cells in an open environment. Ad hoc networks consist primarily of mobile wireless devices, but can also include one or more access points which are stationary wireless devices, operating as a stand-alone server or connected as gateways to other networks.

The Bluetooth Short Range Wireless Technology

Bluetooth is a short-range radio network, originally intended as a cable replacement. It can be used to create ad hoc networks of up to eight devices operating together. The Bluetooth Special Interest Group, Specification Of The Bluetooth System, Version 1.0B, Volumes 1 and 2, December 1999, describes the principles of Bluetooth device operation and communication protocols. The devices operate in the 2.4 GHz radio band reserved for general use by Industrial, Scientific, and Medical (ISM) applications. Bluetooth devices are designed to find other Bluetooth devices within their ten meter radio communications range and to discover what services they offer, using a service discovery protocol (SDP). The SDP searching function relies on links being established between the requesting Bluetooth device in a client role and the responding Bluetooth device in a server role. Once a link has been established, it can be used to find out about services in the responding Bluetooth device and how to connect to them.

A connection between two Bluetooth devices is initiated by an inquiring device sending out an inquiry message searching for other devices in its vicinity. Any other Bluetooth device that is listening by means of conducting an inquiry scan, will recognize the inquiry message and respond. The inquiry response is a message packet containing the responding device's Bluetooth Device Address (BD_ADDR). A Bluetooth device address is a unique, 48-bit IEEE address which is electronically engraved into each Bluetooth device.

The inquiring device uses the information provided in the inquiry response packet, to prepare and send a paging message to the responding device. To establish a connection, the inquiring device must enter the page state. In the page state, the inquiring device will transmit initial paging messages to the responding device using the access code and timing information acquired from the inquiry response packet. The responding device must be in the page scan state to allow the inquiring device to connect with it. Once in the page scan state, the responding device will acknowledge the initial paging messages and the inquiring device will send a paging packet which provides the clock timing and access code of the inquiring device to the responding device. The responding device responds with a page acknowledgment packet. This enables the two devices to form a connection and both devices transition into the connection state. The inquiring device that has initiated the connection assumes the role of a master device and the responding device assumes the role of a slave device in a new ad hoc network piconet.

Each piconet has one master device and up to seven slave devices. All communication is directed between the master device and each respective slave device. The master initiates an exchange of data and the slave responds to the master. When two slave devices are to communicate with each other, they must do so through the master device. The master device maintains the piconet's network clock and controls when each slave device can communicate with the master device. Members of the ad hoc network piconet join and leave as they move into and out of the range of the master device. Piconets support distributed activities, such as collaborative work projects, collaborative games, multi-user gateways to the Internet, and the like. A user's device that joins a particular piconet, does so to enable its user to participate in the currently running collaborative activity.

A Bluetooth-enabled laptop computer can send information to a Bluetooth-enabled printer in the next room. A Bluetooth-enabled microwave oven can send a message to a Bluetooth-enabled mobile phone announcing that that the meal is ready. Bluetooth will become the standard in mobile phones, PCs, laptops and other electronic devices, enabling users to share information, synchronize data, access the Internet, integrate with LANs or actuate electro-mechanical devices, such as unlocking a car. A passenger can write e-mails on his/her laptop on an airplane and then, after landing, the messages can be automatically forwarded to the Internet by Bluetooth devices that are ubiquitously located around the airport terminal. In another example, while waiting in an airport lounge, a the passenger can receive interesting duty-free offers directly on his/her mobile phone or play multiplayer games with friends.

The IEEE 802.11 Wireless LAN Standard

The IEEE 802.11 Wireless LAN Standard defines at least two different physical (PHY) specifications and one common medium access control (MAC) specification. The IEEE 802.11 (a) Standard is designed for either the 2.4 GHz ISM band or the 5 GHz U-NII band, and uses orthogonal frequency division multiplexing (OFDM) to deliver up to 54 Mbps data rates. The IEEE 802.11 (b) Standard is designed for the 2.4 GHz ISM band and uses direct sequence spread spectrum (DSSS) to deliver up to 11 Mbps data rates. The IEEE 802.11 Wireless LAN Standard describes two major components, the mobile station and the fixed access point (AP). IEEE 802.11 ad hoc networks have an independent configuration where the mobile stations communicate directly with one another, without support from a fixed access point. IEEE 802.11 ad hoc networks support distributed activities similar those of the Bluetooth piconets. The IEEE 802.11 standard provides wireless devices with service inquiry features similar to the Bluetooth inquiry and scanning features.

In order for a IEEE 802.11 mobile station to communicate with other mobile stations in an ad hoc network, it must first find the stations. The process of finding another station is by inquiring. Active inquiry requires the inquiring station to transmit queries and invoke responses from other wireless stations in an ad hoc network. In an active inquiry, the mobile station will transmit a probe request frame. If there is an ad hoc network on the same channel that matches the service set identity (SSID) in the probe request frame, a station in that ad hoc network will respond by sending a probe response frame to the inquiring station. The probe response includes the information necessary for the inquiring station to access a description of the ad hoc network. The inquiring station will also process any other received probe response and Beacon frames. Once the inquiring station has processed any responses, or has decided there will be no responses, it may change to another channel and repeat the process. At the conclusion of the inquiry, the station has accumulated information about the ad hoc networks in its vicinity. Once a station has performed an inquiry that results in one or more ad hoc network descriptions, the station may choose to join one of the ad hoc networks. The IEEE 802.11 Wireless LAN Standard is published in three parts as IEEE 802.11-1999; IEEE 802.11a-1999; and IEEE 802.11b-1999, which are available from the IEEE, Inc. web site http://grouper.ieee.org/groups/802/11.

High Performance Radio Local Area Network (HIPERLAN)

The HIPERLAN standard provides a wireless LAN with a high data rate of up to 54 Mbps and a medium-range of 50 meters. HIPERLAN wireless LANs provide multimedia distribution with video QoS, reserved spectrum, and good in-building propagation. There are two HIPERLAN standards. HIPERLAN Type 1 is a dynamic, priority driven channel access protocol similar to wireless Ethernet. HIPERLAN Type 2 is reserved channel access protocol similar to a wireless version of ATM. Both HIPERLAN Type 1 and HIPERLAN Type 2 use dedicated spectrum at 5GHz. HIPERLAN Type 1 uses an advanced channel equalizer to deal with intersymbol interference and signal multipath. HIPERLAN Type 2 avoids these interference problems by using OFDM and a frequency transform function. The HIPERLAN Type 2 specification offers options for bit rates of 6, 16, 36, and 54 Mbps. The physical layer adopts an OFDM multiple carrier scheme using 48 carrier frequencies per OFDM symbol. Each carrier may then be modulated using BPSK, QPSK, 16-QAM, or 64-QAM to provide different data rates. The modulation schemes chosen for the higher bit rates achieve throughput in the range 30-50 Mbps.

The HIPERLAN Type 1 is a dynamic, priority driven channel access protocol that can form ad hoc networks of wireless devices. HIPERLAN Type 1 ad hoc networks support distributed activities similar those of the Bluetooth piconets and IEEE 802.11 independent basic service sets (IBSS). The HIPERLAN Type 1 standard provides wireless devices with service inquiry features similar to those of the Bluetooth inquiry and scanning features and the IEEE 802.11 probe request and response features. An overview of the HIPERLAN Type 1 principles of operation is provided in the publication HIPERLAN Type 1 Standard, ETSI ETS 300 652, WA2 December 1997.

HIPERLAN Type 2 is a reserved channel access protocol that forms ad hoc networks. HIPERLAN Type 2 ad hoc networks support distributed activities similar those of the HIPERLAN Type 1 ad hoc networks, Bluetooth piconets and IEEE 802.11 independent basic service sets (IBSS). HIPERLAN Type 2 provides high speed radio communication with typical data rates from 6 MHz to 54 Mbps. It connects portable devices with broadband networks that are based on IP, ATM and other technologies. Centralized mode is used to operate HIPERLAN Type 2 as an access network via a fixed access point. In addition a capability for direct link communication is provided. This mode is used to operate HIPERLAN Type 2 as an ad hoc network without relying on a cellular network infrastructure. In this case a central controller (CC), which is dynamically selected among the portable devices, provides the same level of QoS support as the fixed access point. Restricted user mobility is supported within the local service area. Wide area roaming mobility can also be supported. An overview of the HIPERLAN Type 2 principles of operation is provided in the Broadband Radio Access Networks (BRAN), HIPERLAN Type 2; System Overview, ETSI TR 101 683 VI.I.1 (2000-02) and a more detailed specification of its ad hoc network architecture is described in HIPERLAN Type 2, Data Link Control (DLC) Layer; Part 4. Extension for Home Environment, ETSI TS 101 761-4 V1.2.1 (2000-12).

Other Wireless Standards Supporting Ad Hoc Networks

Other wireless standards support ad hoc networks. Examples include the IEEE 802.15 Wireless Personal Area Network (WPAN) standard, the Infrared Data Association (IrDA) standard, the Digital Enhanced Cordless Telecommunications (DECT) standard, the Shared Wireless Access Protocol (SWAP) standard, the Japanese 3rd Generation (3G) wireless standard, and the Multimedia Mobile Access Communication (MMAC) Systems standard of the Japanese Association of Radio Industries and Businesses.

What is needed is a way to provide an ad hoc network discovery menu to an arriving wireless device, which lists the currently running collaborative activities of all of the ad hoc networks within its range. It would be even more useful if the desired ad hoc network discovery menu selected only those ad hoc networks that are of particular interest to the arriving user, or which have the highest received signal quality.

SUMMARY OF THE INVENTION

In accordance with the invention, when an ad hoc network is initially formed between two short-range wireless devices, the one device assumes the role of an ad hoc network information provider for the new ad hoc network. In this role, the one device allocates a browsing hierarchy of service classes in its memory. The service classes will provide a record to characterize the ad hoc network. Characteristics of the ad hoc network stored in the memory can include the type of distributed application program currently running, the number of members, the identity of its members, and the like. As additional devices are added to the ad hoc network and participate in the distributed application of the ad hoc network, they contribute to altering the status of the network. In order to maintain a record of the current status of the ad hoc network, each device sends update messages to the ad hoc network information provider, to update its memory. This information can be frequently updated in the memory to give the current state of an activity, such as the score of a collaborative baseball game.

Further in accordance with the invention, when a new short-range wireless device arrives within the communication range of any member of the ad hoc network, its inquiry signals are answered by a member detecting the inquiry. If the responding member is an ad hoc network information provider, it responds with information accessed from its memory characterizing the ad hoc network. If, instead, an ordinary device in an ad hoc network is the first to respond to the inquiry signals of the arriving device, the responding device responds with the address of the ad hoc network information provider. The arriving device then pages the ad hoc network information provider to obtain information characterizing the ad hoc network.

In accordance with another embodiment of the invention, the address of the Information Provider device in a new ad hoc network can be learned from a Beacon signal periodically transmitted from the ad hoc network. For example, when the invention in embodied in the IEEE 802.11 Wireless LAN Standard or the HIPERLAN Type 2 Wireless LAN Standard, a Beacon signal is transmitted periodically to allow mobile stations to locate and identify the information provider device in an ad hoc network. The beacon signal specifies the address of the information provider device in the ad hoc network. When an arriving device is close enough to the ad hoc network to receive the periodic beacon signal from a device in that network, the arriving device will know the address of the information provider device in that network. If the arriving device is running the ad hoc network discovery menu option, then the arriving device can directly address a request to the information provider for the service records characterizing the ad hoc network.

In accordance with yet another embodiment of the invention, the address of the Information Provider device in a new ad hoc network can be a default address. For example, when the invention in embodied in the Bluetooth Standard, IEEE 802.11 Wireless LAN Standard, or the HIPERLAN Type 2 Wireless LAN Standard, the Information Provider device in a new ad hoc network can have a default address to allow mobile stations to locate and identify the information provider device in an ad hoc network. The default address is known to every arriving device. For example, in the Bluetooth Standard, the default address can be the address of the first slave in the ad hoc network. As another example, in the IEEE 802.11 Wireless LAN Standard, the default address can be the address of the first device or the second device in the ad hoc network. As still another example, in the HIPERLAN Type 2 Wireless LAN Standard the default address can be the address of the central controller device or the second device in the ad hoc network. When an arriving device is close enough to the ad hoc network to either receive a periodic beacon signal from a device in that network or alternately to receive a response to its inquiry, the arriving device will know the default address of the information provider device in that network. If the arriving device is running the ad hoc network discovery menu option, then the arriving device can directly address a request to the information provider using the default address, to obtain the service records characterizing the ad hoc network.

Still further in accordance with the invention, the user of the arriving short-range wireless device can specify the type of ad hoc network characteristics of interest. The user may be looking for services such as a printer, fax machine, or public Internet gateway. These preferences can be used to configure the inquiry by the arriving device for a specific class of device, such as a printer or fax machine. The user may be looking for applications such as distributed games or other collaborative activities. These preferences can be used to configure service requests by the arriving device for generic service classes such as games or specific service attributes such as particular application programs or member names.

Still further in accordance with the invention, if the arriving device comes within the communications range of several ad hoc networks, it gathers information characterizing each ad hoc network from the respective ad hoc network information providers. The invention then compiles an ad hoc network discovery menu in the arriving device, that lists the characteristics of the ad hoc networks within its range. The ad hoc network discovery menu lists the characteristics of each responding ad hoc network, in accordance with the type of characteristics of interest to the user. If the user did not specify characteristics of interest, then the network discovery menu ranks the ad hoc networks by the received signal quality from the devices in each respective ad hoc network. The access code for each ad hoc network is associated with each respective entry in the menu. When the user selects an entry from the menu, the arriving device automatically joins the selected ad hoc network.

Examples of the metric used to rank the ad hoc networks by the received signal quality include Bit Error Rate accumulated over time, Packet Error Rate accumulated over time, received signal strength, link quality measurements, continuous-wave interference, co-channel interference, clear channel assessment (collision avoidance), collisions per unit time, retry counts, and frames canceled per unit time.

The user's arriving device may encounter a wireless device that does not have knowledge of the information provider feature. The user's device will send its usual service search attribute request asking whether the receiving device is an ad hoc network information provider. When the Un-Aware device receives this service search attribute request, it will not have the requested attribute in its service registry, and thus it will respond with an Error Response. In accordance with the invention, the user's device will recognize this response as an indication that the receiving device is an Un-Aware device. The user's device will then gather whatever information can be derived from the inquiry response received from the Un-Aware device, including its Class-of-Device (CoD), such as "Fax_Machine" or "Printer". This information can be listed by the user's device in the Ad Hoc Network Discovery Menu.

Optionally, the listing can include a designation such as "Un-Aware Device", in the Ad Hoc Network Discovery Menu. The user's device can also formulated additional, more general requests in a subsequent service search attribute request. If the subsequent service request results in receiving more informative attributes from the Un-Aware device, then this information can also be listed in the Ad Hoc Network Discovery Menu.

In an alternate embodiment of the invention, a primary and a secondary ad hoc network information provider are created in each ad hoc network. The backup device serves as a hot standby that assumes the role of the primary device when the original primary device leaves the ad hoc network. Either the master device or a slave device can be either the primary or the backup ad hoc network information service provider. In still another alternate embodiment of the invention, many or all of the devices in an ad hoc network can assume the role of ad hoc network information provider. Then, when an arriving device sends an inquiry to the ad hoc network, any device can respond in the role of an ad hoc network information provider. Updated information is shared with the master device and broadcast to all other slave devices in the ad hoc network. Each device in the ad hoc network then stores a dynamic service record in its respective Memory, containing the updated information.

Four example ad hoc network standards are described to embody the invention, the Bluetooth standard, the IEEE 802.11 Wireless LAN standard, the HIPERLAN Type 1 standard, and the HIPERLAN Type 2 standard. However, in addition to these four standards, the invention also applies to other wireless standards. The invention's principle of an ad hoc network information provider that furnishes records characterizing the ad hoc network to inquiring devices, is equally useful in many other wireless standards. The invention applies, for example, to the Infrared Data Association (IrDA) standard, the Digital Enhanced Cordless Telecommunications (DECT) standard, the Shared Wireless Access Protocol (SWAP) standard, the IEEE 802.15 Wireless Personal Area Network (WPAN) standard, the Japanese 3rd Generation (3G) wireless standard, and the Multimedia Mobile Access Communication (MMAC) Systems standard of the Japanese Association of Radio Industries and Businesses. The invention enables each of these wireless standards to provide an ad hoc network information provider that furnishes records characterizing the ad hoc network to inquiring devices.

DESCRIPTION OF THE FIGURES

FIG. 1A is a network diagram showing several ad hoc networks and an arriving Bluetooth device 100 which is searching for remote ad hoc networks in the ad hoc network discovery mode.

FIG. 3A is a flow diagram of the SDP service registry creation application program 280 in any Bluetooth device, for creating the SDP service registry in the device when the device becomes a member of an ad hoc network. The diagram shows that a first occurring slave device becomes the ad hoc information provider device for the ad hoc network and that subsequent devices are not ad hoc information provider devices. In an alternate embodiment, one or more subsequent devices can also become ad hoc network information provider devices.

FIG. 3B is a flow diagram of the initial menu application program 300 in any Bluetooth device, for creating the initial menu 205 displayed to the user for selecting the ad hoc network discovery mode as shown in FIG. 1. A sub-menu can be displayed to enable the user to select a particular device class, a particular service class, and/or a particular service attribute to search for in the remote ad hoc networks.

FIG. 3E is a flow diagram of the service record update routine 330 in any Bluetooth device, that creates updated service records to be sent to the master device for forwarding new data to the ad hoc network information provider.

FIG. 3F is a flow diagram of the ad hoc network discovery menu program 340 in any Bluetooth device, for receiving the resulting ranked list of discovered ad hoc networks from the ad hoc network discovery application program 412 of FIG. 3D and displaying the ad hoc network discovery menu shown in FIG. 2C.

FIG. 4A shows the Bluetooth packet structure for an inquiry packet sent by arriving device 100.

FIG. 4B shows the Bluetooth packet structure for an inquiry response packet sent by ad hoc network information provider 106. The FHS packet buffer 515 is also shown.

FIG. 4C shows the Bluetooth packet structure for a paging packet sent by arriving device 100.

FIG. 4D shows the Bluetooth packet structure for a page acknowledgment packet sent by ad hoc network information provider 106.

FIG. 4E shows the Bluetooth packet structure for SDP service search attribute request packet sent by arriving device 100 to ad hoc network information provider 106.

FIG. 4F shows the Bluetooth packet structure for response to SDP service search attribute request, response sent by ad hoc network information provider 106 to arriving device 100.

FIG. 4G shows the Bluetooth packet structure for SDP service search attribute request packet sent by arriving device 100 to ad hoc network information provider 106.

FIG. 4I shows the Bluetooth packet structure for SDP service search attribute request packet sent by arriving device 100 to ad hoc network information provider 116.

FIG. 4J shows the Bluetooth packet structure for response to SDP service search attribute request, response sent by ad hoc network information provider 116 to arriving device 100.

FIG. 4K shows the Bluetooth packet structure for SDP service search attribute request packet sent by arriving device 100 to ad hoc network information provider 126.

FIG. 6A shows the SDP service registry 600A in ad hoc network information provider 116, as shown in FIGS. 1A and 1D.

FIG. 7A shows an alternate embodiment to that shown in FIG. 4E, for the IEEE 802.11 packet structure for a probe request, sent by the arriving device 100(I) to the ad hoc network information provider 106(I).

FIG. 7B shows an alternate embodiment to that shown in FIG. 4F, for the IEEE 802.11 packet structure for a probe response to the probe request of FIG. 7A, this response having been sent by the ad hoc network information provider 106(I) to the arriving device 100(I).

FIG. 8B shows an alternate embodiment, illustrating the HIPERLAN Type 2 MAC frame structure, including a request for the subnet service records, sent in the direct link channel by the arriving device 100(H2) to the ad hoc network information provider 106(H2).

DISCUSSION OF THE PREFERRED EMBODIMENT

Figure 1:
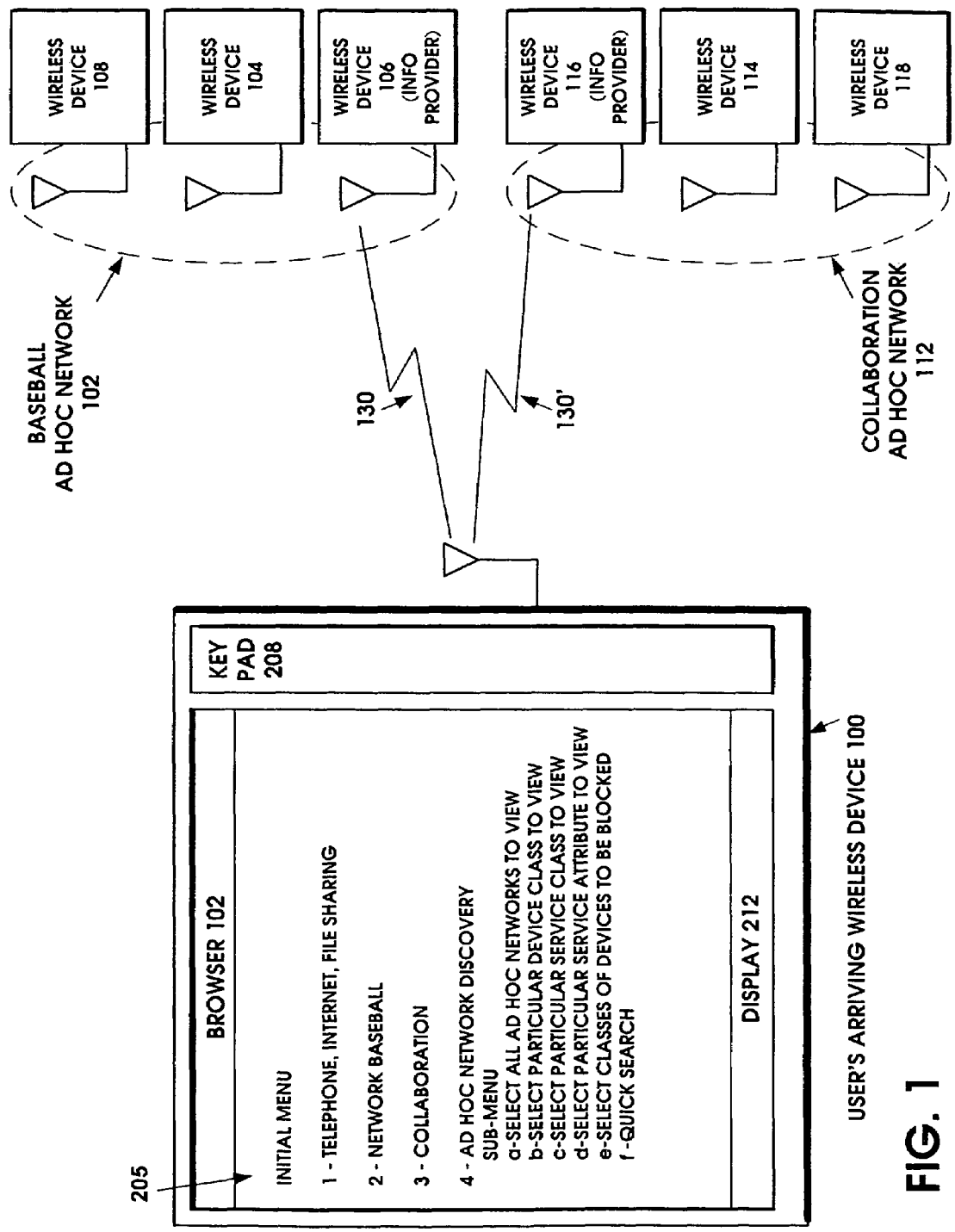
FIG. 1 shows an example appearance of the arriving wireless device 100 and the initial menu 205 displayed to the user for selecting the ad hoc network discovery mode. This figure applies to all wireless standards supporting ad hoc networks.

FIG. 1 applies to all wireless standards supporting ad hoc networks. The ad hoc network discovery menu invention can be described by continuing the example mentioned above, of a passenger who has arrived at an airport and is now waiting in the airport lounge for a flight to another destination. The passenger carries a wireless device 100, which can be in the form of the Personal Digital Assistant (PDA) shown in FIG. 1. On the way to the airport lounge, the passenger has passed kiosks providing fax machines and printers to the pubic that can be wirelessly connected to by means of wireless devices mounted at the kiosks. Signs around the airport urge passengers to "Scan your Wireless" to advertisements of duty-free offers. The passenger looks about the lounge and sees a number of other passengers focused on their laptops and PDAs. Several of them appear to be collaborating with each other, since they join in animated laughter or converse while working on their computers.

In the situation shown in FIG. 1, there are two ad hoc networks 102 and 112 and the passenger's arriving wireless device 100. The passenger is curious about these ongoing collaborative activities, since maybe he/she can while away the time waiting, by joining in on the game that is apparently being played by the more animated of the groups. The passenger would like to start the ad hoc network discovery menu program which is one of the options listed on the initial menu 205 displayed on the device 100 of FIG. 1. But before doing so, the passenger wishes to block the listing of certain classes of devices, such as the printers, fax machines, and advertisement broadcasters which are seen around the airport. Thus the passenger begins by selecting from the initial menu 205, the option "SELECT CLASSES OF DEVICES TO BE BLOCKED". The passenger then enters "PRINTERS", "FAX MACHINES", and ADVERTISEMENTS", and these classes of devices are listed in a Search Options List selected by the user from the initial menu 205 of FIG. 1.

If the passenger had alternately desired to list ad hoc networks having a specific class of devices, such as "PHOTOCOPIER", he/she could have selected from the initial menu 205 of FIG. 1, the option "SELECT PARTICULAR DEVICE CLASS" and then entered "PHOTOCOPIER" on the keypad 208, and this class of devices would have been listed in the Search Options List. The passenger also desires to list ad hoc networks having a specific service class such as "USER NAME" so he/she selects from the initial menu 205, the option "SELECT PARTICULAR SERVICE CLASS" and then enters "USER NAME" on the keypad 208, and this service class is listed in the Search Options List. Alternately, the passenger could have listed ad hoc networks having a specific service attribute such as "GAME PROGRAM" by selecting from the initial menu 205, the option "SELECT PARTICULAR SERVICE ATTRIBUTE" and then enter "GAME PROGRAM" on the keypad 208, and this service attribute would have been listed in the Search Options List.

FIG. 1 shows an example appearance of the arriving wireless device 100 and the initial menu 205 displayed to the user for selecting the ad hoc network discovery mode, rendered in the browser 102 on the display 212. The user can select one of four primary options:

1—TELEPHONE, INTERNET, FILE SHARING
2—NETWORK BASEBALL
3—COLLABORATION
4—AD HOC NETWORK DISCOVERY

If the user selects the ad hoc network discovery option, then the user can select one of four network discovery options in a sub-menu:

a-SELECT ALL AD HOC NETWORKS
b-SELECT PARTICULAR DEVICE CLASS
c-SELECT PARTICULAR SERVICE CLASS
d-SELECT PARTICULAR SERVICE ATTRIBUTE
e-SELECT CLASSES OF DEVICES TO BE BLOCKED
f-QUICK SEARCH

The sub-menu enables the user to specify the type of ad hoc network characteristics of interest. The user may select option b-SELECT PARTICULAR DEVICE CLASS using keypad 208, if he/she is looking for services such as a printer, fax machine, or photocopier. These preferences can be used to configure the inquiry by the arriving device 100 for a specific class of device, such as a printer or fax machine. The user may select option c-SELECT PARTICULAR SERVICE CLASS using keypad 208, if he/she is looking for general applications such as distributed games or other collaborative activities or a list of all user names. These preferences can be used to configure service requests by the arriving device for generic service classes such as games. The user may select option d-SELECT PARTICULAR SERVICE ATTRIBUTE using keypad 208, if he/she is looking for a specific application program or specific member names. These preferences can be used to configure service requests by the arriving device for specific service attributes such as "Network Baseball" or "John's Laptop".

The user is given a "QUICK SEARCH" option in the initial menu 205 displayed on the device 100 of FIG. 1, which checks the data gathered in the inquiries it has made, to determine whether the class-of-device (CoD) field for a responding device has the status of "AD HOC NETWORK INFORMATION PROVIDER". If so, this will cut short the search for information characterizing that particular ad hoc network.

The user is now ready to start the ad hoc network discovery menu option listed on the initial menu 205 of FIG. 1. When the user's wireless device arrives within the communication range of any member of one of the ad hoc networks 102 or 112, its inquiry signals are answered by the first member detecting the inquiry. For example if that first member is the ad hoc network information provider 106 in the baseball ad hoc network 102, the ad hoc network information provider 106 responds over link 130 with information accessed from its service registry characterizing the ad hoc network. If, instead, a non-information provider device 108 in the ad hoc network 102 is the first to respond to the inquiry signals of the arriving device 100, the device 108 responds with the address of the ad hoc network information provider 106. The user's arriving device 100 then pages the ad hoc network information provider 106 to obtain information characterizing the ad hoc network 102. A similar inquiry and response will be obtained from the ad hoc network information provider 116 in the collaboration ad hoc network 112, the ad hoc network information provider 116 responding over link 130' with information accessed from its service registry characterizing the ad hoc network 112.

The user's wireless device 100 then compiles an ad hoc network discovery menu in the arriving device, that lists the characteristics of the ad hoc networks within its range. The ad hoc network discovery menu lists the characteristics of each responding ad hoc network, in accordance with the type of characteristics of interest to the user. If the user did not specify characteristics of interest, then the network discovery menu ranks the ad hoc networks by the received signal quality from the devices in each respective ad hoc network. The access code for each ad hoc network is associated with each respective entry in the menu. When the user selects an entry from the menu, the arriving device automatically joins the selected ad hoc network.

Four example wireless standards will be described in detail, to embody the ad hoc network invention: [1] the Bluetooth standard, [2] the IEEE 802.11 Wireless LAN standard, [3] the HIPERLAN Type 1 standard, and [4] he HIPERLAN Type 2 standard. However, in addition to these four wireless standards, the invention also applies to other wireless standards. The invention's principle of an ad hoc network information provider that furnishes records characterizing the ad hoc network to inquiring devices, is equally useful in many other wireless standards. The invention applies, for example, to the Infrared Data Association (IrDA) standard, the Digital Enhanced Cordless Telecommunications (DECT) standard, the Shared Wireless Access Protocol (SWAP) standard, the IEEE 802.15 Wireless Personal Area Network (WPAN) standard, the Japanese 3rd Generation (3G) wireless standard, and the Multimedia Mobile Access Communication (MMAC) Systems standard of the Japanese Association of Radio Industries and Businesses. The invention enables each of these wireless standards to provide an ad hoc network information provider that furnishes records characterizing the ad hoc network to inquiring devices.

EXAMPLE OF THE INVENTION IMPLEMENTED IN THE BLUETOOTH SHORT RANGE WIRELESS TECHNOLOGY

Figure 1B:
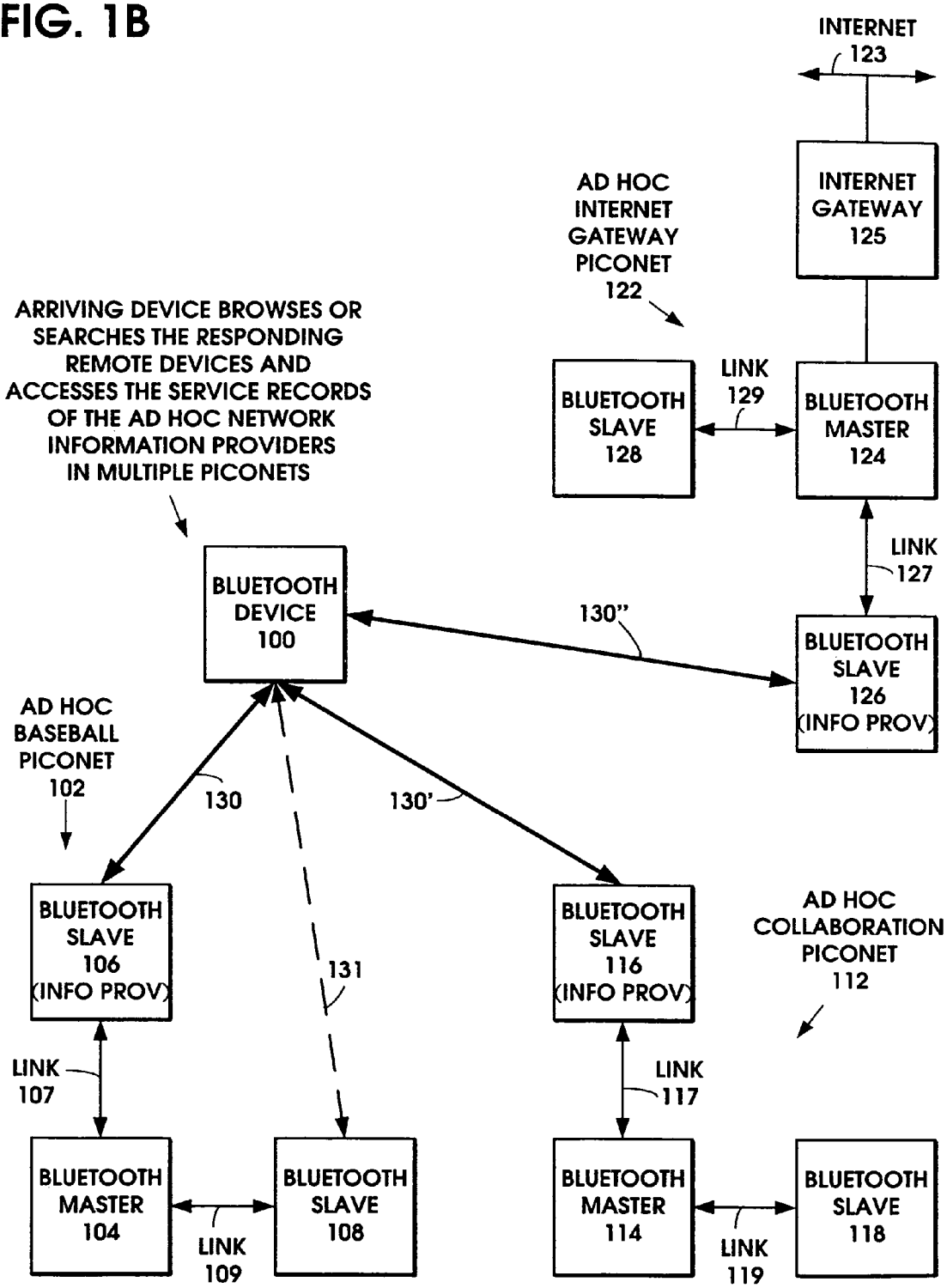
FIG. 1B is a network diagram showing the arriving device of FIG. 1A browsing or searching the responding remote Bluetooth devices and accessing the service records of the ad hoc network information provider devices in multiple ad hoc networks.

FIG. 1A shows three Bluetooth ad hoc networks 102, 112, and 122 and the passenger's arriving Bluetooth device 100 currently operating in the airport lounge. When the user's Bluetooth device arrives within the communication range of any member of one of the ad hoc networks, its inquiry signals are answered by the first member detecting the inquiry. For example if that first member is the ad hoc network information provider 106 in the ad hoc baseball piconet 102, the ad hoc network information provider 106 responds over link 130 with information accessed from its SDP service registry characterizing the ad hoc network, as shown in FIG. 1B. If, instead, an ordinary slave device 108 in the ad hoc network 102 is the first to respond to the inquiry signals of the arriving device 100, the slave 108 responds over link 131 with the address of the ad hoc network information provider 106, as shown in FIG. 1B. The user's arriving device 100 then pages the ad hoc network information provider 106 to obtain information characterizing the ad hoc network 102.

FIGS. 1A and 1B show the ad hoc baseball piconet 102 has its master device 104 connected by link 107 to the ad hoc network information provider 106 which is a slave to the master device 104, and the master connected by link 109 to slave device 108. FIGS. 1A and 1B also show the ad hoc collaboration piconet 112 with master device 114 connected by link 117 to the ad hoc network information provider 116 which is a slave to the master device 114, and connected by link 119 to slave device 118. FIGS. 1A and 1B further show the ad hoc Internet gateway piconet 122 with master device 124 connected by link 127 to the ad hoc network information provider 126 which is a slave to the master device 124, and connected by link 129 to slave device 128. FIG. 1B shows the arriving device 100 browsing or searching the responding remote Bluetooth devices and accessing the service records of the ad hoc network information provider devices in multiple ad hoc networks. The ad hoc network information provider 116 in the ad hoc collaboration piconet 112, responds over link 130' with information accessed from its SDP service registry characterizing the ad hoc network 112. The ad hoc network information provider 126 in the ad hoc Internet gateway piconet 122, responds over link 130" with information accessed from its SDP service registry characterizing the ad hoc network 122.

Figure 1C:
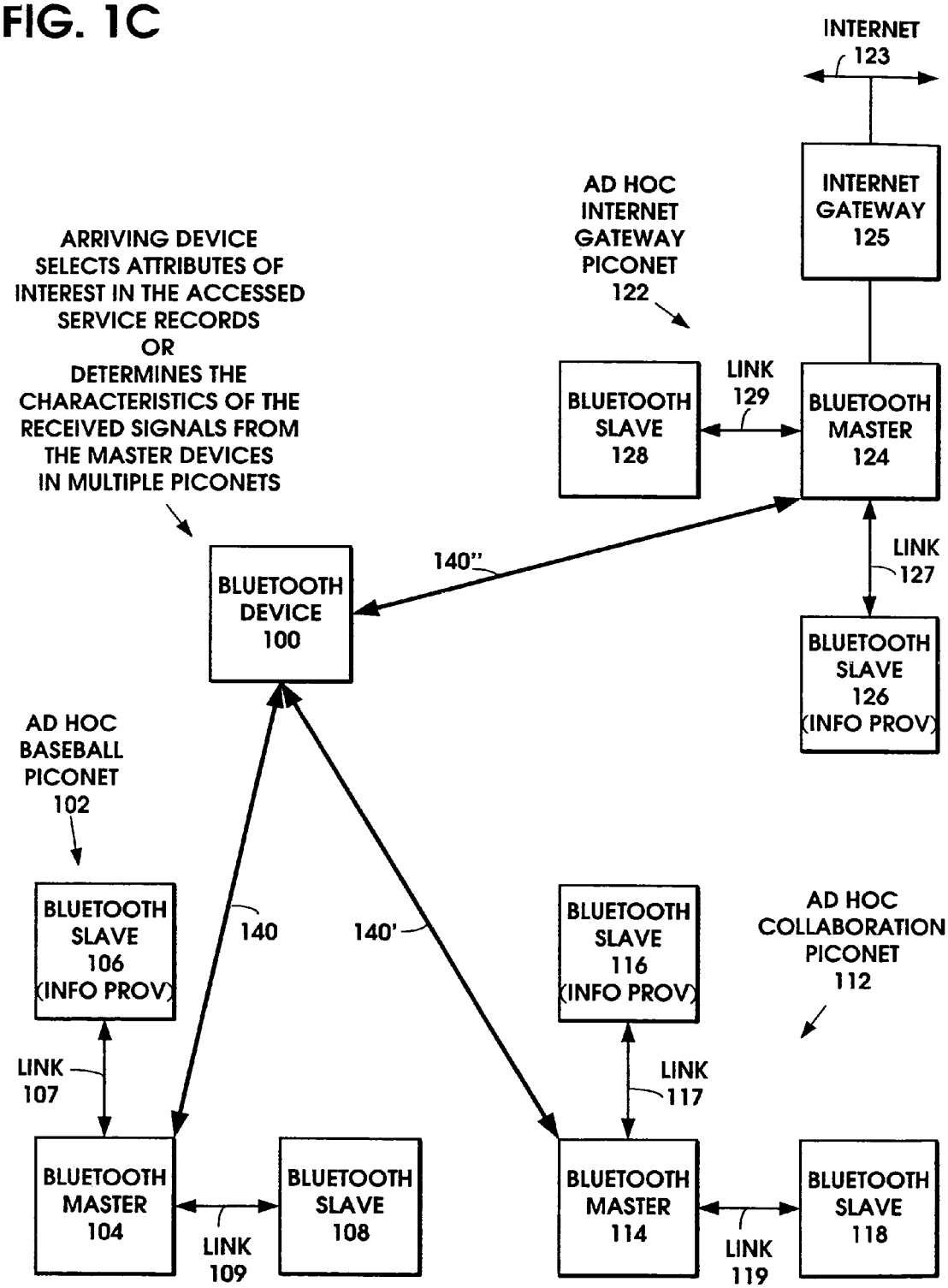
FIG. 1C is a network diagram showing the arriving device of FIG. 1B selecting attributes of interest in the accessed service records or determining the characteristics of the received signals from the master devices in the multiple ad hoc networks.

FIG. 1C is a network diagram showing the arriving device 100 of FIG. 1B selecting attributes of interest in the accessed service records or determining the characteristics of the received signals from the master devices 104, 114, and 124 over the respective links 140, 140', and 140" in the respective ad hoc networks 102, 112, and 122. The arriving device selects attributes of interest in the accessed service records or determines the characteristics of the received signals from the master devices 104, 114, and 124 in the multiple piconets. The invention then compiles a network discovery menu in the arriving device, that lists the characteristics of the ad hoc networks within its range.

Figure 1D:
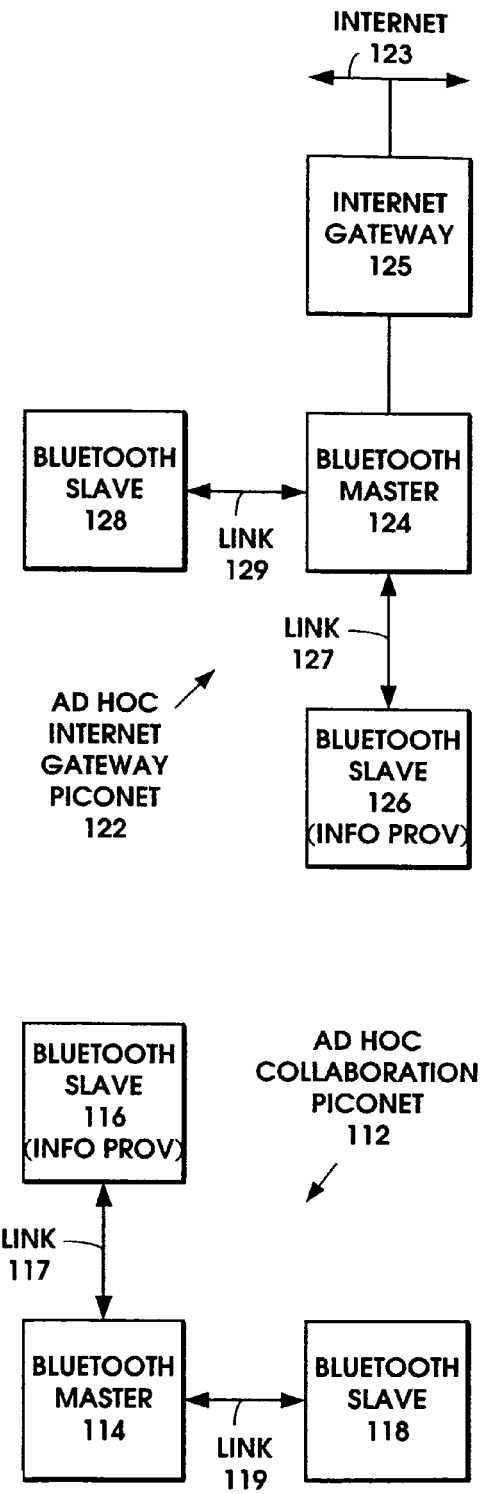
FIG. 1D is a network diagram showing the arriving device of FIG. 1C forming a network discovery menu including descriptions of ad hoc network characteristics in the multiple ad hoc networks, such as the application programs they are running, derived from the service records and listed according to the selected attributes or ranked according to the signal characteristics.
Figure 2A:
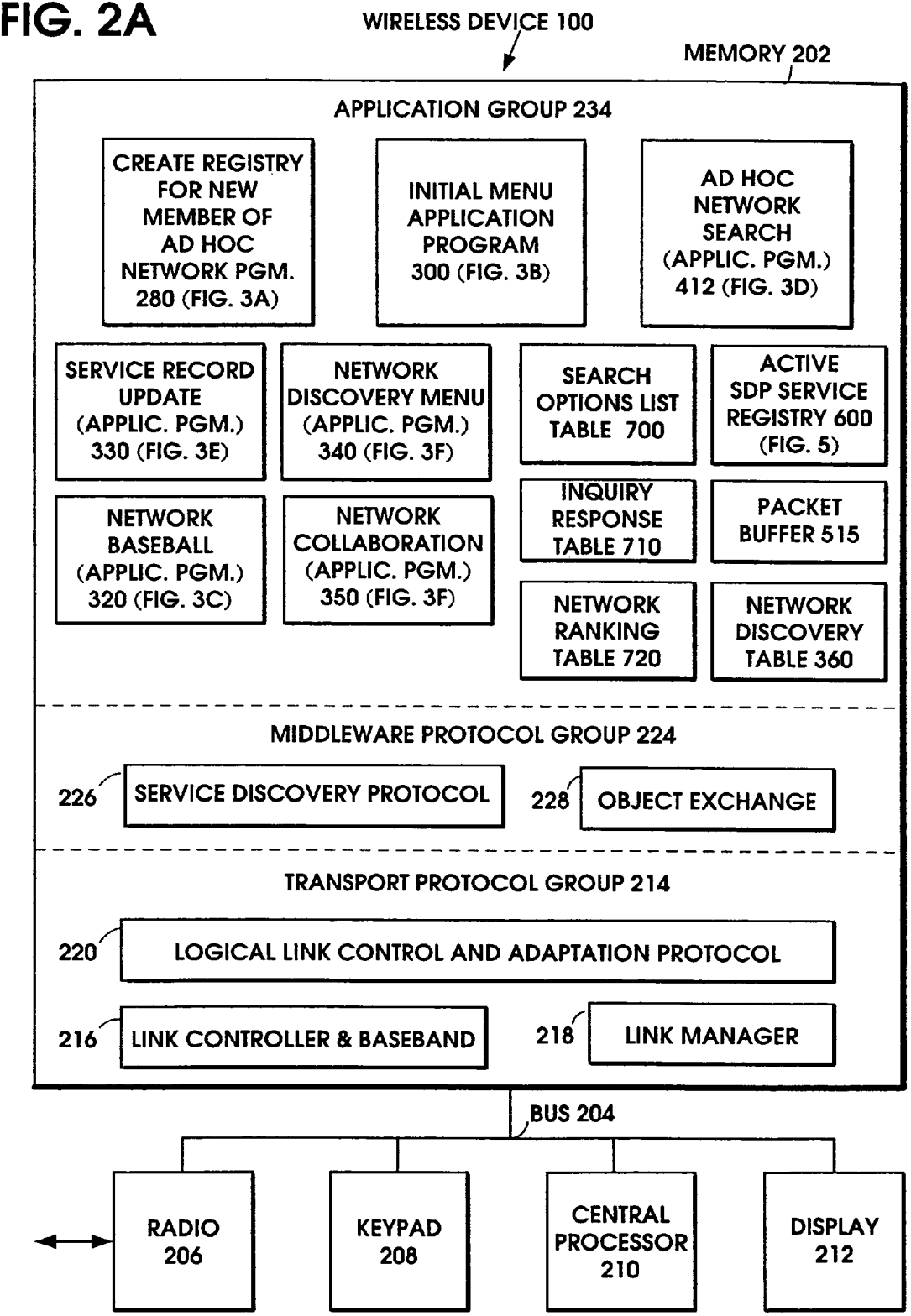
FIG. 2A is a functional block diagram of the arriving wireless device 100 of FIG. 1, showing the various program modules stored in its memory for the transport protocol group, middleware protocol group, and application group. This figure applies to all wireless standards supporting ad hoc networks.
Figure 2B:
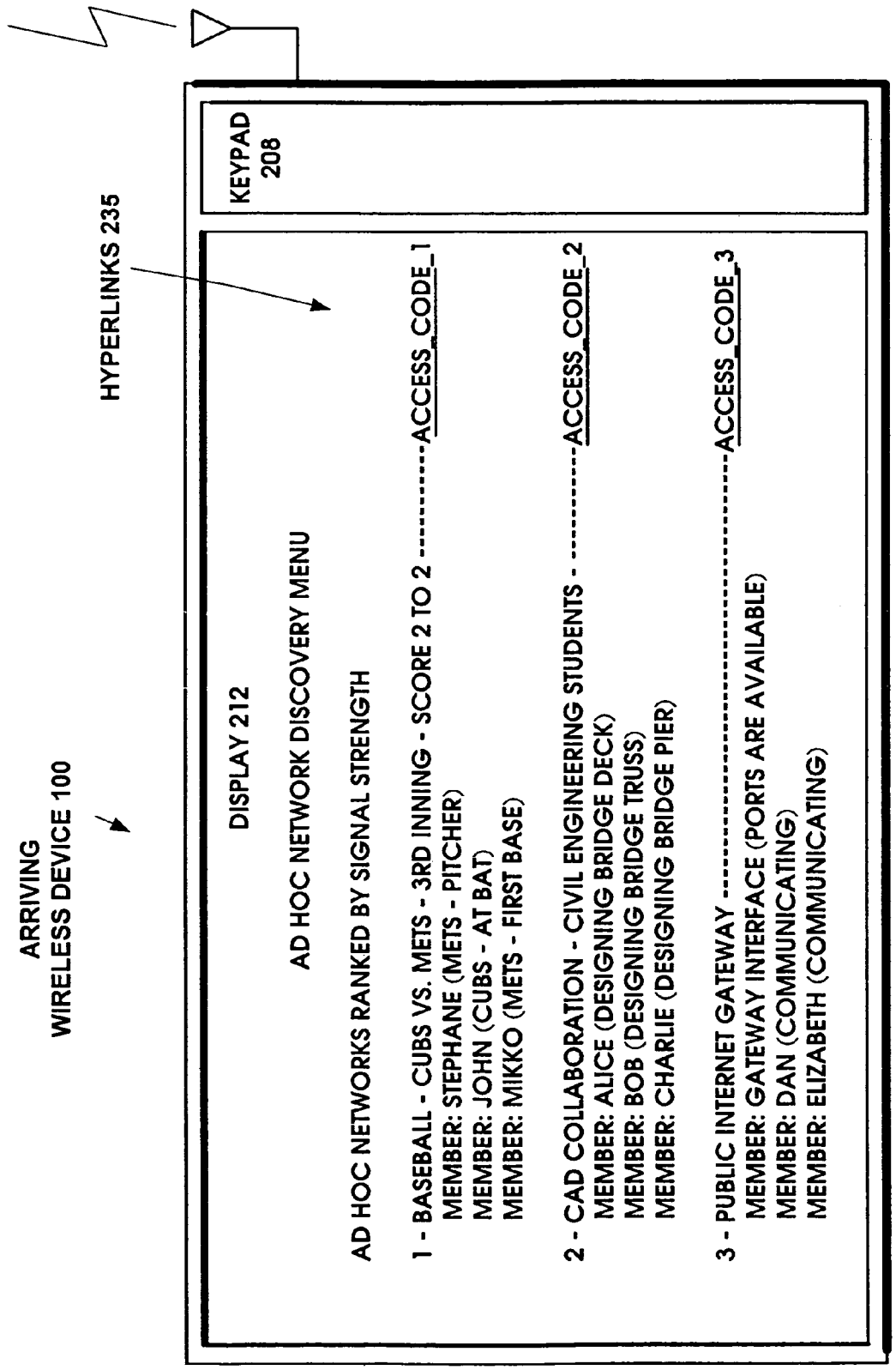
FIG. 2B shows an example appearance of the arriving wireless device 100 of FIG. 1 and the ad hoc network discovery menu displayed to the user with the discovered ad hoc networks ranked by received signal strength. This figure applies to all wireless standards supporting ad hoc networks.

FIG. 1D is a network diagram showing the arriving device 100 of FIG. 1C forming a network discovery menu, as shown in FIG. 2B, including descriptions of ad hoc network characteristics in the multiple ad hoc networks 102, 112, and 122, such as the application programs they are running, derived from the service records and listed according to the selected attributes or ranked according to the signal characteristics. The network discovery menu lists the characteristics of each responding ad hoc network, in accordance with the type of characteristics of interest. If the user did not specify characteristics of interest, then the network discovery menu ranks the ad hoc networks by the received signal quality from the master device in each respective ad hoc network. The access code for each ad hoc network is associated with each respective entry in the menu, as shown in FIG. 2B. The access code addresses the packet to the master device in the selected ad hoc network. When the user selects an entry from the menu, the arriving device uses the access code to automatically join the selected ad hoc network.

Figure 1E:
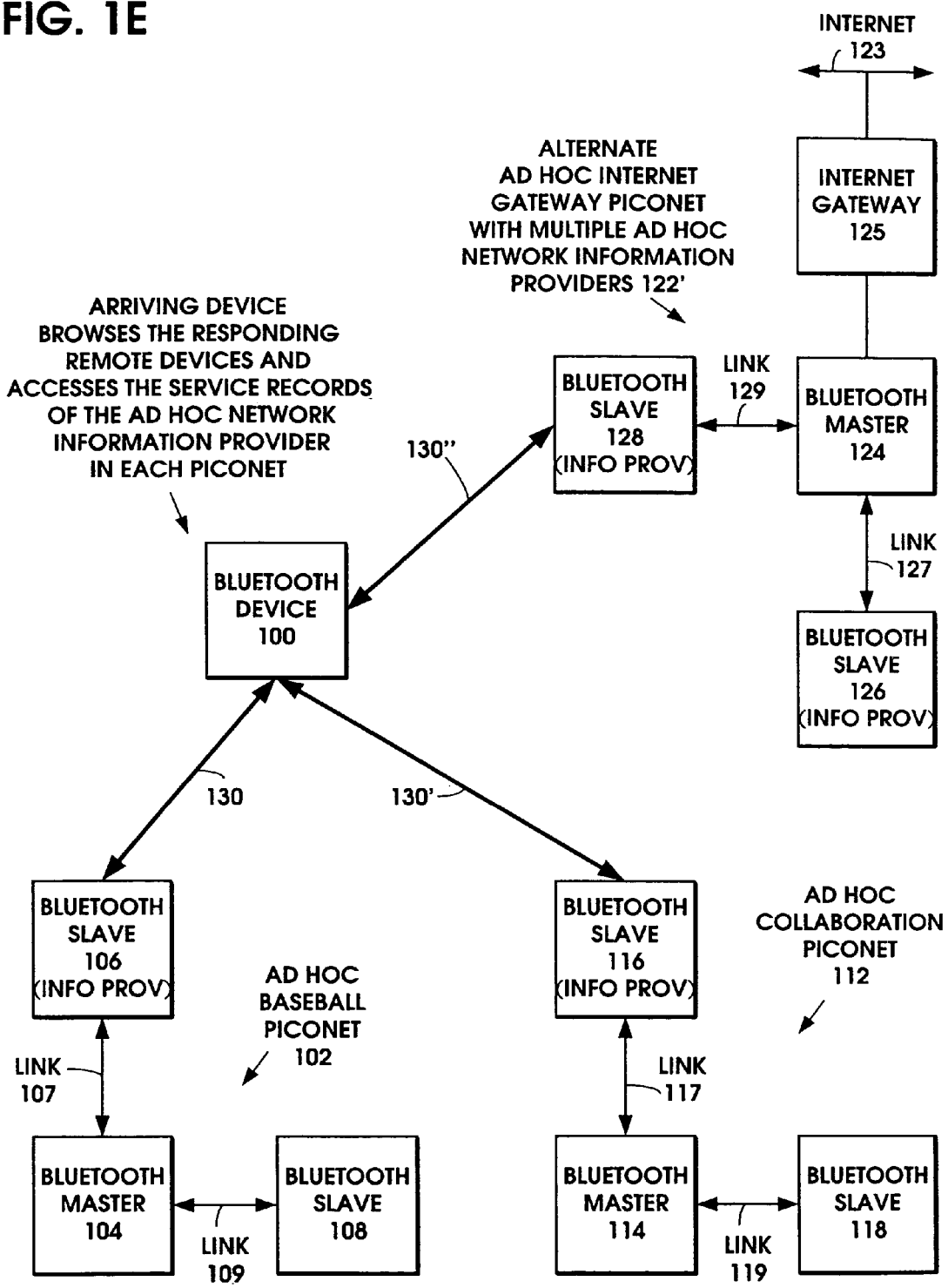
FIG. 1E is a network diagram showing an alternate embodiment of the invention, wherein an ad hoc network can have multiple ad hoc network information provider devices.
Figure 1F:
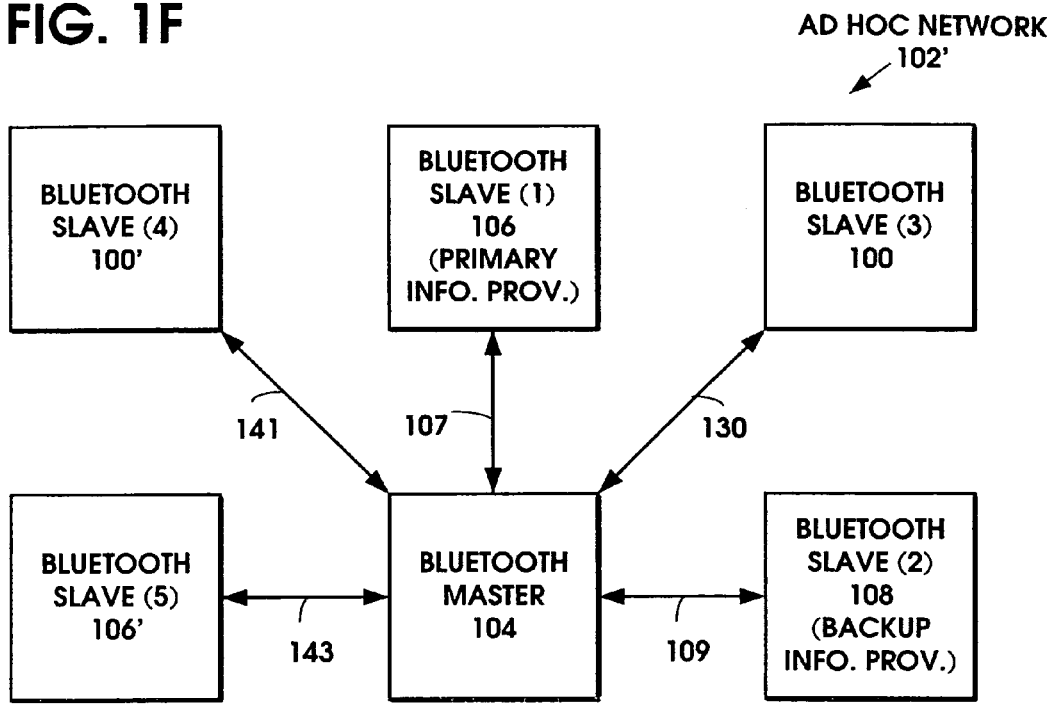
FIG. 1F is a network diagram showing in greater detail the alternate embodiment of the invention of FIG. 1E, wherein one device is a primary ad hoc network information provider device and a second device is a backup ad hoc network information provider device.

FIG. 1E is a network diagram showing an alternate embodiment of the invention, wherein an ad hoc network 102' can have multiple ad hoc network information provider devices. The alternate ad hoc Internet gateway piconet 122' has multiple ad hoc network information providers 126 and 128. FIG. 1F shows the alternate embodiment in greater detail, wherein the slave(1) device 106 is the primary ad hoc network information provider device and slave(2) device 108 is the backup ad hoc network information provider device. A primary and a secondary ad hoc network information provider are created in each ad hoc network. The backup device can serve as a hot standby that assumes the role of the primary device when the original primary device leaves the ad hoc network. Either the master device 104 or a slave device can be either the primary or the backup ad hoc network information service provider.

Figure 1G:
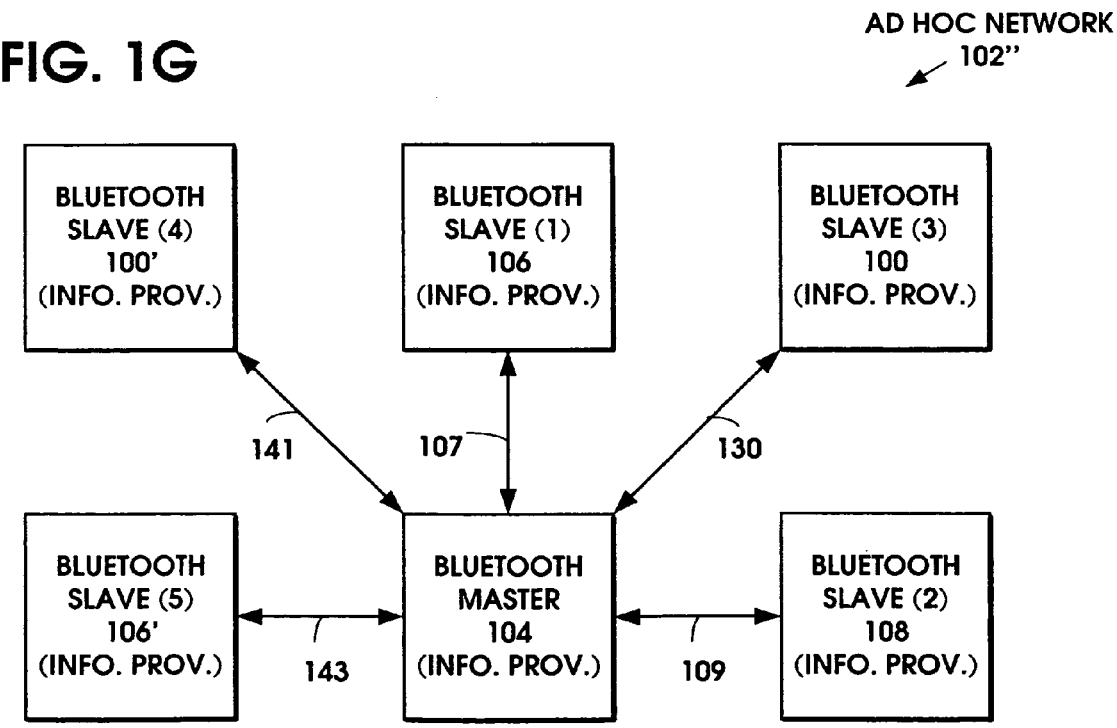
FIG. 1G is a network diagram showing in greater detail the alternate embodiment of the invention of FIG. 1E, wherein all of the devices in an ad hoc network are ad hoc network information provider devices.

FIG. 1G shows the alternate embodiment of the invention of FIG. 1E, wherein all of the devices 100, 104, 106, 108, 100' and 106' in the ad hoc network 102" are ad hoc network information provider devices. Many or all of the devices in an ad hoc network can assume the role of ad hoc network information provider. Then, when an arriving device sends an inquiry to the ad hoc network, any device can respond in the role of an ad hoc network information provider. Updated information is shared with the master device 104 and broadcast to all other slave devices 100, 106, 108, 100' and 106' in the ad hoc network over links 107, 109, 130, 141, and 143.

Each device in the ad hoc network then stores a dynamic service record in its respective SDP service registry, containing the updated information.

FIG. 2A is a functional block diagram of the arriving wireless device 100 of FIG. 1. This figure applies to all wireless standards supporting ad hoc networks. Wireless device 100 can be embodied as a laptop computer, palmtop computer, handheld personal computer, pen-based computer, personal digital assistant (PDA), handheld scanner and data collector, handheld printer, or the like. The functional block diagram of FIG. 2A shows the various program modules stored in its memory 202 for the transport protocol group 214, middleware protocol group 224, and application group 234. The memory 202 is connected by the bus 204 to the radio 206, the keypad 208, the central processor 210, and the display 212.

For the Bluetooth standard, the radio 206 operates in the 2.4 GHz ISM radio band and uses Gaussian frequency shift keying (GFSK) modulation with one symbol per bit, to provide a gross bit rate of 1 Mbps. The 2.4 GHz ISM radio band is divided into 79 channels, each being 1 MHz wide. The radio 206 operates in a frequency-hopping spread spectrum (FHSS) pattern at a rate of 1600 hops per second. The pattern of the hops is a pseudo-random pattern which is based on the device's Bluetooth Device Address (BD_ADDR) value. The radiated peak output power of the radio 206 for a class 3 Bluetooth device is approximately one milliwatt (0 dBm), giving it a maximum communicating distance of approximately 10 meters. Class 2 devices operate at 2.5 milliWatt (4 dBm). Class 1 devices operate at 100 milliWatt (20 dBm), giving them a maximum range of 100 meters.

The various program modules stored in the memory 202 of FIG. 2A are sequences of operational instructions which, when executed by the central processor 210, carry out the methods of the invention. The application group 234 includes Create Registry For New Member Of Piconet application program 280 (FIG. 3a), Initial Menu application program 300 (FIG. 3b), Ad Hoc Network Search application program 412 (FIG. 3d), Service Record Update application program 330 (FIG. 3e), Network Discovery Menu application program 340 (FIG. 3f), Network Baseball application program 320 (FIG. 3c), Network Collaboration application program 350 (FIG. 3f). Also included are active SDP service registry 600 (FIG. 5) and network discovery table 360. Also included is the Search Options List table 700, which is selected by the user from the initial menu 205 of FIG. 1. Also included is the inquiry response table 710, which lists the essential information gathered from inquiry response messages, which is performed by the link controller in the user's device 100. This information is required to make a connection with any of the responding wireless devices. Also included is the network ranking table 720. The ranked ad hoc networks are listed in the ranking table 720 of FIG. 2A. Also included is the frequency hop synchronization (FHS) packet buffer 515.

The middleware protocol group 224 includes the Service Discovery Protocol 226 and the Object Exchange 228. The transport protocol group 214 includes the Logical Link Control and Adaptation Protocol (L2CAP) 220, the Link Controller and Baseband 216, and the Link Manager 218. The Link Controller carries out link level operations over several packet durations in response to higher level commands from the Link Manager. The Baseband handles channel coding and decoding and low level timing control and management of the link within a single data packet transfer.

FIG. 2B shows an example appearance of the arriving wireless device 100. This figure applies to all wireless standards supporting ad hoc networks. It shows the ad hoc network discovery menu displayed on display 212 to the user with the discovered ad hoc networks ranked by received signal strength. The arriving device 100 determined the characteristics of the received signals from the master devices 104, 114, and 124 over the respective links 140, 140', and 140" in the respective ad hoc networks 102, 112, and 122 in FIG. 1C. The arriving device 100 then compiles the network discovery menu in the arriving device, that ranks the ad hoc networks within its range by the received signal strength or other metric of the received signal quality. The arriving device 100 forms the network discovery menu, as shown in FIG. 2B, including descriptions of ad hoc network characteristics in the multiple ad hoc networks 102, 112, and 122, such as the application programs they are running, derived from the service records and listed according to the selected attributes or ranked according to the signal characteristics. If the user did not specify characteristics of interest, then the network discovery menu ranks the ad hoc networks by the received signal quality from the master device in each respective ad hoc network. The access code for each ad hoc network is associated with each respective entry in the menu, as shown in FIG. 2B. The access code addresses the packet to the master device in the selected ad hoc network. The figure shows the ad hoc network discovery menu in the arriving device 100, with hyperlinks 235 displayed with the discovered ad hoc networks, to enable the user to quickly join a selected ad hoc network. The first ad hoc network 102 is displayed with the hyperlink "ACCESS_CODE_1". The second ad hoc network 112 is displayed with the hyperlink "ACCESS_CODE_2". The third ad hoc network 122 is displayed with the hyperlink "ACCESS_CODE_3". When the user selects an entry from the menu, the arriving device uses the access code to automatically join the selected ad hoc network. The ad hoc network discovery menu of FIG. 2B lists the ad hoc networks in the order of the ad hoc baseball piconet 102 being the strongest, the ad hoc collaboration piconet 112 being the second strongest, and the public Internet gateway piconet 122 being the third strongest in received signal quality.

Figure 2C:
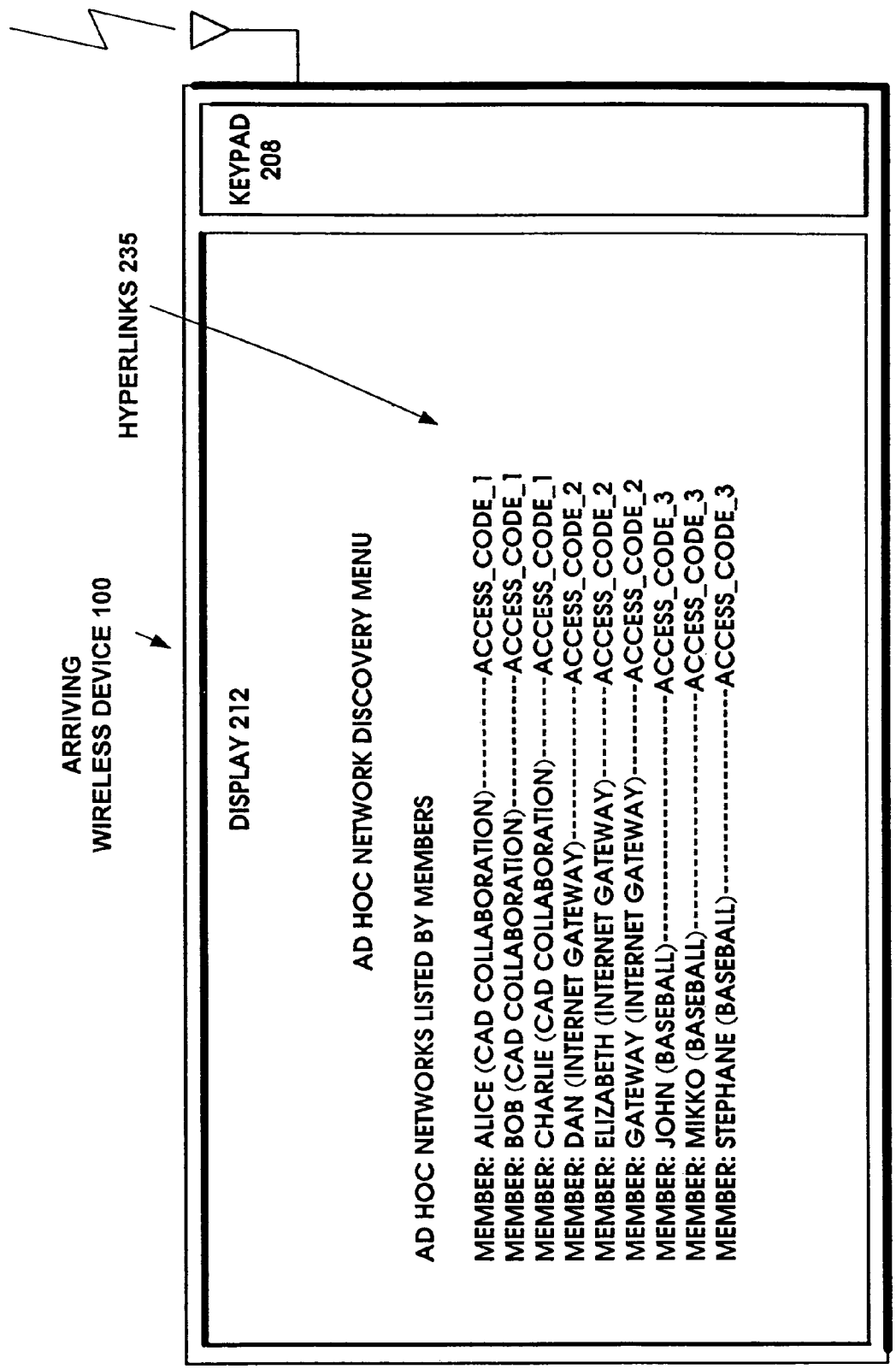
FIG. 2C shows an example appearance of the arriving wireless device 100 of FIG. 1 and the ad hoc network discovery menu displayed to the user with the discovered ad hoc networks listed by user selected characteristics, such as by member names. This figure applies to all wireless standards supporting ad hoc networks.

FIG. 2C shows an example appearance of the arriving wireless device 100. This figure applies to all wireless standards supporting ad hoc networks. It shows the ad hoc network discovery menu displayed to the user listing the discovered ad hoc networks by user selected characteristics, such as by user names. In this example, the user has selected option c-SELECT PARTICULAR SERVICE CLASS of the Initial menu 205 of FIG. 1, for example, looking for a list of all member names in the ad networks 102, 112, and 122. This preferences is used to configure the SDP service requests to the ad hoc network information providers by limiting the requests to the service class of User Names. The arriving device 100 then compiles the network discovery menu in the arriving device, that lists the ad hoc networks within its range by the names of the members in the networks. The arriving device 100 forms the network discovery menu, as shown in FIG. 2C, including descriptions of ad hoc network characteristics in the multiple ad hoc networks 102, 112, and 122, such as the application programs they are running, derived from the service records and listed according to the selected service class of User Names. The access code for each ad hoc network is associated with each respective entry in the menu, as shown in FIG. 2B. When the user selects an entry from the menu, the arriving device uses the access code to automatically join the selected ad hoc network. The ad hoc network discovery menu of FIG. 2C lists the ad hoc networks in the order of the user names, grouping them in their respective ad hoc networks.

Figure 3:
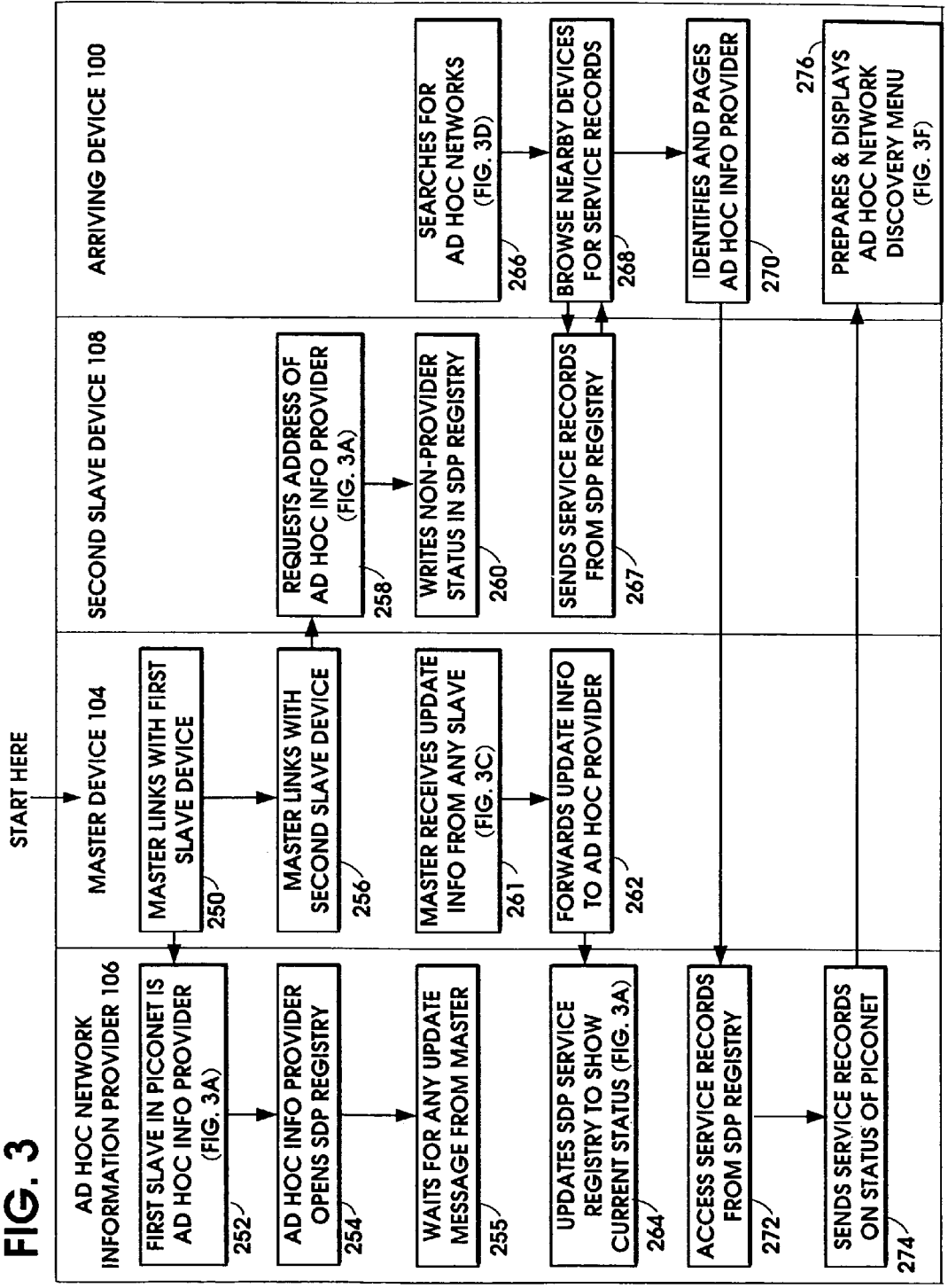
FIG. 3 is a network flow diagram of the process flow in an ad hoc network as a master Bluetooth device 104 connects with a first slave device 106 which becomes the ad hoc network information provider and connects with a second slave device 108 which is not an ad hoc network information provider. The diagram continues by showing the process flow for an arriving Bluetooth device 100 running in the ad hoc network discovery mode and interacting with the ad hoc network to prepare and display an ad hoc network discovery menu.
Figure 5:
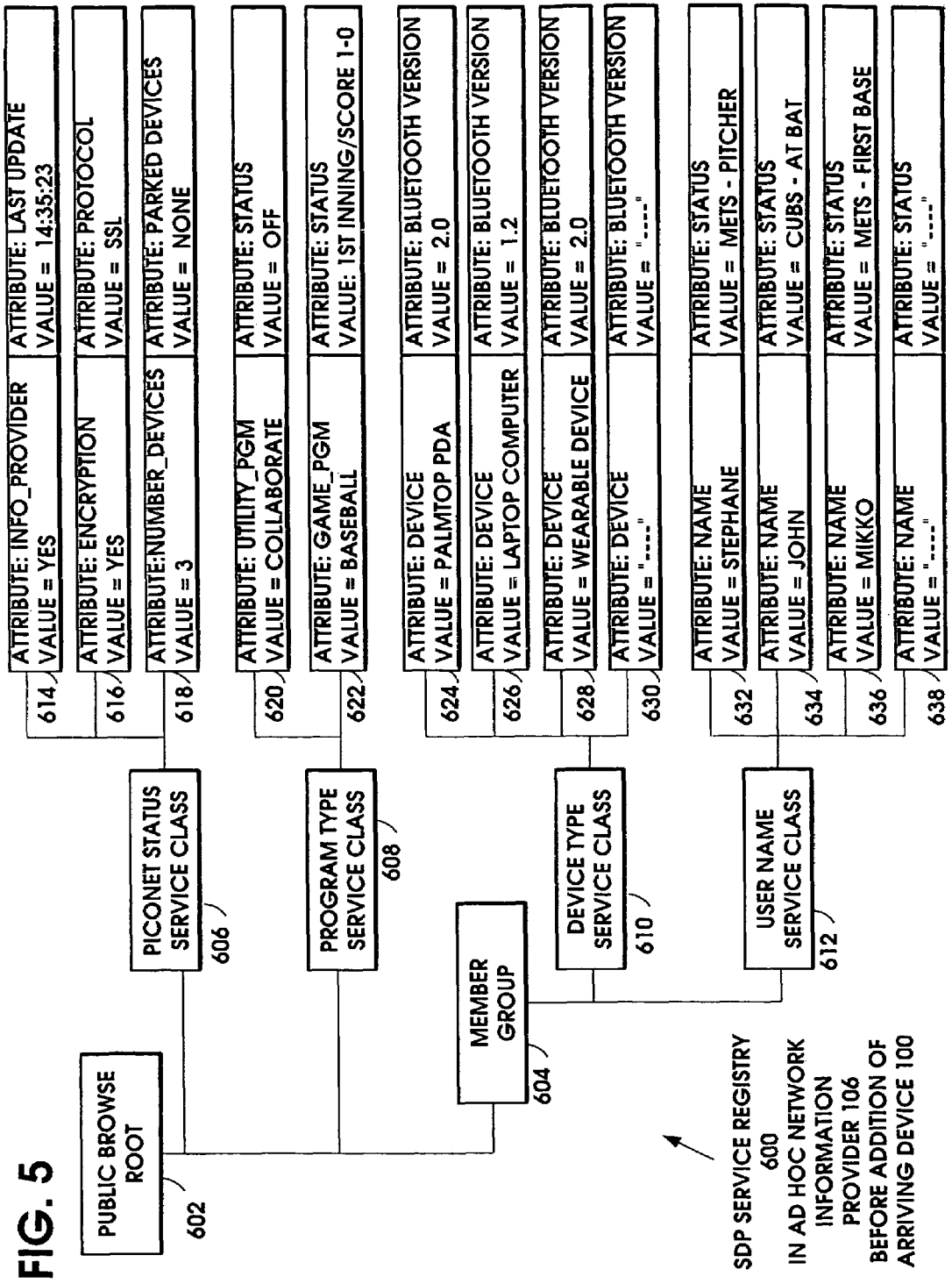
FIG. 5 shows the SDP service registry 600 in the ad hoc network information provider 106 before the addition of the arriving device 100 to the ad hoc network, as shown in FIG. 1A.

FIG. 3 is a network flow diagram of the process flow in the ad hoc network 102 as the master Bluetooth device 104 connects with a first slave device 106 which becomes the ad hoc network information provider and then connects with a second slave device 108 which is not an ad hoc network information provider. The diagram continues by showing the process flow for the arriving Bluetooth device 100 running in the ad hoc network discovery mode and interacting with the ad hoc network 102 to prepare and display an ad hoc network discovery menu. Starting at step 250 for the master device 104 in FIG. 3, when the ad hoc network 102 is initially formed between the master 104 and the first slave Bluetooth device 106, the slave assumes the role of an ad hoc network information provider for the new piconet 102, in step 252. This part of the process is shown in greater detail in the flow diagram of FIG. 3A. In step 254, the slave 106 allocates a browsing hierarchy of service classes in its SDP service registry 600, as shown in FIG. 5, and waits for any update message from the master in step 255. The service classes in the SDP service registry 600 will provide a record to characterize the ad hoc network 102. Characteristics of the ad hoc network 102 to be stored in the SDP service registry 600 can include the type of distributed application program currently running, the number of members, the identity of its members, and the like.

As additional slave devices, device 108 for example, are added to the ad hoc network 102 and participate in the distributed application of the ad hoc network 102, they contribute to altering the status of the network 102. In order to maintain a record of the current status of the ad hoc network 102, each slave device 108 sends update messages to the master device 104, as shown in step 261. This part of the process is shown in greater detail in the flow diagram of FIG. 3C. The update messages are relayed in step 262 to the ad hoc network information provider 106, to update its SDP service registry 600, as shown in step 264. This part of the process is shown in greater detail in the flow diagram of FIG. 3A. This information can be frequently updated in the SDP service registry 600 to give the current state of an activity, such as the score of a collaborative baseball game.

Step 256 shows the master 104 linking with the second slave device 108. In one embodiment, if the slave is not the first slave in the piconet, then it assumes the status of not being an ad hoc network information provider, and therefore requests the address of the ad hoc network information provider 106 in step 258. Second slave device 108 then writes in its memory the address of the ad hoc network information provider 106 and its own status as a non-provider, as shown in step 260. This part of the process is shown in greater detail in the flow diagram of FIG. 3A.

When the new Bluetooth device 100 arrives within the communication range of any member of the ad hoc network in step 266, it begins searching with inquiry messages. This part of the process is shown in greater detail in the flow diagram of FIG. 3D. The browsing signals in step 268 are answered by the second slave device 108 detecting the inquiry in step 267, in this example. Since device 108 is an ordinary slave device in the ad hoc network 102, the slave 108 responds with the address of the ad hoc network information provider 106. The arriving device 100 then pages the ad hoc network information provider in step 270 to obtain information characterizing the ad hoc network 102. The ad hoc network information provider 106 responds in step 272 with information accessed from its SDP service registry 600 characterizing the ad hoc network 102, which it returns in step 274. The invention then compiles a network discovery menu in the arriving device in step 276 of FIG. 3. This part of the process is shown in greater detail in the flow diagram of FIG. 3F. The network discovery menu lists the characteristics of the ad hoc networks within its range. When the user selects an entry from the menu, the arriving device automatically joins the selected ad hoc network.

FIG. 3A is a flow diagram of the SDP service registry creation application program 280 in a Bluetooth device, for creating the SDP service registry in the device when the device becomes a member of an ad hoc network. The diagram shows that a first occurring slave device becomes the ad hoc information provider device for the ad hoc network and that subsequent devices are not ad hoc information provider devices. In an alternate embodiment, one or more subsequent devices can also become ad hoc network information provider devices. The SDP service registry creation application program 280 begins with step 282 where the device enters connected state in a piconet and has been assigned a member number (AM_ADDR) by the master device. Then step 283 decides whether this device is the first slave (AM_ADDR=1), which in this embodiment becomes the ad hoc network information provider. If this device is the first slave, then the program writes the device's status of "AD HOC NETWORK INFORMATION PROVIDER" in two places. Step 289 writes this status in the class-of-service (CoD) field 522 of the FHS packet buffer 515 in FIG. 4B. Then Step 290 writes this status as the attribute 614 in the SDP Service Registry 600 of FIG. 5. Then step 292 allocates a browsing hierarchy of service classes in the ad hoc network information provider's SDP service registry 600, as shown in FIG. 5. An example of such service classes is:

[1] PROGRAM TYPES IN THIS PICONET
[2] MEMBERS IN THIS PICONET
[3] ENCRYPTION TYPE IN THIS PICONET
[4] NUMBER OF DEVICES IN THIS PICONET
[5] OTHER SERVICE CLASSES IN PICONET

Step 292 then flows to step 295 which transfers the program flow to the Initial Menu application program (FIG. 3B). Step 292 also flows to step 294 which is a daemon thread that waits for any update message from other devices in this piconet relayed by the master. Step 294 flows to step 296 which receives service attribute update messages relayed by master. Then step 298 updates service attributes in ad hoc network information provider SDP service registry 600. Step 298 then loops back to step 294 of the daemon thread.

If the decision in step 283 was that this device is not first slave, then the program flows to step 284 which requests the address of the ad hoc network information provider from the master device. Then step 286 writes the device's status as "non-information provider" as an attribute 646 in its SDP service registry 640 of FIG. 5A. Then step 288 writes the address of the ad hoc network information provider as an attribute 648 in its SDP service registry 640 of FIG. 5A. Step 288 then flows to step 295 which transfers the program flow to the Initial Menu application program (FIG. 3B).

FIG. 3B is a flow diagram of the initial menu application program 300 in any Bluetooth device, for creating the initial menu 205 displayed to the user for selecting the ad hoc network discovery mode as shown in FIG. 1. A sub-menu can be displayed to enable the user to select a particular device class, a particular service class, and/or a particular service attribute to search for in the remote ad hoc networks.

The user of the arriving Bluetooth device can specify the type of ad hoc network characteristics of interest. The user may be looking for services such as a printer, fax machine, or public Internet gateway. These preferences can be used to configure the inquiry by the arriving device for a specific class of device, such as a printer or fax machine. The user may be looking for applications such as distributed games or other collaborative activities. These preferences can be used to configure SDP service requests by the arriving device for generic service classes such as games or specific service attributes such as application programs or member names.

The initial menu application program 300 begins with step 302 to display the initial menu 205. An example of the initial menu 205 is:

1—TELEPHONE, INTERNET, FILE SHARING
2—NETWORK BASEBALL
3—COLLABORATION
4—AD HOC NETWORK DISCOVERY

Then step 304 waits for the user to enter a menu option selection.

If step 305 determines that the user selects option 1—TELEPHONE, INTERNET, FILE SHARING, then the program flows to step 306 to go to the telephone, Internet, file sharing sub-menu.

Figure 3C:
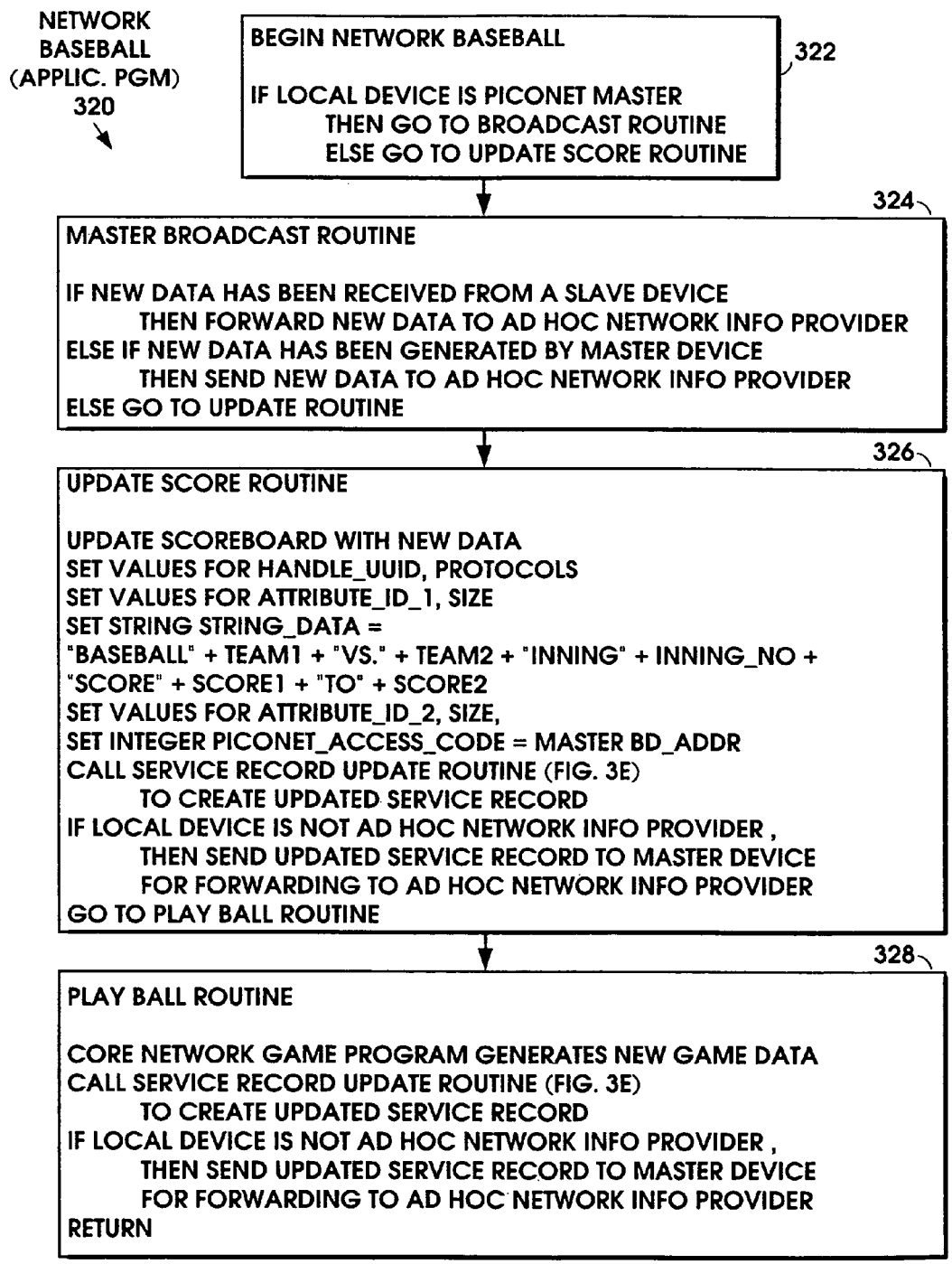
FIG. 3C is a flow diagram of an example network baseball application program 320 in a Bluetooth device, for conducting a game of network baseball in response to the user's selection from the initial menu application of FIG. 3B. The program includes a master broadcast routine to forward new data to the ad hoc network information provider, if the device is a master device. The program includes calls to an update routine shown in FIG. 3E, that creates updated service records to be sent to the master device for forwarding new data to the ad hoc network information provider.

If step 307 determines that the user selects option 2—NETWORK BASEBALL, then the program flows to step 308 go to ad hoc network baseball application program (FIG. 3C)

Figure 3D:
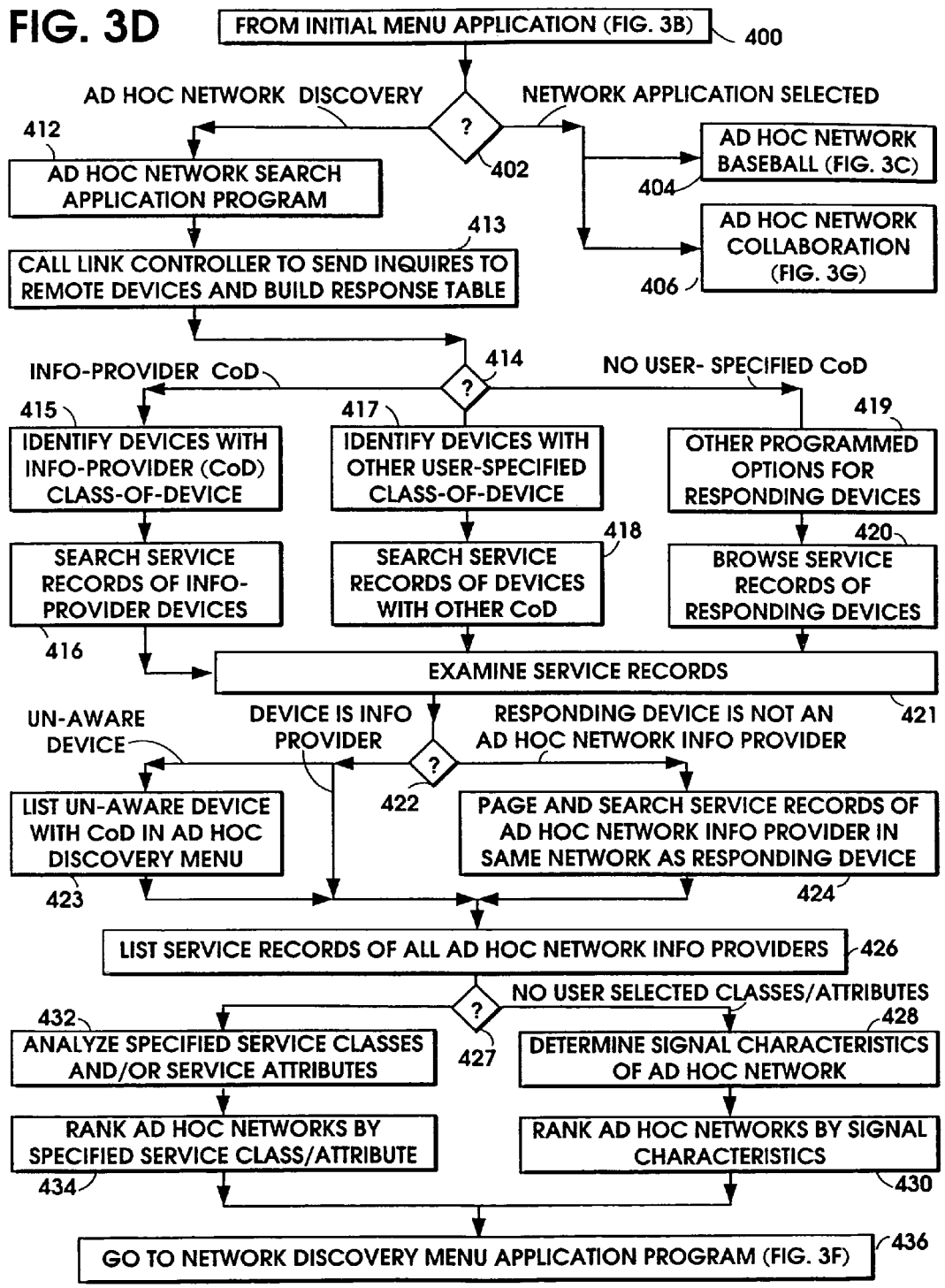
FIG. 3D is a flow diagram of the ad hoc network discovery application program 412 in a wireless device, for conducting ad hoc network discovery in response to the user's selection from the initial menu application of FIG. 3B. The program controls the interaction of the arriving wireless device 100 with remote ad hoc networks, and passes the resulting ranked list of discovered ad hoc networks to the ad hoc network discovery menu program of FIG. 3F. This figure applies to all wireless standards supporting ad hoc networks.
Figure 3G:
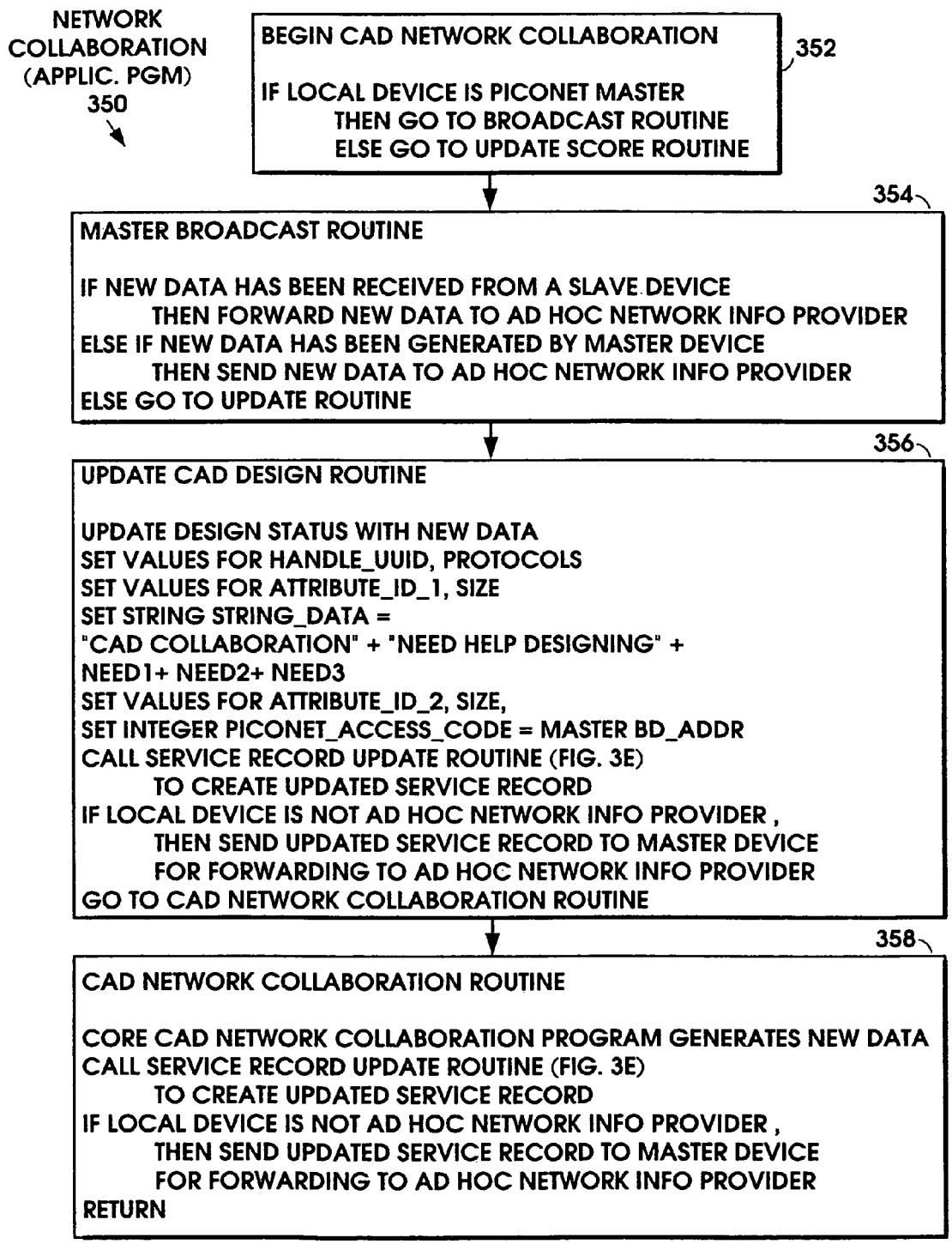
FIG. 3G is a flow diagram of an example network collaboration application program 350 in a Bluetooth device, for conducting a network collaboration session in response to the user's selection from the initial menu application of FIG. 3B. The program includes a master broadcast routine to forward new data to the ad hoc network information provider, if the device is a master device. The program includes calls to an update routine shown in FIG. 3E, that creates updated service records to be sent to the master device for forwarding new data to the ad hoc network information provider.

If step 309 determines that the user selects option 3—COLLABORATION, then the program flows to step 310 to go to the ad hoc network collaboration application program (FIG. 3G)

If step 311 determines that the user selects option 4—AD HOC NETWORK DISCOVERY, then the program flows to step 312 to display the sub-menu. The sub-menu has six choices:

a—SELECT ALL AD HOC NETWORKS
b—SELECT PARTICULAR DEVICE CLASS
c—SELECT PARTICULAR SERVICE CLASS
d—SELECT PARTICULAR SERVICE ATTRIBUTE
e—SELECT CLASSES OF DEVICES TO BE BLOCKED
f—QUICK SEARCH

Step 315 determines if b—SELECT PARTICULAR DEVICE CLASS, c—SELECT PARTICULAR SERVICE CLASS, d—SELECT PARTICULAR SERVICE ATTRIBUTE, or e—SELECT CLASSES OF DEVICES TO BE BLOCKED was selected. If it was, then step 318 sets the class or attribute to the user's keypad entry and the program flows to the ad hoc network search application program (FIG. 3D). If Step 315 determines that "ALL NETWORKS" was selected, then step 316 sets both attribute and class to NULL and the program flows to the ad hoc network search application program (FIG. 3D). The user is given a "QUICK SEARCH" option in the initial menu 205 displayed on the device 100 of FIG. 1, which checks the data gathered in the inquiry response table 710 to determine whether the class-of-device (CoD) field 522 for a responding device has the status of "AD HOC NETWORK INFORMATION PROVIDER".

FIG. 3C is a flow diagram of an example network baseball application program 320 in a Bluetooth device, for conducting a game of network baseball in response to the user's selection from the initial menu application of FIG. 3B. The program includes a master broadcast routine 324 to forward new data to the ad hoc network information provider, if the device is a master device. The program includes an update score routine 326 to call an update routine shown in FIG. 3E, that creates updated service records to be sent to the master device for forwarding new data to the ad hoc network information provider. The program includes a play ball routine which is the core game program that generates new game data and calls the update routine shown in FIG. 3E to creates updated service records to be sent via the master device to the ad hoc network information provider.

The network baseball application program 320 begins with step 322 which determines that if the local device is a piconet master, then the program flows to the broadcast routine 324, otherwise it flows to update score routine 326.

The master broadcast routine 324 functions if the instant device is a master device. The master broadcast routine 324 determines if new data has been received from a slave device, and if it has, then the program forwards the new data to the ad hoc network information provider. If the new data has been generated by the master device, then the program sends the new data to the ad hoc network information provider. Otherwise the program flows to the update routine 326.

The update score routine 326 updates the game scoreboard with new data concerning the score. The routine then calls service record update routine (FIG. 3E) to create an updated service record. If the local device is not the ad hoc network info provider, then the program sends the updated service record to the master device for forwarding to the ad hoc network information provider. The update score routine 326 then flows to the play ball routine 328.

The play ball routine 328 contains the core network game program that generates new game data. The program then calls the service record update routine (FIG. 3E) to create updated service records. If the local device is not the ad hoc network info provider, then the program sends the updated service record to the master device for forwarding to the ad hoc network info provider.

FIG. 3D is a flow diagram of the ad hoc network discovery application program 412 in a wireless device. This figure applies to all wireless standards supporting ad hoc networks. The ad hoc network discovery application program 412 conducts ad hoc network discovery in response to the user's selection from the initial menu application of FIG. 3B. The program controls the interaction of the arriving wireless device 100 with remote ad hoc networks, and passes the resulting ranked list of discovered ad hoc networks to the ad hoc network discovery menu program of FIG. 3F.

The user of the arriving wireless device can specify the type of ad hoc network characteristics of interest. The user may be looking for services such as a printer, fax machine, or public Internet gateway. These preferences can be used to configure the inquiry by the arriving device for a specific class of device (CoD), such as a printer or fax machine. The user may be looking for applications such as distributed games or other collaborative activities. These preferences can be used to configure SDP service requests by the arriving device for generic service classes such as games or specific service attributes such as application programs or member names.

If the arriving device comes within the communications range of several ad hoc networks, it gathers information characterizing each ad hoc network from the respective ad hoc network information providers. The invention then compiles a network discovery menu in the arriving device, that lists the characteristics of the ad hoc networks within its range. The network discovery menu lists the characteristics of each responding ad hoc network, in accordance with the type of characteristics of interest. If the user did not specify characteristics of interest, then the network discovery menu ranks the ad hoc networks by the received signal quality from the master device in each respective ad hoc network. The access code for each ad hoc network is associated with each respective entry in the ad hoc network discovery menu. When the user selects an entry from the menu, the arriving device automatically joins the selected ad hoc network.

The ad hoc network discovery application program 412 of FIG. 3D has its entry point from the initial menu application (FIG. 3B) at step 400. The decision step 402 determines whether a network application has been selected, such as the network baseball or collaboration program. If it has, then the program flows to the selected step 404 or 406. Step 404 goes to the ad hoc network baseball application program of FIG. 3C. Step 406 goes to the ad hoc network collaboration application program of FIG. 3G. Both the ad hoc network baseball application program and the ad hoc network collaboration application program make calls to the service record update application program of FIG. 3E and send updated records to the master for relay to the ad hoc network information provider.

If the decision step 402 of FIG. 3D determines that the ad hoc network discovery option has been selected by the user, then the program flows to step 412 to begin the ad hoc network search program. Step 413 calls the link controller to send inquiries to remote wireless devices in the area and to build the inquiry response table 710. At any particular time a Bluetooth device is in one of several different states. Currently the user's device 100 is in the standby state, it is inactive, no data is being exchanged, and the radio 206 is not on. Step 413 invokes the link controller enter the inquiry state and to begin the process of attempting to discover all Bluetooth devices in the ten meter communications range. The device 100 begins to periodically transmit inquiry packets. FIG. 4A shows the Bluetooth packet structure for an inquiry packet 500 sent by user's arriving device 100. The general inquiry access code (GIAC) of the packet 500 is recognized by all Bluetooth devices as an inquiry message.

During the inquiry procedure invoked by step 413 of FIG. 3D, any other wireless devices that are in the inquiry scan state, are scanning for the receipt of inquiry packets 500. If a remote wireless device in the inquiry scan state receives the inquiry packet 500, it will respond with an inquiry response packet 510 that has sufficient information to enable the user's inquiring device 100 to build the inquiry response table 710 of essential information required to make a connection. Any remote wireless device recognizing inquiry packet 500 can respond. FIG. 4B shows the Bluetooth frequency hop synchronization (FHS) packet structure for an inquiry response packet 510. The example shown is the packet 510 sent by ad hoc network information provider 106 in FIG. 1A. FIG. 4B also shows the FHS packet buffer 515 in which the packet 510 has been constructed by device 106. As discussed for FIG. 3A, whenever a wireless device becomes an ad hoc network information provider, step 289 writes into the class-of-device (CoD) field 522 of its FHS packet buffer 515, its new status as "AD HOC NETWORK INFORMATION PROVIDER".

In step 413 of FIG. 3D, the user's inquiring device 100 constructs the inquiry response table 710 with the information in the inquiry response packets 510 received from responding devices, such as device 106. The inquiry response table 710 shows the essential information gathered by the link controller in the user's inquiring device 100, which is required to make a connection with any of the responding wireless devices. Any responding devices are flagged, such as device 106, that have a class-of-device (CoD) field 522 with the status of "AD HOC NETWORK INFORMATION PROVIDER".

There are several options that can be programmed for the decision step 414 of FIG. 3D, for processing the data gathered in the inquiry response table 710. Decision step 414 can be programmed to determine whether the class-of-device (CoD) field 522 for a responding device has the status of "AD HOC NETWORK INFORMATION PROVIDER". If so, then step 415 flows to step 416 to search the service records of the ad hoc network information provider. Since an analysis of the class-of-device (CoD) field 522 only requires an inquiry response packet 510 of FIG. 4B, and does not require the completion of a connection between the two devices, this option provides a quick search of responding devices. The user is given a "QUICK SEARCH" option in the initial menu 205 displayed on the device 100 of FIG. 1, which invokes step 415 to check the data gathered in the inquiry response table 710 to determine whether the class-of-device (CoD) field 522 for any responding device has the status of "AD HOC NETWORK INFORMATION PROVIDER".

Decision step 414 can be programmed to determine whether the class-of-device (CoD) field 522 for a responding device has another type of user-specified class-of-device (CoD) indicated in field 522 that matches an entry in the search options list table 700. If so, then step 417 flows to step 418 to search the service records of the other class of device. This option can be taken, for example, where the inquiring user has specified in the search options list table 700 that he/she wants to search for a class of device such as "PHOTOCOPIER". An optional program branch can be executed at this point for optional special processing of the service records from such a responding device. Thus, any devices with a desired class-of-device of "PHOTOCOPIER" would be is passed to step 418. In this example, none are found.

Decision step 414 can be programmed to determine whether the class-of-device (CoD) field 522 for a responding device has no user-specified class-of-device (CoD) indicated in field 522 that matches an entry in the search options list table 700. If so, then the user's device 100 can be programmed in step 420 to browse the service records of that device. This is a useful option where there is a chance that some ad hoc network information provider devices will have over-written the status value stored in their class-of-device field 522. An alternate program option is to allow step 420 to browse all responding the devices, without regard to the class-of-device (CoD) indicated in field 522.

Decision step 414 can be programmed to determine whether the user has specified a class-of-device (CoD) to be blocked. If a class-of-device has been specified to be blocked, then the program identifies any devices listed in the Search Options List 700 as having the blocked class-of-device. Any devices responding to the inquiry that have a class-of-device (CoD) matching one of the blocked CoDs specified by the user, is ignored. Thus, in the example above, any devices with a blocked class-of-device of "PRINTERS", "FAX MACHINES", or ADVERTISEMENTS" is ignored.

The requesting wireless device 100 goes through the steps 416, 418, and 420 of FIG. 3D, of searching and/or browsing for services in the SDP service records in the responding device 106. As was described above with respect to FIG. 3A, the ad hoc network information provider device 106 has constructed the SDP service registry 600 which stores service records in a browsing hierarchy as shown in FIG. 5. The service records are arranged into a hierarchy structured as a tree which can be browsed. The requesting device 100 can begin by examining the public browse root 602, and then follow the hierarchy out to service classes which are the branches of the tree, and from there to the leaf nodes, where individual services are described in service records. To browse service classes or to get specific information about a service, the requesting device 100 and the responding device 106 exchange messages carried in SDP packets. There are two types of SDP packets discussed here, the SDP Service Search Attribute Request packet 560 shown in FIG. 4E and the SDP Service Search Attribute Response packet 570 shown in FIG. 4F. The SDP Request packet 560 carries the SDP Service Search Attribute Request 567 which includes a service search pattern 568 and an attribute ID list 569. The service search pattern 568 is the description of the pattern for the responding device 106 to match in its registry 600 of FIG.

5. If the responding device 106 has the service requested, it responds with the service's handle. The service handle identifies the service for which the attributes are being requested. The attribute ID list 569 identifies the attributes that the requesting device 100 is requesting. The SDP response packet 570 returned by the responding device 106 in FIG. 4F, carries the SDP Service Search Attribute Response 577 which includes a service record handle list 578 and the attributes 579. The service record handle list 578 and the attributes 579 are then passed to step 421 of FIG. 3D, where the attributes for "INFO_PROVIDER" are examined to determine whether the responding device 106 in an ad hoc network information provider in a piconet. It is seen in FIG. 4F that the attribute 614" indicates that responding device 106 is in fact an ad hoc network information provider.

Steps 416, 418, and 420 of FIG. 3D, flow to step 421 which examines the service records to identify whether the responding device is an ad hoc network information provider for its respective piconet. If decision step 422 determines that the responding device 106 is an ad hoc network information provider, as specified in attribute 614 of the registry 600 of FIG. 5, then the program passes to step 426. Alternately, if decision step 422 determines that the responding device 108 is not an ad hoc network information provider, as specified in attribute 646 of the registry 640 of FIG. 5A, then step 424 uses the address of the ad hoc network information provider 106 provided in attribute 648 of FIG. 5A, which is in the same piconet as the responding device 108, to page the ad hoc network information provider 106 to obtain and search its SDP service records in its registry 600 of FIG. 5. Step 424 flows to step 426 which lists the service records of all ad hoc network information providers 106, 116, and 126 in the responding piconets. Step 426 lists the service records accessed from service registries 600, 600A, and 600B in FIGS. 5, 6A, and 6B, respectively.

In an alternate embodiment of the invention, the address of the Information Provider device in a new ad hoc network can be a default address. For example, when the invention in embodied in the Bluetooth Standard, IEEE 802.11 Wireless LAN Standard, or the HIPERLAN Type 2 Wireless LAN Standard, the Information Provider device in a new ad hoc network can have a default address to allow mobile stations to locate and identify the information provider device in an ad hoc network. The default address is known to every arriving device. For example, in the Bluetooth Standard, the default address can be the address of the first slave in the ad hoc network. As another example, in the IEEE 802.11 Wireless LAN Standard, the default address can be the address of the first device or alternately the second device in the ad hoc network. As still another example, in the HIPERLAN Type 2 Wireless LAN Standard the default address can be the address of the central controller device or alternately the second device in the ad hoc network. When an arriving device is close enough to the ad hoc network to either receive a periodic beacon signal from a device in that network or alternately to receive a response to its inquiry, the arriving device will know the default address of the information provider device in that network. If the arriving device is running the ad hoc network discovery menu option, then the arriving device can directly address a request to the information provider using the default address, to obtain the service records characterizing the ad hoc network.

Alternately, if decision step 422 of FIG. 3D, determines that the responding device is not aware of the ad hoc network provider invention, then the program flows to step 423. An Un-Aware wireless device does not have knowledge of the information provider feature. When an Un-Aware device receives the SDP service search attribute request of FIG. 4E from the user's arriving device 100, the attribute ID request list 569 includes the UUID: INFO_PROVIDER attribute 614'. The Un-Aware device does not have this attribute in its service registry, and thus it will respond with an SDP Error-Response that the request contained an invalid ServiceRecordHandle. The user's arriving device 100 will detect this in 421. Then the program flows to step 423 where the responding device can be listed with whatever information can be derived from its inquiry response packet 510 of FIG. 4B, including its Class-of-Device (CoD), such as "Fax_Machine" or "Printer". This information can be listed with the designation "Un-Aware Device", in the Ad Hoc Network Discovery Menu. If there are some general UUIDs that can be formulated by the user's device 100 in a subsequent SDP service search attribute request 560 of FIG. 4E, then step 423 can retry another service request. If the retried service request results in receiving more informative attributes from the Un-Aware device in a response packet 570 of FIG. 4F, then step 423 can also have them listed in the Ad Hoc Network Discovery Menu.

Then decision step 427 determines whether the user has specified any service classes or service attributes of interest. If the user has specified any service classes or service attributes, then step 432 analyzes the specified service classes or service attributes and step 434 ranks the ad hoc networks by the specified service classes or service attributes. The ranked ad hoc networks are listed in the ranking table 720 of FIG. 2A.

Alternately, if the user has not specified any service classes or service attributes, then step 428 determines the quality of the signal characteristics of the ad hoc network master devices in the responding piconets. The quality of the signal characteristics can be measured by the received signal strength, the bit error rate, or other quality of service (QoS) metrics. Then step 430 ranks the ad hoc networks by the quality of service (QoS) metrics. The ranked ad hoc networks are listed in the ranking table 720 of FIG. 2A. Both step 430 and 434 flow to step 436 in which the program flows to the ad hoc network discovery menu application program of FIG. 3F.

Examples of the metric used to rank the ad hoc networks by the received signal quality include Bit Error Rate accumulated over time, Packet Error Rate accumulated over time, received signal strength, link quality measurements, continuous-wave interference (for example, from microwave ovens or sodium vapor street lights), co-channel interference, clear channel assessment (collision avoidance), collisions per unit time, retry counts, and frames canceled per unit time.

FIG. 3E is a flow diagram of the service record update routine 330 in any Bluetooth device, that creates updated service records to be sent to the master device for forwarding new data to the ad hoc network information provider.

As additional slave devices are added to the ad hoc network and participate in the distributed application of the ad hoc network, they contribute to altering the status of the network. In order to maintain a record of the current status of the ad hoc network, each slave device sends update messages to the master device which are relayed to the ad hoc network information provider, to update its SDP service registry. This information can be frequently updated in the SDP service registry to give the current state of an activity, such as the score of a collaborative baseball game.

The service record update routine 330 is called by the network baseball application program 320 and the network collaboration application program 350.

The service record update routine 330 SETs VALUES received from the network baseball application program 320 and the network collaboration application program 350 in a format that complies with the SDP service record format. The program then writes updated service records to local SDP service registry in the required format.

FIG. 3F is a flow diagram of the ad hoc network discovery menu program 340 in a Bluetooth device, for receiving the resulting ranked list of discovered ad hoc networks from the ad hoc network discovery application program 412 of FIG. 3D and displaying the ad hoc network discovery menu shown in FIG. 2C.

If the arriving device comes within the communications range of several ad hoc networks, it gathers information characterizing each ad hoc network from the respective ad hoc network information providers. The invention then compiles a network discovery menu in the arriving device, that lists the characteristics of the ad hoc networks within its range. The network discovery menu lists the characteristics of each responding ad hoc network, in accordance with the type of characteristics of interest. If the user did not specify characteristics of interest, then the network discovery menu ranks the ad hoc networks by the received signal quality from the master device in each respective ad hoc network. The access code for each ad hoc network is associated with each respective entry in the menu. When the user selects an entry from the menu, the arriving device automatically joins the selected ad hoc network.

The ad hoc network discovery menu program 340 begins by displaying the ad hoc network discovery menu. The example menu shown in FIG. 3F is:

| OPTION | STRING |
|---|---|
| 1 | "BASEBALL CUBS VS. METS 3RD INNING SCORE 2 TO 2" |
| 2 | "CAD COLLABORATION NEED HELP DESIGNING BRIDGE TRUSS" |
| 3 | "INDIVIDUALS CONNECTED TO INTERNET GATEWAY DEVICE" WAIT FOR SELECTION |

The ad hoc network discovery menu program 340 waits for the user to make a selection of one of the options. If the user selects option 1, for example, then the program sends a page to the ad hoc baseball piconet master device using ad hoc baseball piconet_access_code, in order to join the ad hoc baseball piconet. If the user selects option 2, for example, then the program sends a page to the ad hoc collaboration piconet master device using ad hoc collaboration piconet_access_code, in order to join the ad hoc collaboration piconet. If the user selects option 3, for example, then the program sends a page to the ad hoc Internet gateway piconet master device using ad hoc Internet gateway piconet_access_code, in order to join the ad hoc Internet gateway piconet.

FIG. 3G is a flow diagram of an example network collaboration application program 350 in a Bluetooth device, for conducting a network collaboration session in response to the user's selection from the initial menu application of FIG. 3B. The program includes a master broadcast routine to forward new data to the ad hoc network information provider, if the device is a master device. The program includes calls to an update routine shown in FIG. 3E, that creates updated service records to be sent to the master device for forwarding new data to the ad hoc network information provider.

The program includes a master broadcast routine 354 to forward new data to the ad hoc network information provider, if the device is a master device. The program includes an update CAD design routine 356 to call the update routine shown in FIG. 3E, that creates updated service records to be sent to the master device for forwarding new data to the ad hoc network information provider. The program includes a CAD network collaboration routine which is the core program that generates new data and calls the update routine shown in FIG. 3E to creates updated service records to be sent via the master device to the ad hoc network information provider.

The network collaboration application program 350 begins with step 352 which determines that if the local device is a piconet master, then the program flows to the broadcast routine 354, otherwise it flows to update score routine 356.

The master broadcast routine 354 functions if the instant device is a master device. The master broadcast routine 354 determines if new data has been received from a slave device, and if it has, then the program forwards the new data to the ad hoc network info provider. If the new data has been generated by the master device, then the program sends the new data to the ad hoc network info provider. Otherwise the program flows to the update routine 356.

The update CAD design routine 356 updates the design status with new data concerning the CAD design activity. The routine then calls service record update routine (FIG. 3E) to create an updated service record. If the local device is not the ad hoc network info provider, then the program sends the updated service record to the master device for forwarding to the ad hoc network info provider. The update score routine 356 then flows to the CAD network collaboration routine 328.

The CAD network collaboration routine 358 contains the core network program that generates new CAD design data. The program then calls the service record update routine (FIG. 3E) to create updated service records. If the local device is not the ad hoc network info provider, then the program sends the updated service record to the master device for forwarding to the ad hoc network info provider.

FIG. 4A shows the Bluetooth packet structure for an inquiry packet sent by the user's device 100. In the user's inquiring device 100, its link controller 216 is called to send inquiries to other Bluetooth devices in the area, such as the information provider device 106, and to build an inquiry response table 710 of FIG. 2A. At any particular time a Bluetooth device is in one of several different states. If the user's inquiring device 100 is in the standby state, it is inactive, no data is being exchanged, and its Bluetooth radio 206 is not on. Its link controller 216 is invoked to enter the inquiry state and to begin the process of attempting to discover all Bluetooth devices in the ten meter communications range. The user's inquiring device 100 begins to periodically transmit inquiry packets. FIG. 4A shows the Bluetooth packet structure for an inquiry packet 500 sent by the user's inquiring device 100 to all other devices in the vicinity. The general inquiry access code (GIAC) of the packet 500 is recognized by all Bluetooth devices as an inquiry message.

During the inquiry procedure, any other Bluetooth devices that are in the inquiry scan state, such as the information provider device 106, are scanning for the receipt of inquiry packets 500. If the information provider device 106 in the inquiry scan state receives the inquiry packet 500, it will respond with an inquiry response packet 510 that has sufficient information to enable the user's inquiring device 100 to build its inquiry response table 710 of essential information required to make a connection. Any Bluetooth device recognizing inquiry packet 500 can respond. FIG. 4B shows the Bluetooth frequency hop synchronization (FHS) packet structure for an inquiry response packet 510 sent by the ad network information provider device 106. FIG. 4B also shows the packet buffer 515 of FIG. 2A, in which the packet 510 has been constructed by the ad network information provider device 106. The FHS packet structure for an inquiry response packet 510 sent by the ad network information provider device 106 includes the access code field 512, the header which includes the slave member number field 514 in which AM_ADDR is no yet assigned and is set to zero, the type field 516 and the parity field 518. Another the slave member number field 524 also has AM_ADDR set to zero. Field 522 contains the ad network information provider device's class-of-device (CoD) information. In accordance with the invention, field 522 specifies that the responding device is an ad network information provider device for its respective piconet.

There are two important fields in the FHS packet structure for an inquiry response packet 510, that provide essential information about the ad network information provider device 106 that enable the user's inquiring device 100 to the make a connection to the ad network information provider device 106: Field 520 which contains the ad network information provider device 106 BD_ADDR and field 526 which contains the ad network information provider device 106 current clock value.

The user's device 100 can now initiate a connection with the ad network information provider device 106. The device 100 uses the information provided in the inquiry response packet 510, to prepare and send a paging message to the ad network information provider device 106. To establish a connection, the user's paging device 100 must enter the page state. The user's device 100 invokes the link controller 216 to enter the page state, where it will transmit paging messages to the ad network information provider device 106 using the access code and timing information acquired from the inquiry response packet 510. The ad network information provider device 106 must be in the page scan state to allow the user's paging device 100 to connect with it. Once in the page scan state, the ad network information provider device 106 will acknowledge the paging messages and the user's paging device 100 will send a paging packet 530 shown in FIG. 4C, which provides the clock timing and access code of the paging device 100 to the ad network information provider device 106. The ad network information provider device 106 responds with a page acknowledgment packet 550 shown in FIG. 4D. This enables the two devices to form an asynchronous connection-less (ACL) link and both devices transition into the connection state.

When the user's device 100 sends a paging message to the ad network information provider device 106, it sends the FHS paging packet 530 of FIG. 4C. The FHS paging packet 530 must have sufficient information about the user's device 100 to enable the ad network information provider device 106 to synchronize itself with the clock of the user's device 100. Since the user's device 100 has initiated the page, it will be the master device in the new piconet being formed by the two devices. Importantly, the ad network information provider device 106, which will become the slave to the user's device 100, must also know the user device's BD_ADDR, since it is the master device's address that is used in the piconet access code for the new piconet being formed by the two devices. FIG. 4C shows the Bluetooth frequency hop synchronization (FHS) packet structure for the paging packet 530 sent by the user's device 100. It is the FHS packet buffer 515 of FIG. 2A, in which the packet 530 has been constructed by the user's device 100. The FHS packet structure for a paging packet 530 sent by the user's device 100 includes the access code field 532 which contains the ad network information provider device's BD_ADDR, the header which includes the slave member number field 534 in which AM_ADDR is now assigned the value of one, the type field 536 and the parity field 538. Another the slave member number field 544 also has AM_ADDR set to one. Field 542 contains the user device's class-of-device (CoD) information.

There are two important fields in the FHS packet structure for the paging packet 530, that provide the essential information about the user's device 100 that enables the ad network information provider device 106 to the make the connection to the user's device: Field 540 which contains the user's BD_ADDR and field 546 which contains the user's current clock value.

FIG. 4D shows the Bluetooth packet structure for a page acknowledgment packet 550 sent by the ad network information provider device 106 back to the user's device 100. Packet 550 includes the access code field 552 for the user's device 100 and the header which contains field 554 with the slave member number AM_ADDR set to one for the ad network information provider device 106. Field 556 is null. The access code field 552 that the ad network information provider device 106 returns to the user's device 100 contains a synchronization word that includes the lower address part (LAP) of the user's BD_ADDR.

FIG. 4E shows the Bluetooth packet structure for SDP service search attribute request packet 560 sent by arriving device 100 to ad hoc network information provider 106. The SDP Request packet 560 carries the SDP Service Search Attribute Request 567 which includes a service search pattern 568 and an attribute ID list 569. The service search pattern 568 is the description of the pattern for the responding device 106 to match in its service registry 600 of FIG. 5. If the responding device 106 has the service requested, it responds with the service's handle. The service handle identifies the service for which the attributes are being requested. The attribute ID list 569 identifies the attributes that the requesting device 100 is requesting. The user's device 100 is requesting specific information in the "PICONET STATUS" service class 606' of the responding device 106, by specifying the UUID: "INFO PROVIDER" 614'. The UUID is the Universally Unique Identifier, a 128-bit expression representing the name of the service. In this case the UUID represents "PICONET STATUS". A client looking for a service specifies the UUID associated with that class of service, or with a specific service, in its service search request. The service provider responds by matching that UUID against those UUIDs of the services it has available.

The Bluetooth packet structure for SDP service search attribute request packet of FIG. 4E includes the access code field 563, the header 561 that includes the AM_ADDR field 564 of the slave device that is set equal to one and the ACL field 564', and the SDP Protocol Data Unit Field 562. The SDP Protocol Data Unit Field 562 includes the PDU ID field 565, the transaction ID field 565', the length field 566, and the SDP service search attribute request field 567.

FIG. 4F shows the Bluetooth packet structure 570 for response to SDP service search attribute request, response sent by ad hoc network information provider 106 to arriving device 100. The SDP response packet 570 returned by the responding device 106 in FIG. 4F, carries the SDP Service Search Attribute Response 577 which includes a service record handle list 578 and the attributes 579 accessed from service registry 600 of FIG. 5. The service record handle list 578 and the attributes 579 are then passed to step 421 of FIG. 3D, where the attributes for "INFO_PROVIDER" are examined to determine whether the responding device 106 is an ad hoc network information provider in a piconet. It is seen in FIG. 4F that the attribute 614" named "INFO_PROVIDER" has a value of "YES", which indicates that responding device 106 is in fact an ad hoc network information provider.

The Bluetooth packet structure for SDP service search attribute response packet of FIG. 4F includes the access code field 573, the header 571 that includes the AM_ADDR field 574 of the slave device that is set equal to one and the ACL field 574', and the SDP Protocol Data Unit Field 572. The SDP Protocol Data Unit Field 572 includes the PDU ID field 575, the transaction ID field 575', the length field 576, and the SDP service search attribute response field 577.

FIG. 4G shows the Bluetooth packet structure for SDP service search attribute request packet 580 sent by arriving device 100 to ad hoc network information provider 106. Field 582 contains the service search pattern 584 and the attribute ID list 586 for the "User Name" service class 612'. The SDP Request packet 580 carries the SDP Service Search Attribute Request 582 which includes a service search pattern 584 and an attribute ID list 586. The service search pattern 584 is the description of the pattern for the responding device 106 to match in its service registry 600 of FIG. 5. If the responding device 106 has the service requested, it responds with the service's handle. The service handle identifies the service for which the attributes are being requested. The attribute ID list 586 identifies the attributes that the requesting device 100 is requesting. The user's device 100 is requesting specific information in the "User Name" service class 612' of the responding device 106, by specifying the UUID: "NAME" 632'. FIG. 4G is similar to FIG. 4E, except that it is directed to a different service class.

Figure 4H:
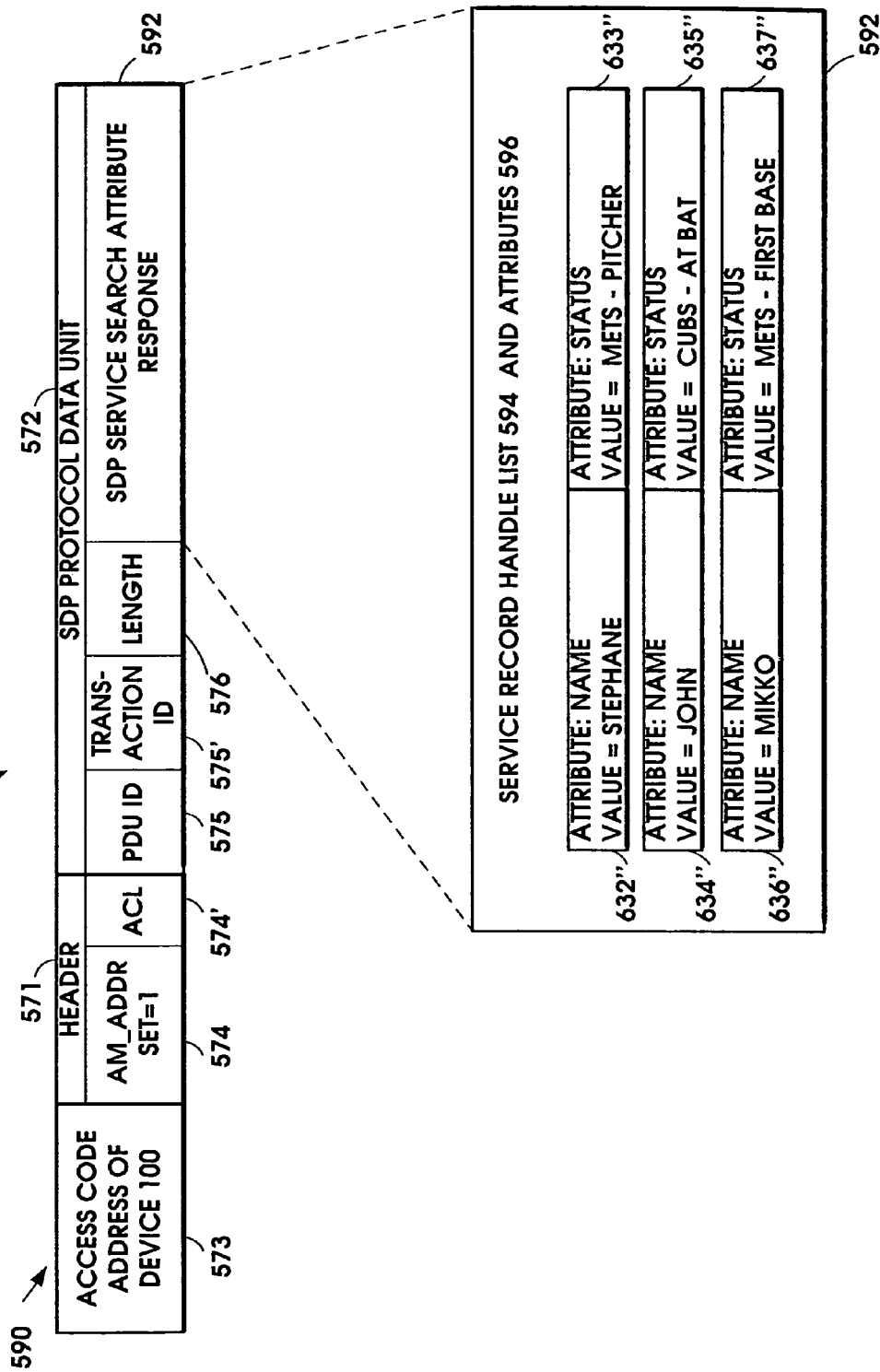
FIG. 4H shows the Bluetooth packet structure for response to SDP service search attribute request, response sent by ad hoc network information provider 106 to arriving device 100.

FIG. 4H shows the Bluetooth packet structure 590 for response to SDP service search attribute request, response sent by ad hoc network information provider 106 to arriving device 100. Field 592 contains the service record handle list 594 and the attributes 596 that were requested in the SDP service search attribute request packet 580 sent by arriving device 100. The service record handle list 594 and the attributes 596 are then passed to step 426 which lists the service records of all ad hoc network information providers in the responding piconets. Then step 432 of FIG. 3D analyzes the specified service classes or service attributes and step 434 ranks the ad hoc networks by the specified service classes or service attributes. The ranked ad hoc networks are listed in the ranking table 720 of FIG. 2A. Step 432 of FIG. 3D analyzes the attributes for "NAME". FIG. 4H is similar to FIG. 4F, except that it is directed to a different service class.

FIG. 4I shows the Bluetooth packet structure for SDP service search attribute request packet sent by arriving device 100 to ad hoc network information provider 116. The service search pattern 584A is the description of the pattern for the responding device 116 to match in its service registry 600A of FIG. 6A. FIG. 4I is similar to FIG. 4G, except that it addresses a different ad hoc network information provider 116 in a different piconet. FIG. 4J shows the Bluetooth packet structure for response to SDP service search attribute request, response sent by ad hoc network information provider 116 to arriving device 100.

Figure 4L:
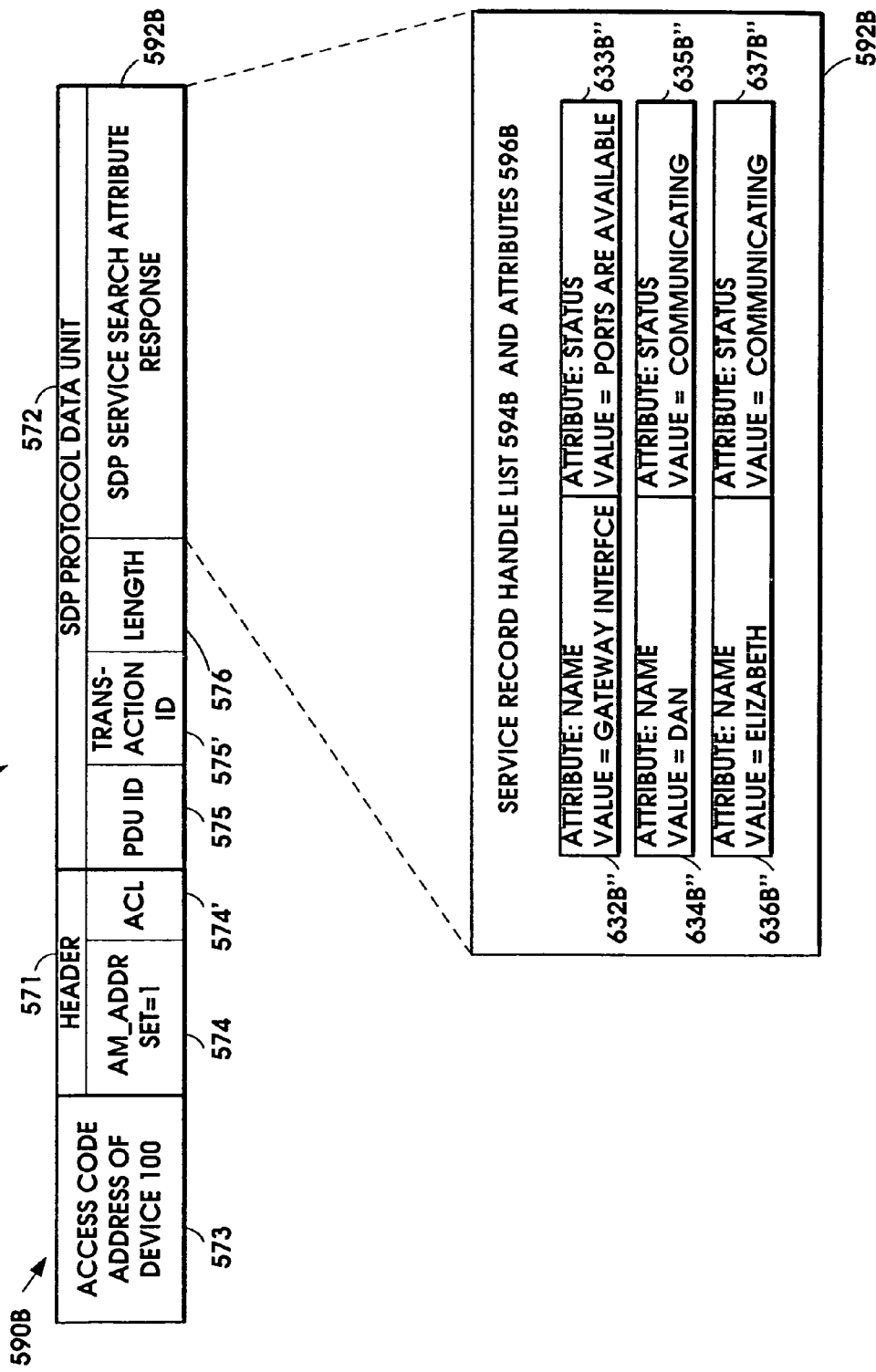
FIG. 4L shows the Bluetooth packet structure for response to SDP service search attribute request, response sent by ad hoc network information provider 126 to arriving device 100.

FIG. 4K shows the Bluetooth packet structure for SDP service search attribute request packet sent by arriving device 100 to ad hoc network information provider 126. The service search pattern 584B is the description of the pattern for the responding device 126 to match in its service registry 600B of FIG. 6B. FIG. 4K is similar to FIG. 4G, except that it is addresses to a different ad hoc network information provider 126 in a different piconet. FIG. 4L shows the Bluetooth packet structure for response to SDP service search attribute request, response sent by ad hoc network information provider 126 to arriving device 100.

FIG. 5 shows the SDP service registry 600 in the ad hoc network information provider 106 before the addition of the arriving device 100 to the ad hoc network 102, as shown in FIG. 1A. The SDP service registry 600 is a hierarchy with the root element being the public browse root 602. Beneath the public browse root 602 is the group level. There is only one element in the group level, the member group 604. Beneath the group level is the service class level. The piconet status service class 606 and the program type service class 608 directly descend from the public browse root 602. The device type service class 610 and the user name service class 612 descend from the member group 604. Beneath the service class level is the service attribute level which has service attribute elements descending from the piconet status service class 606, the program type service class 608, the device type service class 610, and the user name service class 612.

The piconet status service class 606 has service attributes 614, 616, and 618. Service attribute 614 stores the status of the instant device 106 as being an ad hoc network information provider and also its last update time. Service attribute 616 stores the encryption status of the instant piconet 102. Service attribute 618 stores the status of the instant piconet 102 as having three member devices and no parked devices.

The program type service class 608 has service attributes 620 and 622. Service attribute 620 stores the identity of a program, the collaboration program, in the instant piconet 102 and its status as not running. Service attribute 622 stores the identity of a program, the network baseball program, in the instant piconet 102 and that it is currently running. The current score is also stored as a status value.

The device type service class 610 has service attributes 624, 626, 628, and 630. Service attribute 624 stores a device attribute of a palmtop PDA for device 104 and also stores the Bluetooth version running on that device. Service attributes 626 and 628 are similar for the respective devices 106 and 108 in the piconet 102. Service attribute 630 is empty, since there are only three member devices currently in the piconet 102.

The user name service class 612 has service attributes 632, 634, 636, and 638. Service attribute 632 stores the name of a first user and a status attribute with the value of "Mets— Pitcher". Service attribute 634 stores the name of a second user and a status attribute with the value of "Cubs—At Bat". Service attribute 636 stores the name of a third user and a status attribute with the value of "Mets—First Base". Service attribute 638 is empty, since there are only three users currently in the piconet 102.

Figure 5A:
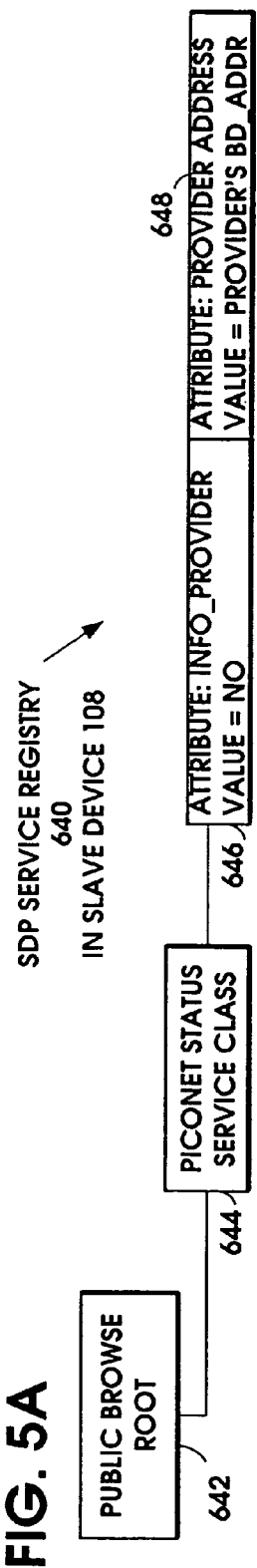
FIG. 5A shows the SDP service registry 640 in the slave device 108, as shown in FIG. 1A.
Figure 5B:
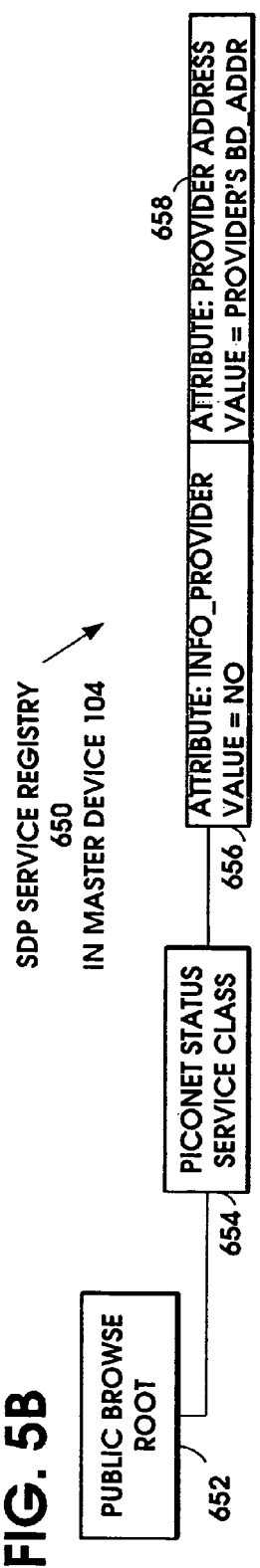
FIG. 5B shows the SDP service registry 650 in master device 104, as shown in FIG. 1A.
Figure 5C:
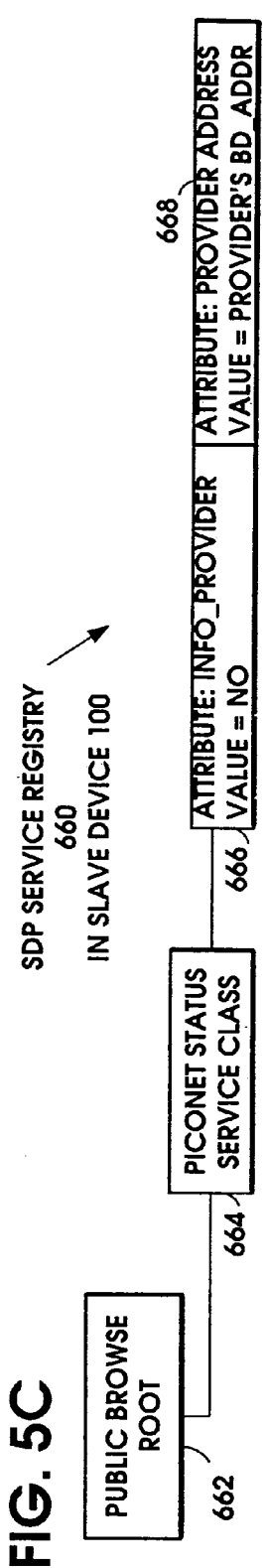
FIG. 5C shows the SDP service registry 660 in slave device 100 (the arriving device) after it has joined the ad hoc network, as shown in FIG. 1D.

FIG. 5A shows the SDP service registry 640 in the slave device 108, as shown in FIG. 1A. The status of device 108 as "NON-INFORMATION PROVIDER" is stored as attribute 646 in its SDP service registry 640 of FIG. 5A. FIG. 5B shows the SDP service registry 650 in master device 104, as shown in FIG. 1A. The status of device 104 as "NON-INFORMATION PROVIDER" is stored as attribute 656 in its SDP service registry 650 of FIG. 5B. FIG. 5C shows the SDP service registry 660 in slave device 100 (the arriving device) after it has joined the ad hoc network, as shown in FIG. 1D. The status of device 100 as "NON-INFORMATION PROVIDER" is stored as attribute 666 in its SDP service registry 660 of FIG. 5C.

Figure 5D:
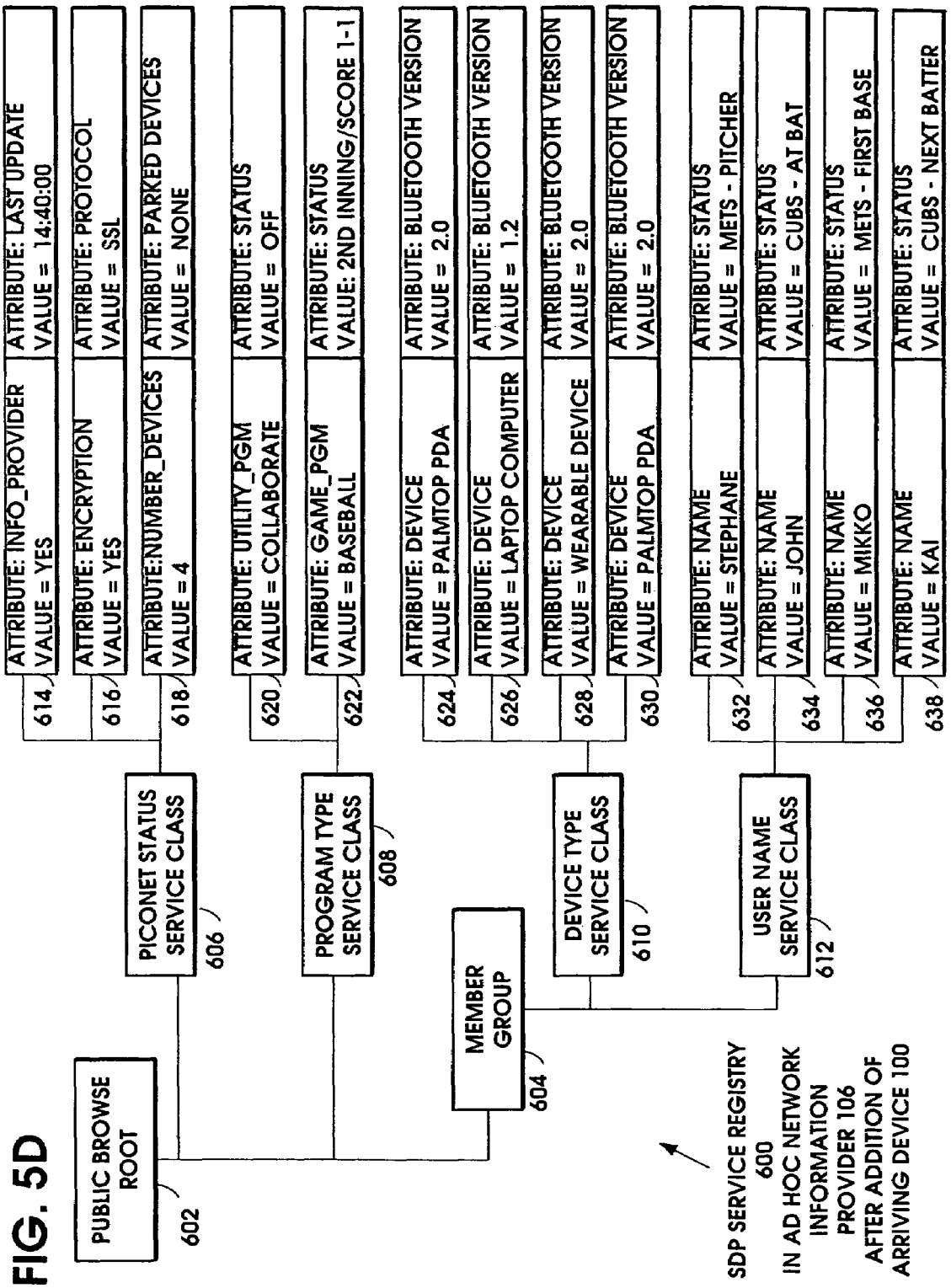
FIG. 5D shows the SDP service registry 600 in ad hoc network information provider 106 after addition of arriving device 100, as shown in FIG. 1D.

FIG. 5D shows the SDP service registry 600 in ad hoc network information provider 106 after addition of arriving device 100 to the piconet 102, as shown in FIG. 1D. The difference between this figure and FIG. 5 is that service attribute 630 now stores data from newly added device 100 since there are now four member devices in the piconet 102. Similarly, service attribute 638 now stores data from newly added device 100 since there are now four users currently in the piconet 102.

FIG. 6A shows the SDP service registry 600A in ad hoc network information provider 116, as shown in FIGS. 1A and 1D. The SDP service registry 600A has a hierarchy similar to that for registry 600 of device 106 in FIG. 5, except its reference numbers have a letter "A" suffix. The piconet status service class 606A has service attributes 614A, 616A, and 618A. Service attribute 614A stores the status of the instant device 116 as being an ad hoc network information provider and also its last update time. Service attribute 616A stores the encryption status of the instant piconet 112. Service attribute 618A stores the status of the instant piconet 112 as having three member devices and no parked devices.

Figure 6B:
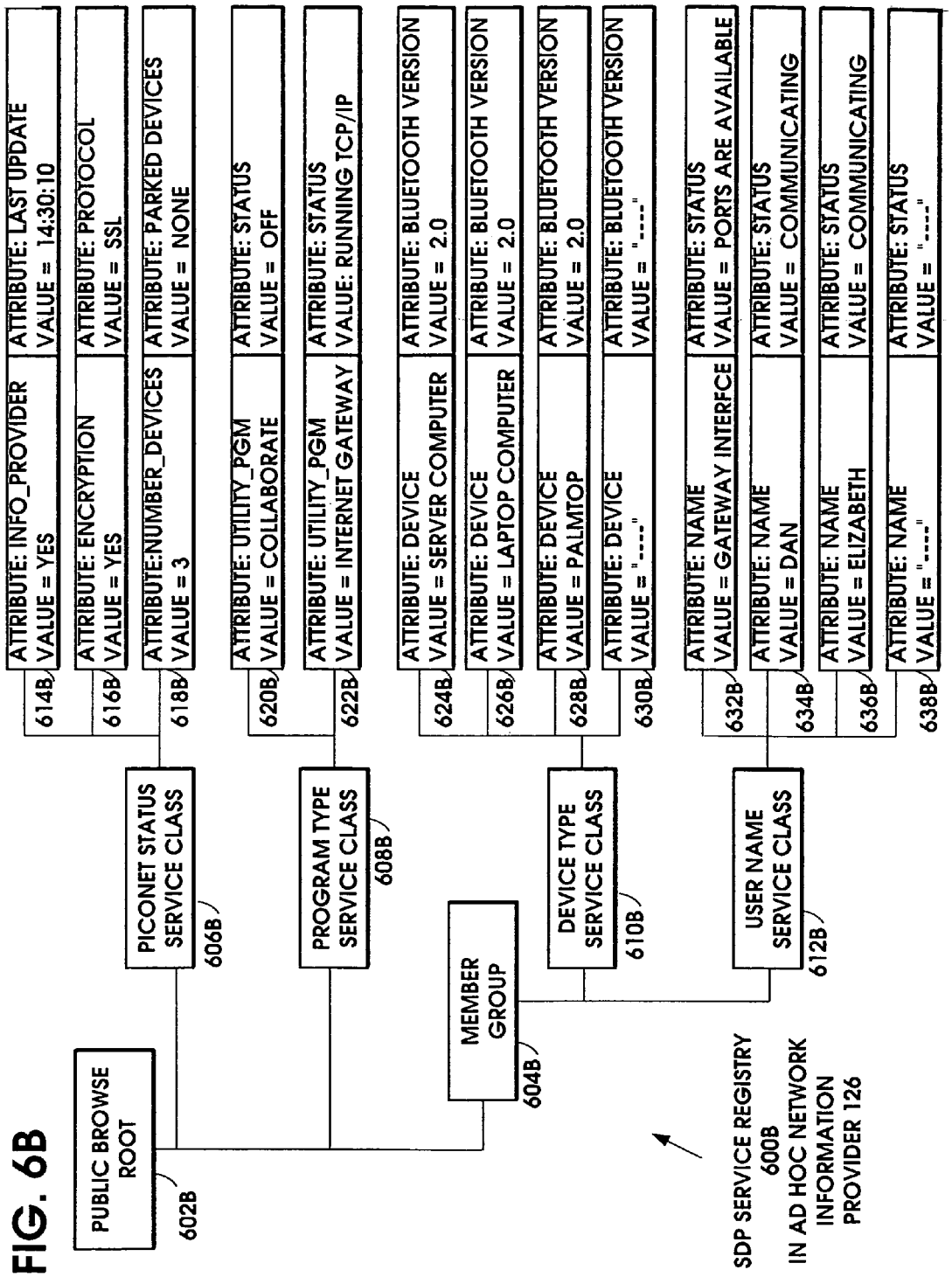
FIG. 6B shows the SDP service registry 600B in ad hoc network information provider 126, as shown in FIGS. 1A and 1D.

FIG. 6B shows the SDP service registry 600B in ad hoc network information provider 126, as shown in FIGS. 1A and 1D. The SDP service registry 600B has a hierarchy similar to that for registry 600 of device 106 in FIG. 5, except its reference numbers have a letter "B" suffix. The piconet status service class 606B has service attributes 614B, 616B, and 618B. Service attribute 614B stores the status of the instant device 126 as being an ad hoc network information provider and also its last update time. Service attribute 616B stores the encryption status of the instant piconet 122. Service attribute 618B stores the status of the instant piconet 122 as having three member devices and no parked devices.

EXAMPLE OF THE INVENTION IMPLEMENTED IN THE IEEE 802.11 WIRELESS LAN STANDARD

FIG. 1 will be discussed here as it applies to the IEEE 802.11 Wireless LAN Standard, by appending the suffix "(I)" to the reference numbers shown in FIG. 1. Thus, in FIG. 1, there are two IEEE 802.11 ad hoc networks 102(I) and 112(I) and the passenger's arriving wireless device 100(I). The IEEE 802.11 Wireless LAN Standard describes two major components, the mobile station 100(I) and the fixed access point (AP). IEEE 802.11 ad hoc networks have an independent configuration where the mobile stations 104(I), 106(I), and 108(I) communicate directly with one another in an independent ad hoc network 102(I) having limited or no support from a fixed access point. The medium access control (MAC) protocol regulates access to the RF physical link. The MAC provides a basic access mechanism with clear channel assessment, channel synchronization, and collision avoidance using the Carrier sense Multiple Access (CSMA) principle. It also provides service inquiring which is similar to the Bluetooth inquiry and scan operation. The MAC, provides link setup, data fragmentation, authentication, encryption, power management.

The IEEE 802.11 wireless LAN architecture is built around a basic service set (BSS) of stations that communicate with one another. When all of the stations in the BSS are mobile stations and there is no connection to a wired network, the BSS is called an independent BSS (IBSS) or ad hoc network. The ad hoc network is the entire network and only those stations communicating with each other in the ad hoc network are part of the LAN. An ad hoc network is typically a short-lived network, with a small number of stations, that is created for a particular purpose, e.g., to exchange data with a vending machine or to collaborate with other stations.

Figure 7:
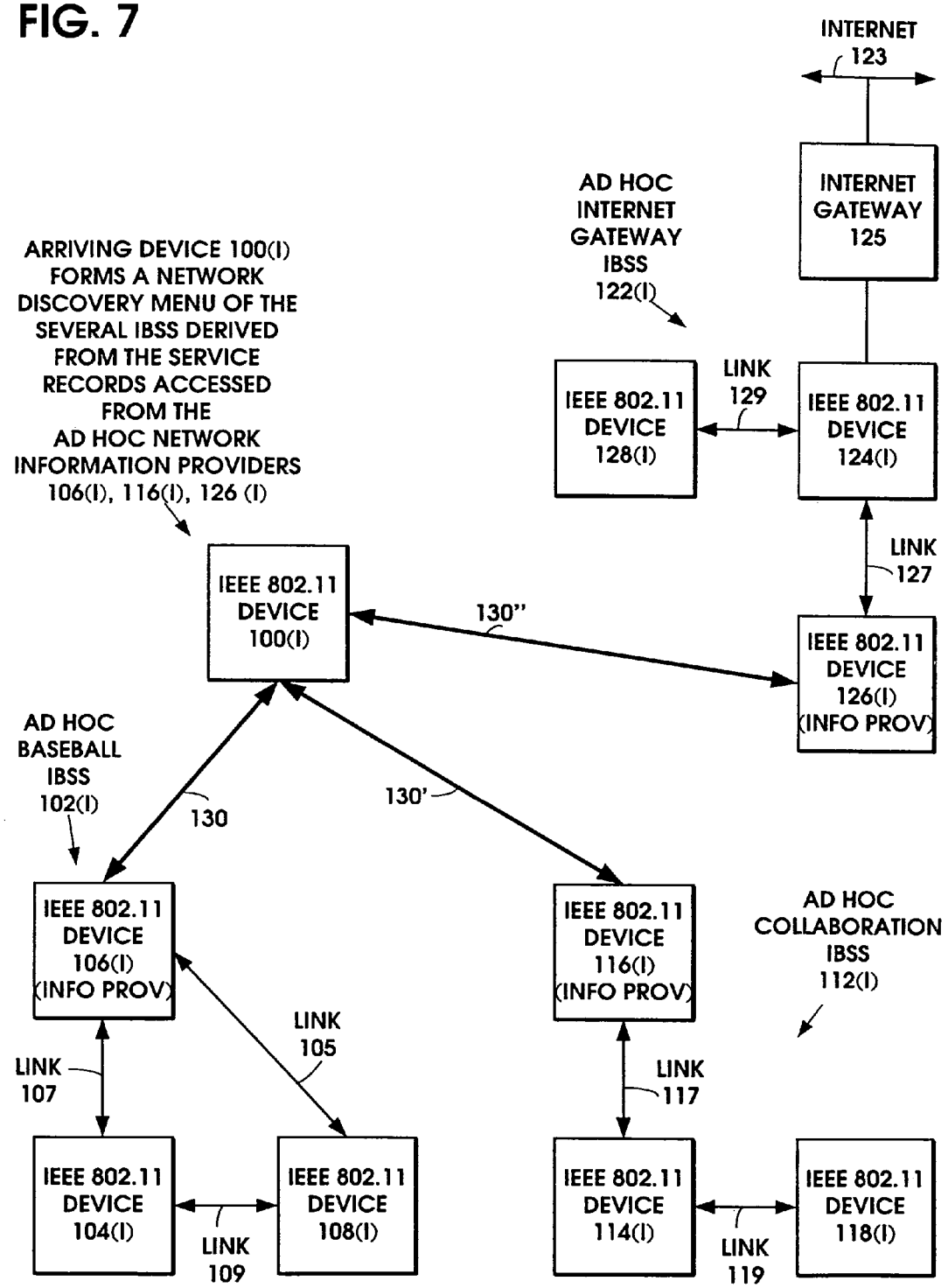
FIG. 7 is a network diagram of an alternate embodiment of the invention, showing the arriving IEEE 802.11 device 100 (I) forming a network discovery menu including descriptions of ad hoc network characteristics in the multiple ad hoc networks, derived from the service records and listed according to the selected attributes or ranked according to the signal characteristics.

FIG. 7 is a network diagram showing the arriving IEEE 802.11 device 100(I) forming a network discovery menu including descriptions of ad hoc network characteristics in the multiple ad hoc networks, derived from the service records and listed according to the selected attributes or ranked according to the signal characteristics.

In an ad hoc network 102(I), the mobile stations 104(I), 106(I), and 108(I) all communicate directly with one another. Mobile stations 104(I) and 106(I) communicate over link 107, mobile stations 104(I) and 108(I) communicate over link 109, and mobile stations 108(I) and 106(I) communicate over link 105. Not every mobile station may be able to communicate with every other mobile station, but they are all part of the same ad hoc network. There is also no relay function in an ad hoc network. Thus, if one mobile station must communicate with another, they must be in direct communication range.

The IEEE 802.11 standard provides four station services-authentication, deauthentication, privacy, and data delivery. In the authentication and deauthentication services, use of the network is allowed only to authorized users. The authentication service is used to prove the identity of one station to another. Without this proof of identity, the station is not allowed to use the wireless LAN for data delivery. The deauthentication service is used to eliminate a previously authorized user from any further use of the network.

The BSS Identifier (BSSID) is a unique identifier for a particular ad hoc network 102(I) of an IEEE 802.11 wireless LAN. Its format is identical to that of an IEEE 48-bit address. In an ad hoc network 102(I), the BSSID is a locally administered, individual address that is generated randomly by the station that starts the ad hoc network.

IEEE 802.11 standard provides management frames, for example as shown in FIG. 7A, to carry out management functions at the MAC level. All management frames include a framebody that carries information to carry out the particular management function. There are eight standard information elements 562(I) specified in the IEEE 802.11 standard, each designated by an element ID 565(I), which is an integer from zero to 31, and a length 566(I). There are 224 unassigned element IDs 565(I) which are reserved for future use. The corresponding reserved information elements 562(I) allow for the flexible extension of the management frames 560(I) to include new functionality without affecting older implementations. Older implementations are able to understand the older elements and will ignore elements with new identifiers.

The Beacon frame is a management frame that is transmitted periodically to allow mobile stations to locate and identify an ad hoc network. The Beacon frame includes the fields: timestamp, beacon interval, and capability information. The timestamp contains the value of the station's synchronization timer at the time that the frame was transmitted. The capability information field is a 16-bit field that identifies the capabilities of the station. The information elements in a Beacon frame are the service set identity (SSID), the supported rates, one or more physical parameter sets, an optional contention-free parameter set, an optional ad hoc network parameter set, and an optional traffic indication map. There is no restriction on the format or content of the 32 byte service set identity (SSID).

In accordance with one embodiment of the invention, the address of the Information Provider device in a new ad hoc network can be learned from a Beacon signal periodically transmitted from the ad hoc network. The IEEE 802.11 Beacon frame is transmitted periodically to allow mobile stations to locate and identify the information provider device in an ad hoc network. The Beacon frame includes a beacon signal that specifies the address of the information provider device 106 (I) in the IBSS 102(I). When an arriving device 100(I) in FIG. 7, is close enough to the IBSS 102(I) to receive the periodic beacon signal from a device in the IBSS, the arriving device 100(I) will know the address of the information provider device in that IBSS. If the arriving device 100(I) is running the ad hoc network discovery menu option, then the arriving device can directly address a request to the information provider 106(I) for the service records characterizing the IBSS 102(I).

The probe request frame 560(I) of FIG. 7A, is a management frame that is transmitted by a mobile station 100(I) attempting to quickly locate an IEEE 802.11 wireless LAN. It may be used to locate a wireless LAN with a particular service set identity (SSID) or to locate any wireless LAN. The probe request frame 560(I) contains the service attribute request 567(I). The effect of receiving a probe request 560(I) is to cause the station 106(I), for example, to respond with a probe response 570(I) of FIG. 7B. In accordance with the invention, when an arriving IEEE 802.11 wireless device arrives within the communication range of any member of an IEEE 802.11 ad hoc network 102(I), its probe request frame 560(I) inquiry signals are answered by a member of the ad hoc network 102(I) detecting the inquiry. If the responding member is an ad hoc network information provider 106(I), it responds with a probe response 570(I) containing a service attribute response 577(I) with information accessed from its memory characterizing the ad hoc network. If, instead, an ordinary device 108(I) in an ad hoc network 102(I) is the first to respond to the probe request frame 560(I) inquiry signals of the arriving device 100(I), the responding device responds with a probe response 570(I) containing the address of the ad hoc network information provider 106(I). The arriving IEEE 802.11 device 100(I) then sends a probe request frame 560(I) to the ad hoc network information provider 106(I) to obtain a probe response 570(I) containing the information characterizing the ad hoc network 102(I). The probe response frame 570(I) also includes the timestamp, beacon interval, capability information, information elements of the service set identity (SSID), supported rates, one or more physical parameter sets, the optional contention-free parameter set, and the optional ad hoc network parameter set.

The authentication frame is a management frame that is used to conduct a multiframe exchange between stations that ultimately results in the verification of the identity of each station to the other. The authentication frame includes three fields: the authentication algorithm number, the authentication transaction sequence number, and the status code. There is also one information element in the authentication frame, the challenge text.

The service set identity (SSID) information element may have a length of up to 32 bytes. There is no restriction on the format or content of the service set identity (SSID). It may be a null-terminated string of ASCII characters or a multibyte binary value. The choice of the value and format of the service set identity (SSID) is entirely up to the net-work administrator or user. There is one special case for the service set identity (SSID), when the length of it is zero, which is the "broadcast" identity. The broadcast identity is used in probe request frames 560(I) when the mobile station is attempting to discover all IEEE 802.11 wireless LANs in its vicinity. The service set identity (SSID) can perform the same informational function as that described for the class of device (CoD) in the Bluetooth standard, such as designating a device's node as a printer or fax machine. An inquiry can be configured for a specific class of device (CoD) to be searched for to in the service set identity (SSID) field.

Synchronization is the process of the stations in an IEEE 802.11 ad hoc network getting in step with each other, so that reliable communication is possible. The MAC provides the synchronization mechanism to allow support of physical layers that make use of frequency hopping or other time-based mechanisms where the parameters of the physical layer change with time. The process involves beaconing to announce the presence of an ad hoc network, and inquiring to find an ad hoc network. Once an ad hoc network is found, a station joins the ad hoc network. This process is entirely distributed in ad hoc networks, and relies on a common timebase provided by a timer synchronization function (TSF). The TSF maintains a 64-bit timer running at 1 MHz and updated by information from other stations. When a station begins operation, it resets the timer to zero. The timer may be updated by information received in Beacon frames.

In an IEEE 802.11 ad hoc network, there is no access point (AP) to act as the central time source for the ad hoc network. In an ad hoc network, the timer synchronization mechanism is completely distributed among the mobile stations of the ad hoc network. Since there is no AP, the mobile station that starts the ad hoc network will begin by resetting its TSF timer to zero and transmitting a Beacon, choosing a beacon period. This establishes the basic beaconing process for this ad hoc network. After the ad hoc network has been established, each station in the ad hoc network will attempt to send a Beacon after the target beacon transmission time arrives. To minimize actual collisions of the transmitted Beacon frames on the medium, each station in the ad hoc network will choose a random delay value which it will allow to expire before it attempts its Beacon transmission.

In order for a mobile station to communicate with other mobile stations in an ad hoc network, it must first find the stations. The process of finding another station is by inquiry. The inquiring may be either passive or active. Passive inquiry involves only listening for IEEE 802.11 traffic. Active inquiry requires the inquiring station to transmit and invoke responses from IEEE 802.11 stations.

Active inquiry allows an IEEE 802.11 mobile station to find an ad hoc network while minimizing the time spent inquiring. The station does this by actively transmitting queries that invoke responses from stations in an ad hoc network. In an active inquiry, the mobile station 100(I) will move to a channel and transmit a probe request frame 560(I). If there is an ad hoc network 102(I) on the channel that matches the service set identity (SSID) in the probe request frame 560(I), the responding station in that ad hoc network will respond by sending a probe response frame 570(I) to the inquiring station 100. This The probe response 570(I) includes the information necessary for the inquiring station 100(I) to extract a description of the ad hoc network 102(I). The inquiring station 100(I) will also process any other received probe response 570(I) and Beacon frames. Once the inquiring station 100(I) has processed any responses, or has decided there will be no responses, it may change to another channel and repeat the process. At the conclusion of the inquiry, the station 100(I) has accumulated information about the ad hoc networks in its vicinity.

A mobile station 100(I) can combine inquiring with authentication. As the mobile station 100(I) inquires for other ad hoc networks, it will initiate an authentication when it finds a new ad hoc network.

Once a station has performed an inquiry that results in one or more ad hoc network descriptions, the station may choose to join one of the ad hoc networks. The joining process is a purely local process that occurs entirely internal to the IEEE 802.11 mobile station. There is no indication to the outside world that a station has joined a particular ad hoc network. While the IEEE 802.11 standard does describe what is required of a station to join an ad hoc network, it does not describe how a station should choose one ad hoc network over another.

Joining an ad hoc network requires that all of the mobile station's 100(I) MAC and physical parameters be synchronized with the desired ad hoc network 102(I). To do this, the station 100(I) must update its timer with the value of the timer from the ad hoc network description, modified by adding the time elapsed since the description was acquired. This will synchronize the timer to the ad hoc network 102(I). The BSSID of the ad hoc network 102(I) must be adopted, as well as the parameters in the capability information field. Once this process is complete, the mobile station 100(I) has joined the ad hoc network 102(I) and is ready to begin communicating with the stations in the ad hoc network 102(I).

Most of the functional block diagram of FIG. 2A applies to the IEEE 802.11 wireless LAN embodiment of the device 100, as well as it does to the Bluetooth embodiment. FIG. 2A, shows the various program modules stored in its memory 202 for the transport protocol group 214, middleware protocol group 224, and application group 234. The memory 202 is connected by the bus 204 to the keypad 208, the central processor 210, and the display 212. The memory 202 is connected by the bus 204 to the radio 206, which in the case of the IEEE 802.11 embodiment, is the radio having the RF spectrum and modulation specified by the IEEE 802.11 standard. The radio 206 for IEEE 802.11 wireless LAN devices operates in the 2.4 GHz ISM radio band and uses a variety of modulation types, depending on the type of physical layer defined for the device. A first type of physical layer device uses frequency-hopping spread spectrum (FHSS) and Gaussian frequency shift keying (GFSK) modulation with one symbol per bit, to provide a gross bit rate of 1 Mbps. The 2.4 GHz ISM radio band is divided into three sets of 22 frequency-hopping channels each, with each channel being 1 MHz wide. Two other physical layer device types use direct sequence spread spectrum (DSSS), one at 1 Mbps using differential binary phase shift keying (DBPSK) modulation and another at 2 Mbps using differential quaternary phase shift keying (DQPSK) modulation. The US Federal Communications Commission (FCC) allows use of the 2.4 GHz ISM radio band without a license if the transmitter output power is less than 1 Watt.

Figure 7C:
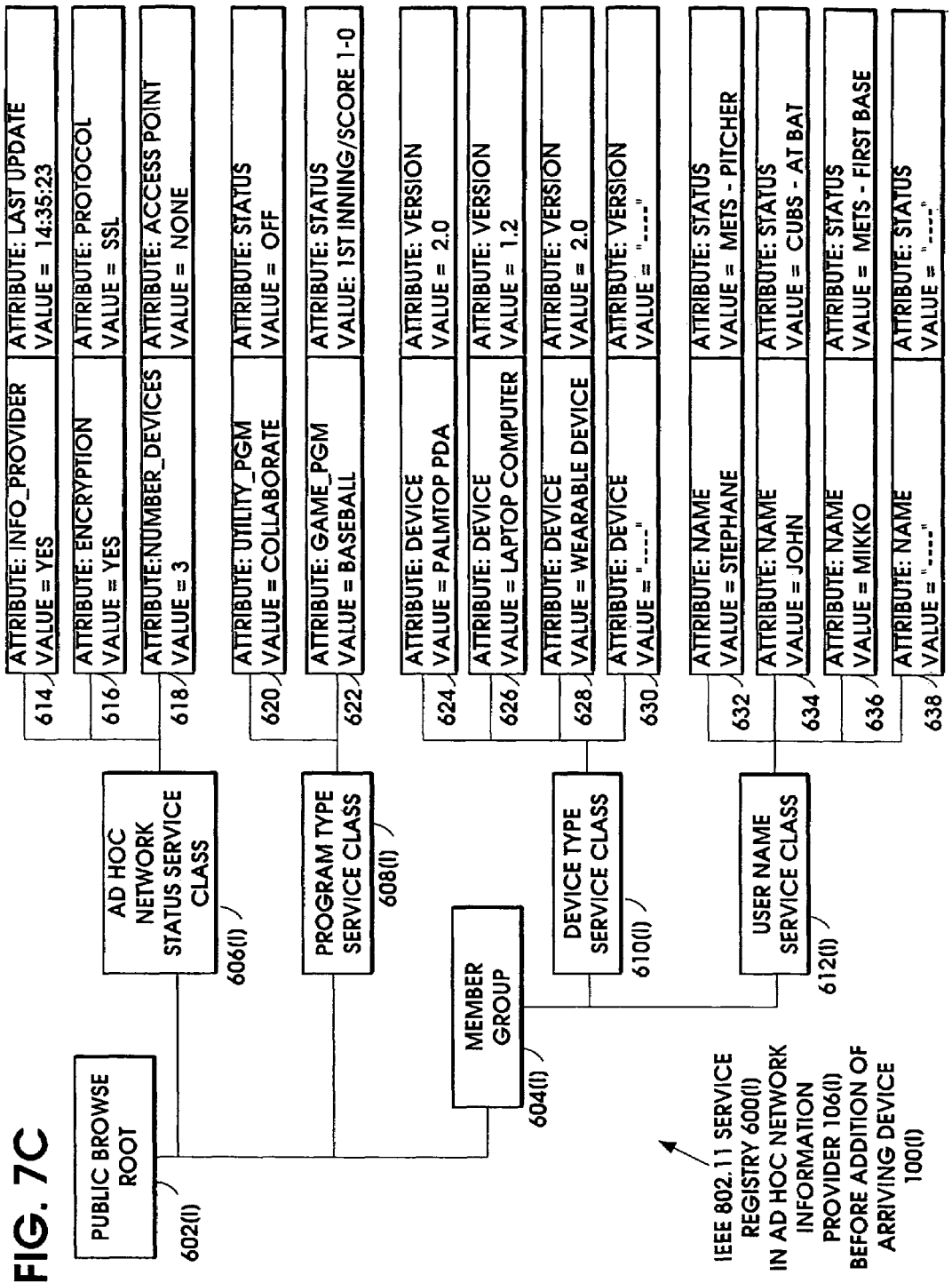
FIG. 7C shows the IEEE 802.11 service registry 600(I) in the ad hoc network information provider 106(I) before addition of arriving device 100(I).

Program modules stored in the memory 202 are sequences of operational instructions which, when executed by the central processor 210, carry out the methods of the invention. The IEEE 802.11 wireless LAN embodiment of the device 100 uses substantially the same application group 234, as does the Bluetooth embodiment. The application group 234 includes program 280 to create a registry 600(I) for a new member of the ad hoc network. The service registry 600(I) for the IEEE 802.11 wireless LAN embodiment is shown in FIG. 7C. The application group 234 includes Initial Menu application program 300 which operates on substantially the same principles for the IEEE 802.11 wireless LAN embodiment as it does for the Bluetooth embodiment. The application group 234 includes Ad Hoc Network Search application program 412 which operates on substantially the same principles for the IEEE 802.11 wireless LAN embodiment as it does for the Bluetooth embodiment. The application group 234 includes Service Record Update application program 330 which operates on substantially the same principles for the IEEE 802.11 wireless LAN embodiment as it does for the Bluetooth embodiment. The application group 234 includes Network Discovery Menu application program 340 which operates on substantially the same principles for the IEEE 802.11 wireless LAN embodiment as it does for the Bluetooth embodiment. The application group 234 includes Network Baseball application program 320 which operates on substantially the same principles for the IEEE 802.11 wireless LAN embodiment as it does for the Bluetooth embodiment. The application group 234 includes Network Collaboration application program 350 which operates on substantially the same principles for the IEEE 802.11 wireless LAN embodiment as it does for the Bluetooth embodiment. Also included are the IEEE 802.11 service registry 600(I) of FIG. 7C and the network discovery table 360. Also included is the Search Options List table 700, which is selected by the user from the initial menu 205 of FIG. 1. Also included is the inquiry response table 710, which lists the essential information gathered from inquiry response messages received in the user's device 100. This information is required to make a connection with any of the responding wireless devices. Also included is the network ranking table 720. The ranked ad hoc networks are listed in the ranking table 720 of FIG. 2A. Also included is the packet buffer 515 which buffers packets for the IEEE 802.11 wireless LAN embodiment.

The middleware protocol group 224 and the transport protocol group 214 of FIG. 2A are different in the IEEE 802.11 embodiment, from that shown for the Bluetooth embodiment. The IEEE 802.11 wireless LAN specification provides a detailed description of the middleware protocol group 224 and the transport protocol group 214. These modules are the MAC Service Interface, the MAC Management Service Interface, the Medium Access Control Sublayer, the MAC Management, the Physical Service Interface, the Physical Management Service, the Physical Layer, and the Physical Management.

The service registry searching process of the Service Discovery Protocol 226 in the IEEE 802.11 embodiment, is an application program that enables the responding device 106(I) to match the service search pattern 568 and the attribute ID list 569 of the probe request 560(I), with the classes and attributes in the IEEE 802.11 service registry 600(I) in the ad hoc network information provider 106(I), and to reply with the service record handle list 578 and the attributes 579.

When the new IEEE 802.11 device 100(I) arrives within the communication range of any member of the ad hoc network, it begins searching with inquiry messages. This part of the process is shown in greater detail in the flow diagram of FIG. 3D. The inquiry signals are answered by the second IEEE 802.11 device 108(I) detecting the inquiry, in this example. The device 108(I) responds with the address of the ad hoc network information provider 106(I). The arriving device 100(I) then sends a probe request to the ad hoc network information provider to obtain information characterizing the ad hoc network 102(I). The ad hoc network information provider 106(I) responds with information accessed from its service registry 600(I) of FIG. 7C, characterizing the ad hoc network 102(I), which it returns. The invention then compiles a network discovery menu in the arriving device. This part of the process is shown in greater detail in the flow diagram of FIG. 3F. The network discovery menu lists the characteristics of the ad hoc networks within its range. When the user selects an entry from the menu, the arriving device automatically joins the selected ad hoc network.

Then device 100(I) determines whether the user has specified any service classes or service attributes of interest. If the user has specified any service classes or service attributes, then device 100(I) analyzes the specified service classes or service attributes and ranks the ad hoc networks by the specified service classes or service attributes. The ranked ad hoc networks are listed in the ranking table 720 of FIG. 2A.

Alternately, if the user has not specified any service classes or service attributes, then device 100(I) determines the quality of the signal characteristics of the responding ad hoc networks. The quality of the signal characteristics can be measured by the received signal strength, the bit error rate, or other quality of service (QoS) metrics. Then device 100(I)

ranks the ad hoc networks by the quality of service (QoS) metrics. The ranked ad hoc networks are listed in the ranking table 720 of FIG. 2A.

The invention uses the optional extensions to the IEEE 802.11 management frames, to provide the additional functionality of passing the service search pattern 568 and an attribute ID list 569 to the ad hoc network information provider device 106(I). FIG. 7A shows the IEEE 802.11 packet structure for a probe request 560(I), sent by the arriving device 100(I) to the ad hoc network information provider 106(I). This is an alternate implementation to the Bluetooth implementation shown in FIG. 4E. The probe request frame 560(I) is a management frame that is transmitted by a mobile station attempting to quickly locate an IEEE 802.11 wireless LAN. It may be used to locate a wireless LAN with a particular service set identity (SSID) or to locate any wireless LAN. The probe request frame 560(I) contains information element 562(I) that has the Element ID field 565(I) of value 254. This is a normally unassigned value for the Element ID which is reserved for customized purposes, such as this. The reserved information elements allow for the flexible extension of the management frames to include new functionality without affecting older implementations. Older implementations will ignore elements with new identifiers such as the value 254. The length field 566(I) specifies the length of the contents of the information element 562(I). The information element 562(I) contains the service search pattern 568 and an attribute ID list 569. The service search pattern 568 is the description of the pattern for the responding device 106(I) to match in its registry 600(I) of FIG. 7C. If the responding device 106(I) has the service requested, it responds with the service's handle. The service handle identifies the service for which the attributes are being requested. The attribute ID list 569 identifies the attributes that the requesting device 100(I) is requesting. FIG. 7C shows the IEEE 802.11 service registry 600(I) in the ad hoc network information provider 106(I) before addition of arriving device 100(I).

The invention uses the optional extensions to the IEEE 802.11 management frames, to provide the additional functionality of returning the service record handle list 578 and the attributes 579 from the ad hoc network information provider device 106(I). FIG. 7B shows an alternate implementation to the Bluetooth implementation shown in FIG. 4F, of the IEEE 802.11 packet structure for a probe response 570(I) to the probe request 560(I) of FIG. 7A, this response 570(I) having been sent by the ad hoc network information provider 106(I) to the arriving device 100(I). The effect of receiving a probe request 560(I) is to cause the station to respond with a probe response 570(I). The probe response frame contains nearly all the same information as a Beacon frame, including the timestamp, beacon interval, capability information, information elements of the service set identity (SSID), supported rates, one or more physical parameter sets, the optional contention-free parameter set, and the optional ad hoc network parameter set. In accordance with the invention, the probe response frame 570(I) contains information element 572(I) that has the Element ID field 575(I) of value 255. This is a normally unassigned value for the Element ID which is reserved for customized purposes, such as this. The reserved information elements allow for the flexible extension of the management frames to include new functionality without affecting older implementations. Older implementations will ignore elements with new identifiers such as the value 255. The length field 576(I) specifies the length of the contents of the information element 572(I). The information element 572(I) contains the service attribute response 577(I) that includes the service record handle list 578 and the attributes 579. The service record handle list 578 and the attributes 579 are then passed to step 421 of FIG. 3D, where the attributes for "INFO_PROVIDER" are examined to determine whether the responding device 106(I) in an ad hoc network information provider in a ad hoc network. It is seen in FIG. 7B that the attribute 614" indicates that responding device 106(I) is in fact an ad hoc network information provider.

High Performance Radio Local Area Network
(HIPERLAN)

The HIPERLAN standard provides a wireless LAN with a high data rate of up to 54 Mbps and a medium-range of 50 meters. HIPERLAN wireless LANs provide multimedia distribution with video QoS, reserved spectrum, and good in-building propagation. There are two HIPERLAN standards. HIPERLAN Type 1 is a dynamic, priority driven channel access protocol similar to wireless Ethernet. HIPERLAN Type 2 is reserved channel access protocol similar to a wireless version of ATM. Both HIPERLAN Type 1 and HIPERLAN Type 2 use dedicated spectrum at 5GHz. HIPERLAN Type 1 uses an advanced channel equalizer to deal with intersymbol interference and signal multipath. HIPERLAN Type 2 avoids these interference problems by using OFDM and a frequency transform function. The HIPERLAN Type 2 specification offers options for bit rates of 54, 36, 16, and 6 Mbps. The physical layer adopts an OFDM multiple carrier scheme using 48 carrier frequencies per OFDM symbol. Each carrier may then be modulated using BPSK, QPSK, 16-QAM, or 64-QAM to provide different data rates. The modulation schemes chosen for the higher bit rates achieve throughput in the range 30-50 Mb/s.

EXAMPLE OF THE INVENTION
IMPLEMENTED IN THE HIPERLAN TYPE 1
STANDARD

HIPERLAN Type 1 is a dynamic, priority driven channel access protocol that lends itself well to the formation of ad hoc networks. The HIPERLAN Type 1 ad hoc network is an arbitrary collection of wireless devices which are physically close enough to be able to communicate and which are exchanging information on a regular basis. Members of the ad hoc network join and leave as they move into and out of the range of the devices in the network. HIPERLAN Type 1 ad hoc networks support distributed activities similar those of the Bluetooth piconets and IEEE 802.11 independent basic service sets (IBSS).

FIGS. 1, 7A, 7B, and 7C will be discussed here as they apply to the HIPERLAN Type 1 standard, by appending the suffix "(H1)" to the reference numbers shown in those figures. The dynamic, priority driven channel access protocol of the HIPERLAN Type 1 standard provides wireless devices with service inquiry features similar to those of the Bluetooth inquiry and scanning features and the IEEE 802.11 probe request and response features. Thus, in FIG. 1, there are two HIPERLAN Type 1 ad hoc networks 102(H1) and 112(H1) and the passenger's arriving wireless device 100(H1). The HIPERLAN Type 1 ad hoc networks have an independent configuration where the mobile stations 104(H1), 106(H1), and 108(H1) communicate directly with one another in an independent ad hoc network 102(H1). The invention uses the optional extensions to the HIPERLAN Type 1 packets, to provide the additional functionality of passing the service search pattern 568 and an attribute ID list 569 from the arriving device 100(H1) to the ad hoc network information provider device 106(H1), in a manner similar to that described in FIG. 7A for the IEEE 802.11 packet structure for a probe request 560(I), sent by the arriving device 100(I) to the ad hoc network information provider 106(I). Similarly, the invention uses the optional extensions to the HIPERLAN Type 1 packets, to provide the additional functionality of returning the service record handle list 578 and the attributes 579 from the ad hoc network information provider device 106(H1), in a manner similar to that described in FIG. 7B for the IEEE 802.11 packet structure for a probe response 570(I) having been sent by the ad hoc network information provider 106(I) to the arriving device 100(I). The HIPERLAN Type 1 service registry 600(H1) in the ad hoc network information provider 106(H1) before addition of arriving device 100(H1), is similar to that described in FIG. 7C for the IEEE 802.11 service registry 600(I).

When the new HIPERLAN Type 1 device 100(H1) arrives within the communication range of any member of the ad hoc network, it begins searching with inquiry messages. This part of the process is shown in greater detail in the flow diagram of FIG. 3D. The inquiry signals are answered by the second HIPERLAN Type 1 device 108(H1) detecting the inquiry, in this example. The device 108(H1) responds with the address of the ad hoc network information provider 106(H1). The arriving device 100(H1) then sends a probe request to the ad hoc network information provider to obtain information characterizing the ad hoc network 102(H1). The ad hoc network information provider 106(H1) responds with information accessed from its service registry 600(H1) of FIG. 7C, characterizing the ad hoc network 102(H1), which it returns. The invention then compiles a network discovery menu in the arriving device. This part of the process is shown in greater detail in the flow diagram of FIG. 3F. The network discovery menu lists the characteristics of the ad hoc networks within its range. When the user selects an entry from the menu, the arriving device automatically joins the selected ad hoc network.

Then HIPERLAN Type 1 device 100(H1) determines whether the user has specified any service classes or service attributes of interest. If the user has specified any service classes or service attributes, then device 100(H1) analyzes the specified service classes or service attributes and ranks the ad hoc networks by the specified service classes or service attributes. The ranked ad hoc networks are listed in the ranking table 720 of FIG. 2A.

Alternately, if the user has not specified any service classes or service attributes, then HIPERLAN Type 1 device 100(H1) determines the quality of the signal characteristics of the responding ad hoc networks. The quality of the signal characteristics can be measured by the received signal strength, the bit error rate, or other quality of service (QoS) metrics. Then device 100(H1) ranks the ad hoc networks by the quality of service (QoS) metrics. The ranked ad hoc networks are listed in the ranking table 720 of FIG. 2A.

EXAMPLE OF THE INVENTION IMPLEMENTED IN THE HIPERLAN TYPE 2 STANDARD

HIPERLAN Type 2 is a reserved channel access protocol that is capable of forming ad hoc networks. The HIPERLAN Type 2 ad hoc network is a collection of wireless devices which are physically close enough to be able to communicate and which are exchanging information on a regular basis. Members of the ad hoc network join and leave as they move into and out of the range of the devices in the network. HIPERLAN Type 2 ad hoc networks support distributed activities similar those of the Bluetooth piconets and IEEE 802.11 independent basic service sets (IBSS).

Figure 8:
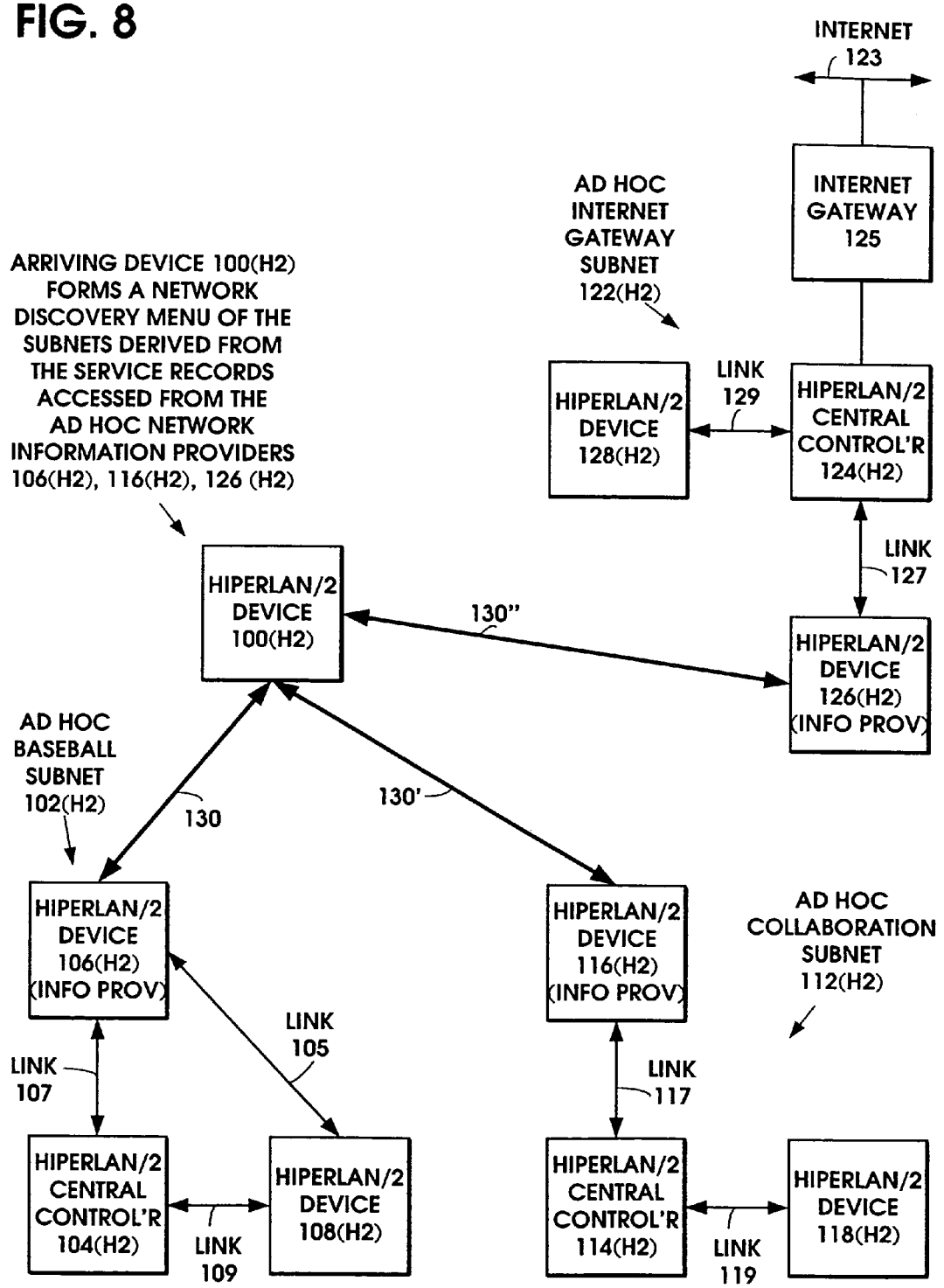
FIG. 8 is a network diagram of an alternate embodiment, showing the arriving HIPERLAN Type 2 device 100(H2) forming a network discovery menu including descriptions of ad hoc network characteristics in the multiple ad hoc networks, derived from the service records and listed according to the selected attributes or ranked according to the signal characteristics.

FIGS. 1, 8, 8A, TO 8D will be discussed here as they apply to the HIPERLAN Type 2 standard, by appending the suffix "(H2)" to the reference numbers shown in those figures. HIPERLAN Type 2 supports two basic modes of operation, the Centralized mode and the Direct mode, both of which are shown in FIG. 8. In the Centralized mode (sometimes referred to as the "business system"), the Ad Hoc Internet Gateway subnet 122(H2) includes an access point 124(H2) which is connected to Internet gateway 125 and the Internet 123, which serves the wireless devices 126(H2) and 128(H2) associated with it. In the centralized mode, all traffic has to pass the access point 124(H2), regardless of whether the data exchange is between a wireless device 126(H2) and the Internet network 123 or between wireless devices 126(H2) and 128(H2) belonging to this access point 124(H2). A HIPERLAN Type 2 network for Centralized mode environment consists typically of a number of access points, each of them covering its own geographic area. Together they form a radio access network with full or partial coverage of a region. The coverage areas can overlap each other, thus simplifying routing of wireless devices inside the radio access network. Each access point serves a number of wireless devices which have to be associated with it. In the case where the quality of the radio link degrades to an unacceptable level, the wireless device may move to another access point by performing a handover. To the extent that devices 126(H2) and 128(H2) may arrive and leave the subnet 122(H2), the subnet is also considered an ad hoc network.

The Direct mode supports ad hoc networks, such as subnet 102(H2) and subnet 112(H2) of FIG. 8. In the Direct mode (sometimes referred to as the "home system"), the medium access is still managed in a centralized manner by a central controller 104(H2) or 114(H2), respectively. However, user data traffic is exchanged between wireless devices 106(H2) and 108(H2) without going through the central controller 104(H2). Similarly, user data traffic is exchanged between wireless devices 116(H2) and 118(H2) without going through the central controller 114(H2). A central controller 104(H2) may also be connected to a core network, and thus is able to operate in both direct and centralized mode. The smallest configuration in a HIPERLAN Type 2 Direct mode system consists of a single subnet, such as subnet 102(H2). At each point in time only one HIPERLAN Type 2 wireless device can act as the central controller in a subnet.

For the Direct mode environment, HIPERLAN Type 2 network is operated as an ad hoc network. The HIPERLAN Type 2 Direct mode system shares the same basic features with the HIPERLAN Type 2 Centralized mode system by defining the following equivalence between both systems:

[1] A subnet in the ad hoc network configuration is equivalent to a cell in the cellular access network configuration.

[2] A central controller in the ad hoc network configuration is equivalent to the access point in the cellular access network configuration. However, the central controller is dynamically selected from HIPERLAN Type 2 portable devices and can be handed over to another portable device, if the old one leaves the network.

[3] Multiple subnets in a Direct mode are made possible by having multiple central controllers operating at different frequencies.

The HIPERLAN Type 2 basic protocol stack on the access point/central controller and its functions are the physical layer (PHY), the Data Link Control (DLC) layer, and the convergence layer (CL). The convergence layer offers service to the higher application program layers.

The physical layer delivers a basic data transport function by providing a baseband modem and an RF port. The baseband modem also contains a forward error correction function.

The data link control layer consists of the Error Control (EC) function, the Medium Access Control (MAC) function and the Radio Link Control function. It is divided into the user data transport functions and the control functions.

Figure 8A:
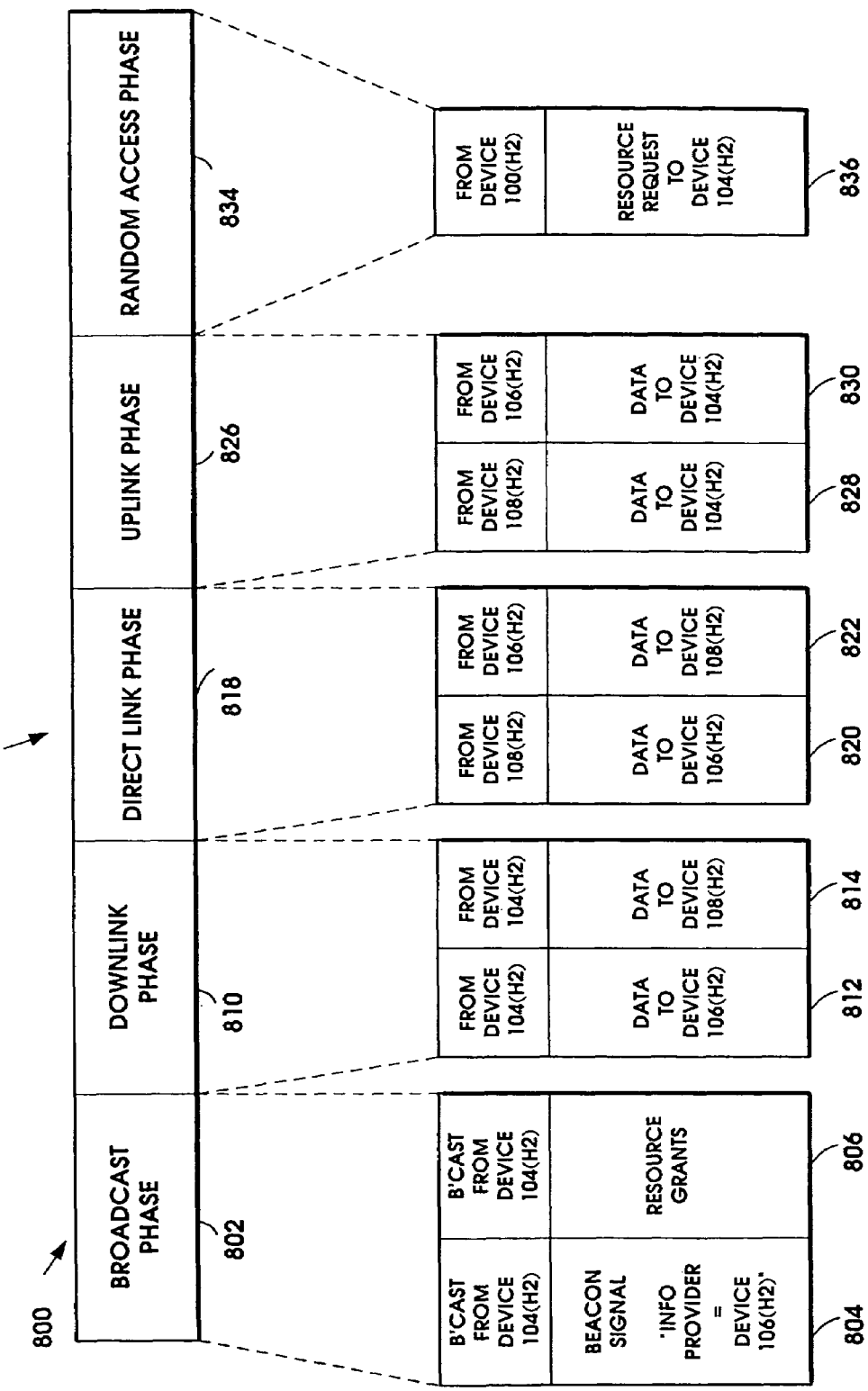
FIG. 8A shows an alternate embodiment, illustrating the HIPERLAN Type 2 MAC frame structure, including a random channel resource request, sent by the arriving device 100(H2) to the central controller device 104(H2), requesting request capacity for one of the following frames.
Figure 8C:
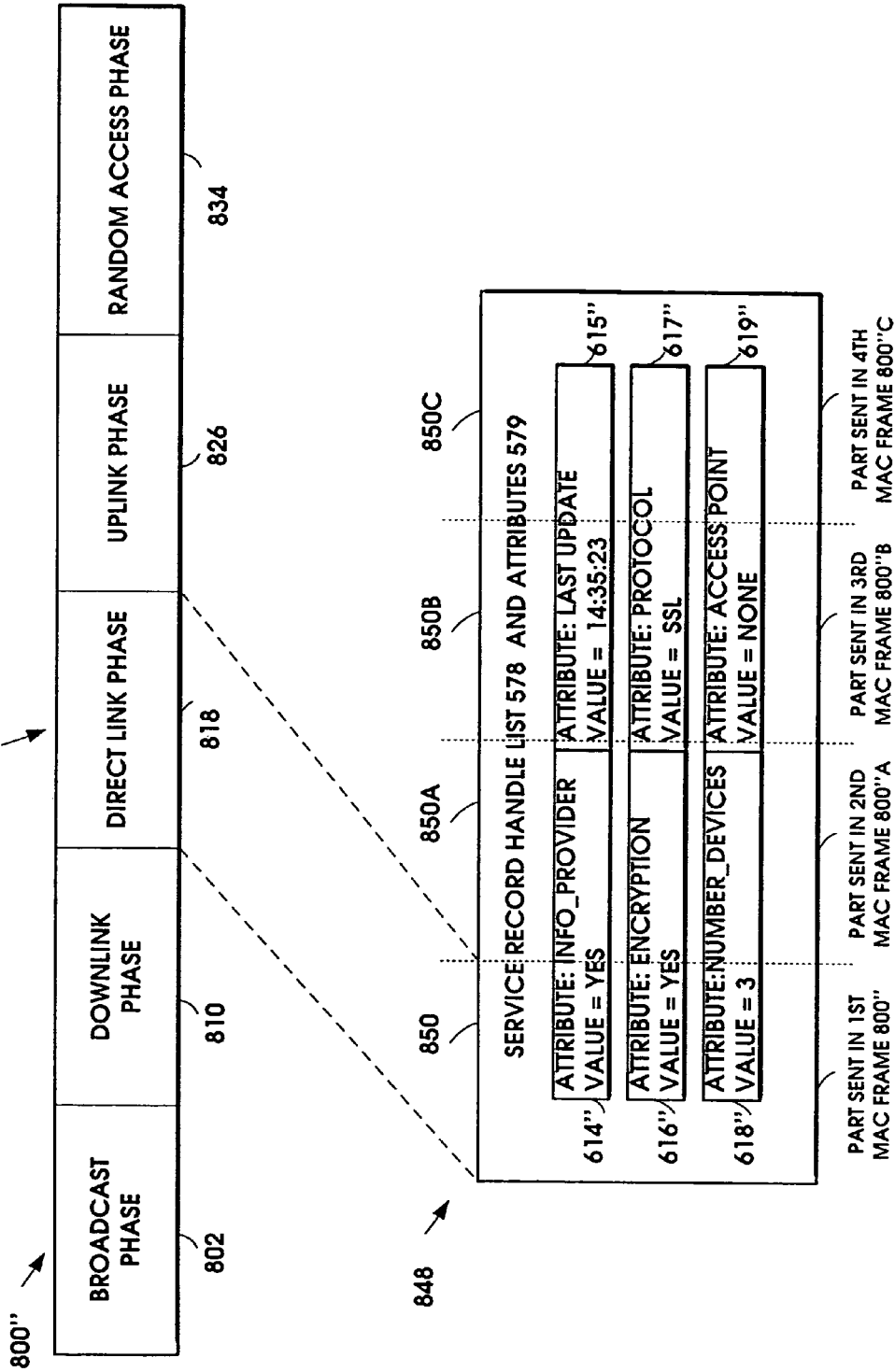
FIG. 8C shows an alternate embodiment, illustrating the HIPERLAN Type 2 MAC frame structure, including the requested the subnet service records, sent in the direct link channel by the ad hoc network information provider 106(H2) to the arriving device 100(H2).

The medium access control (MAC) is a centrally scheduled Time Division Multiple Access/Time Division Duplex (TDMA/TDD) protocol shown in FIGS. 8A, 8B, and 8C. Centrally scheduled means that the access point/central controller controls all transmissions over the air, including uplink, downlink and direct mode phase. Each of the wireless devices in a subnet can request the reservation of one or more time slots for communication between itself and another device in the subnet. The basic structure on the air interface generated by the MAC protocol shown in FIG. 8A. It consists of a sequence of MAC frames 800 of equal length, with a 2 ms duration. Each MAC frame 800 consists of several phases. Several wireless devices can consecutively burst their transmissions in their consecutively reserved time slots within a phase. The MAC frame phases shown in FIG. 8A include the broadcast phase 802, the downlink phase 810, the direct link phase 818, the uplink phase 826, and the random access phase 834. The downlink phase 810, direct link phase 818, and uplink phase 826 of the MAC frame 800 contain the assigned TDMA time slots for the transmission bursts of data and control from each device in the subnet that has requested a slot.

[1] Broadcast phase 802: The Broadcast phase 802 carries the broadcast control channel 804 and the frame control channel 806 which are broadcast by the central controller 104(H2). The broadcast control channel 804 shown in FIG. 8A contains general announcements and some status bits announcing the appearance of more detailed broadcast information in the downlink phase 810. In accordance with one embodiment of the invention, the broadcast control channel 804 includes a beacon signal that specifies the address of the information provider device 106(H2) in the subnet 102(H2) controlled by the central controller 104(H2). When an arriving device 100(H2) in FIG. 8, is close enough to the subnet 102(H2) to receive the periodic beacon signal from the central controller 104(H2), the arriving device 100(H2) will know the address of the information provider device in that subnet. If the arriving device 100(H2) is running the ad hoc network discovery menu option, then the arriving device can make a resource request in the random access phase 834 of the MAC frame to the central controller 104(H2), requesting a time slot in a subsequent MAC frame. The requested time slot will be used by the arriving device 100(H2) to send a request to the information provider 106(H2) for the service records characterizing the subnet 102(H2).

In another embodiment of the invention, the address of the Information Provider device in a new ad hoc network can be a default address. For example, when the invention in embodied in the HIPERLAN Type 2 Wireless LAN Standard, the Information Provider device in a new ad hoc network can have a default address to allow mobile stations to locate and identify the information provider device in an ad hoc network. The default address is known to every arriving device. For example, in the HIPERLAN Type 2 Wireless LAN Standard the default address can be the address of the central controller device or alternately the second device in the ad hoc network. When an arriving device is close enough to the ad hoc network to either receive a periodic beacon signal from a device in that network or alternately to receive a response to its inquiry, the arriving device will know the default address of the information provider device in that network. If the arriving device is running the ad hoc network discovery menu option, then the arriving device can directly address a request to the information provider using the default address, to obtain the service records characterizing the ad hoc network.

The Broadcast phase 802 carries the frame control channel 806 which contains information about the structure of the ongoing frame 800, containing the exact position of the time slots for all following transmission bursts, their usage and content type. The messages in the frame control channel are resource grants. Resource grants allocate the TDMA time slots for transmissions from each device that has requested a slot in the subnet.

[2] Downlink phase 810: The downlink phase 810 shown in FIG. 8A carries user specific control information and user data 812 and 814, transmitted from access point/central controller 104(H2) to wireless devices 106(H2) and 108(H2). Additionally, the downlink phase may contain further broadcast information which does not fit in the fixed broadcast control channel field 802. The control information and user data 812 and 814 are transmitted as protocol data units (PDUs).

[3] Direct Link phase 818: The direct link phase 818 shown in FIG. 8A carries user data traffic 820 and 822 between wireless devices 106(H2) and 108(H2) without direct involvement of the access point/central controller 104(H2). The user data traffic 820 and 822 are transmitted as protocol data units (PDUs). However, for the control of traffic, the access point/central controller 104(H2) is indirectly involved by receiving Resource Requests 836 from wireless devices 106(H2) and 108(H2) for these connections and transmitting Resource Grants in the frame control channel 806.

[4] Uplink phase 826: The uplink phase 826 shown in FIG. 8A carries control and user data 828 and 830 from the wireless devices 106(H2) and 108(H2) to the access point/central controller 104(H2). The wireless devices 106(H2) and 108(H2) have to request capacity for one of the following MAC frames 800 in order to get resources granted by the access point/central controller 104(H2). The control and user data 828 and 830 are transmitted as protocol data units (PDUs).

[5] Random access phase 834: The Random access phase 834 shown in FIG. 8A carries a number of random access channels 836. Wireless devices to which no capacity has been allocated in the uplink phase use this phase for the transmission of control information. Non-associated wireless devices 100(H2) use random channels 836 for the first contact with an access point/central controller 104(H2). This phase is also used by wireless devices performing handover to have their connections switched over to a new access point/central controller.

The duration of the broadcast channel 804 is fixed. The duration of the frame channel 806, downlink phase 810, direct link phase 818, uplink phase 826, and the number of random channels 834 are dynamically adapted by the central controller 104(H2) depending on the current traffic situation. A central controller 104(H2) may have several downlink, direct link, and uplink phases and mix the phases, as long as the order is maintained for each individual wireless device.

The downlink 810, direct link 818, and uplink 826 phases consist of two types of protocol data units (PDUs): long PDUs and short PDUs. The long PDUs have a size of 54 bytes and contain control or user data. The short PDUs with a size of 9 bytes contain only control data and are always generated by the data link control. They may contain resource requests in the uplink, automatic repeat request messages like acknowledgments and discard messages or radio link control information.

The same size of 9 bytes is also used in the random channel 834. The random channel 834 can only carry radio link control messages and resource requests. The access method to the random channel 834 is a slotted Aloha protocol. The collision resolution is based on a binary backoff procedure which is controlled by the wireless devices. The access point/central controller can decide dynamically how many random channel slots it provides in the random access phase 834 per MAC frame 800.

A wireless device intending to communicate with an access point/central controller must be associated to this access point/central controller. The reasons are:

[1] The access point/central controller always has to create some resources for each wireless device associated, e.g. the radio link control connection and a MAC ID.

[2] The MAC protocol is centrally controlled by the access point/central controller, regardless of whether it operates in centralized or in direct mode.

The steps of the association control are:

[1] Association: The first step is the allocation of a MAC ID to a wireless device, followed by the negotiation of the link capabilities. These comprise the selected convergence layers and other features. Access point/central controller and wireless device decide in this step whether encryption and/or authentication are performed or not and which encryption and authentication mechanisms are used, respectively.

[2] Encryption key exchange: This step is performed after the link capability negotiation and is optional. It is based on the Diffie-Hellmann key exchange protocol. The Diffie-Hellmann private and public values are used by both access point/central controller and wireless device to generate and refresh the session key.

[3] Authentication: This step is performed after the encryption key exchange and is optional. The authentication affects both wireless device and access point/central controller, i.e. they perform a mutual authentication.

[4] Beacon Signaling in the access point/central controller: The beacon signaling provides basic information about essential features and properties of the access point/central controller which are broadcast in each MAC frame. The association control function provides some of the values that are broadcast.

[5] Encryption key refresh: This feature is optional. It can be performed periodically and is requested by the access point/central controller.

[6] Disassociation: This feature is performed by the wireless device if possible. This may not be possible if the wireless device suddenly drops power.

Each HIPERLAN Type 2 device consists of the physical layer, the data link control, and one or multiple convergence layers. The application layer in a HIPERLAN Type 2 Direct mode device makes use of the data link control services through an application specific convergence layer.

A subnet 102(H2) is created when the central controller 104(H2) starts to generate valid broadcast control channels in the broadcast phase 802 and allows other devices to associate with its subnet. All devices of a subnet are synchronized to the frequency chosen by the central controller 104(H2), and access the channel using the MAC frame structure 800 given in broadcast control channel 804 and frame control 806 channels by the central controller 104(H2). The selection of the central controller is dynamic, and seamless handover of the Central Controller responsibility from one central controller-capable wireless device to another is possible.

To obtain a unified control framework for both infrastructure and ad hoc modes of operation, the control plane is kept centralized for all general features in ad hoc mode. That means that only the central controller can instruct a wireless device to do something. However, distributed control is also made possible for some Direct mode extension features by introducing logical control channels, which can be used for direct exchange of control messages between wireless devices.

In the user plane, HIPERLAN Type 2 ad hoc mode makes extensive use of direct link user connections. This significantly improves the resource efficiency, since in a typical home environment most user traffic is of intra-cell nature. As in the infrastructure mode, the 8-bit MAC-ID is used to differentiate devices in a subnet, and the 6-bit-ID plus the source and destination MAC-IDs are used to differentiate connections between a pair of devices, or broadcast/multicast connections originating from any wireless device in ad hoc mode.

Resource Requests 836 for direct link, long transport channels and short transport channels are transmitted in the random channel 834 or in a dedicated control channel in the uplink phase 826. No resource request for direct link is sent in the link control channel of the direct link phase 818. A resource request for a direct link is always related to a simplex connection whose direction is determined by the source and destination MAC-IDs in resource requests.

Resource Grants for direct link, long transport channels and short transport channels are sent in frame control channel 806. A resource grant for a direct link is always related to a simplex connection whose direction is determined by the source and destination MAC-IDs in resource grant.

A dedicated control channel in the Direct link phase 818 is used for radio link control message exchange between any two HIPERLAN Type 2-devices in direct mode, or from a direct mode sender to a group of direct mode receivers. It is mapped to either a direct link, long transport channel or a direct link, short transport channel. This logical channel can be used, for example, for direct link power control and link quality calibration.

In the Direct Mode, the direction of logical channels is distributed as shown in FIG. 8. In FIG. 8, wireless device 106(H2) has a direct link connection 105 to wireless device 108(H2). Resource grants are transmitted by the central controller 104(H2) in the frame control channel 806. Resources granted for direct link connections are related to direct link phase 818 user data channel for user data and related to direct link phase 818 control channel for automatic repeat request control messages. PDUs in the direct link phase 818 user data channel and discard PDUs in the direct link phase 818 control channel are directly transmitted from wireless device 106 (H2) to wireless device 108(H2). Automatic repeat request feedback PDUs are directly transmitted from wireless device 108(H2) to wireless device 106(H2). The central controller 104(H2) does not listen to the direct link phase 818 user data channel and direct link phase 818 control channel if it is not a peer entity of the direct link connection. The central controller 104(H2) itself can act as a wireless device and thus it can be the source and/or destination of direct link connections.

Figure 8D:
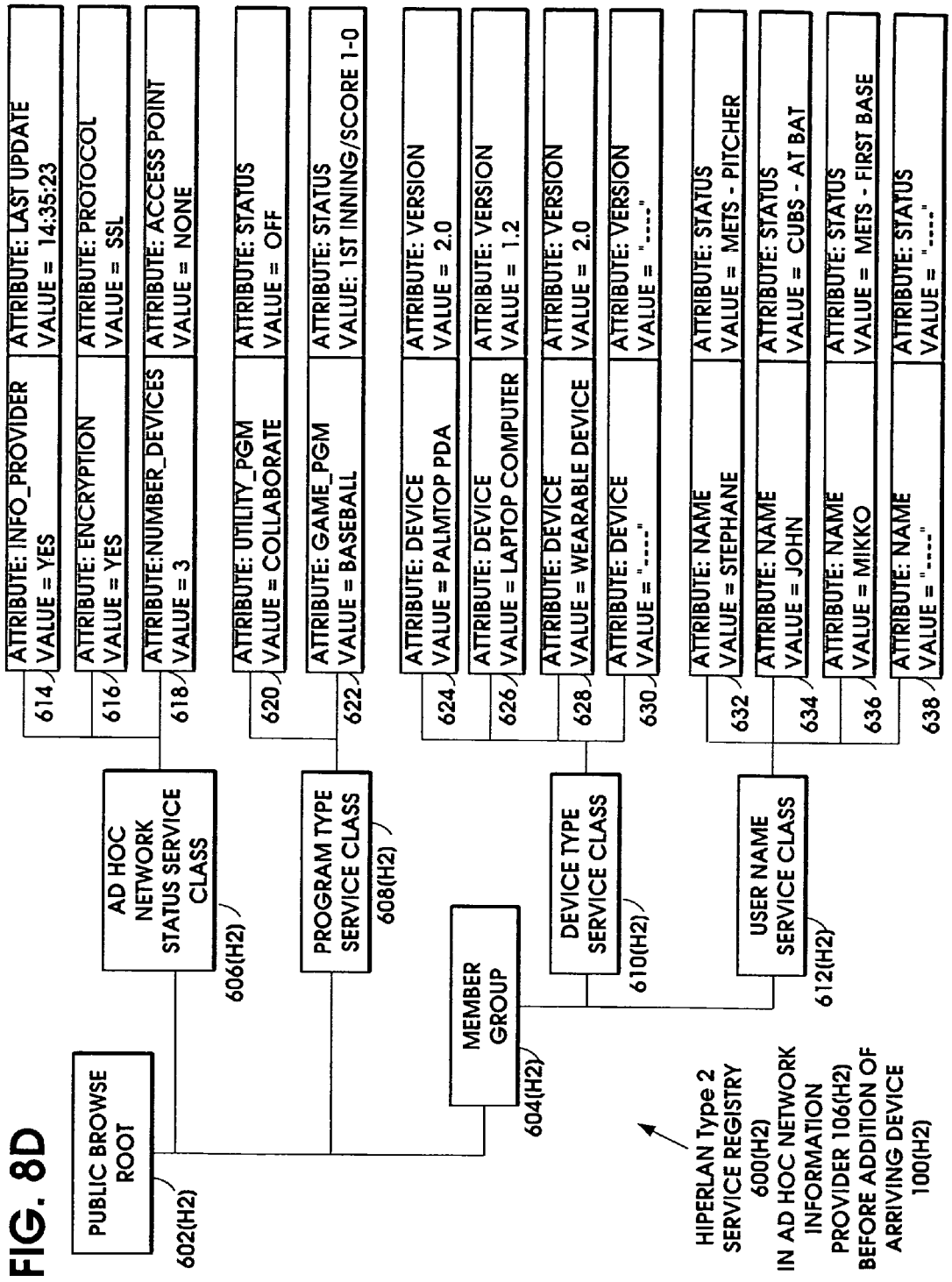
FIG. 8D shows the HIPERLAN Type 2 service registry 600(H2) in the ad hoc network information provider 106(H2) before addition of arriving device 100(H2).

In FIG. 1, there are two HIPERLAN Type 2 ad hoc networks 102(H2) and 112(H2) and the passenger's arriving wireless device 100(H2). The HIPERLAN Type 2 ad hoc networks have an independent configuration where the mobile stations 104(H2), 106(H2), and 108(H2) communicate directly with one another in an independent ad hoc network 102(H2), as shown in the network diagram of FIG. 8 and the MAC frame diagram of FIG. 8A. In accordance with the invention, the service search pattern 568 and an attribute ID list 569 are passed from the arriving device 100(H2) to the ad hoc network information provider device 106(H2), as shown in the MAC frame diagram of FIG. 8B. Similarly, the invention returns the service record handle list 578 and the attributes 579 from the ad hoc network information provider device 106(H2) to the arriving device 100(I), as shown in the MAC frame diagram of FIG. 8C. FIG. 8D shows the HIPERLAN Type 2 service registry 600(H2) in the ad hoc network information provider 106(H2), before addition of arriving device 100(H2).

FIG. 8B shows the HIPERLAN Type 2 MAC frame structure 800' including a service record request 838 for the subnet service records in subnet 102(H2). The service record request 838 is sent in the direct link phase 818 by the arriving device 100(H2) to the ad hoc network information provider 106(H2). Typically, the service record request 838 is larger than the 54-byte length of a single PDU, so several consecutive MAC frames 800', 800'A, 800'B, and 800'C are sent, each containing respective, consecutive parts 840', 840'A, 840'B, and 840'C.

FIG. 8C shows the HIPERLAN Type 2 MAC frame structure 800" including a service record response 848 containing the requested subnet service records in subnet 102(H2). The service record response 848 is sent in the direct link phase 818 by the ad hoc network information provider 106(H2) to the arriving device 100(H2). Typically, the service record response 848 is larger than the 54-byte length of a single PDU, so several consecutive MAC frames 800", 800"A, 800"B, and 800"C are sent, each containing respective, consecutive parts 850', 850'A, 850'B, and 850'C.

When the new HIPERLAN Type 2 device 100(H2) arrives within the communication range of any member of the ad hoc network, it begins searching for beacon signals broadcast from central controllers in ad hoc networks. The beacon signals from central controller 104(H2) includes the address of the ad hoc network information provider 106(H2). The arriving device 100(H2) then sends a resource request 836 to the central controller 104(H2) requesting allocation of time slots so that it can communicate with the ad hoc network information provider 106(H2) in the direct link phase 818. The arriving device 100H2) then sends a service record request 838 to device 106(H2) in the direct link phase 818 to obtain information characterizing the ad hoc network 102(H2). The ad hoc network information provider 106(H2) responds with service record response 848 which contains the information accessed from its service registry 600(H2) of FIG. 8D, characterizing the ad hoc network 102(H2). FIG. 8D shows the HIPERLAN Type 2 service registry 600(H2) in the ad hoc network information provider 106(H2) before addition of arriving device 100(H2). The invention then compiles a network discovery menu in the arriving device. This part of the process is shown in greater detail in the flow diagram of FIG. 3F. The network discovery menu lists the characteristics of the ad hoc networks within its range. When the user selects an entry from the menu, the arriving device automatically joins the selected ad hoc network.

Then HIPERLAN Type 2 device 100(H2) determines whether the user has specified any service classes or service attributes of interest. If the user has specified any service classes or service attributes, then device 100(H2) analyzes the specified service classes or service attributes and ranks the ad hoc networks by the specified service classes or service attributes. The ranked ad hoc networks are listed in the ranking table 720 of FIG. 2A.

Alternately, if the user has not specified any service classes or service attributes, then HIPERLAN Type 2 device 100(H2) determines the quality of the signal characteristics of the responding ad hoc networks. The quality of the signal characteristics can be measured by the received signal strength, the bit error rate, or other quality of service (QoS) metrics. Then device 100(H2) ranks the ad hoc networks by the quality of service (QoS) metrics. The ranked ad hoc networks are listed in the ranking table 720 of FIG. 2A.

The resulting invention provides an ad hoc network information provider that furnishes records characterizing the ad hoc network to inquiring devices. The invention provides an ad hoc network discovery menu to an arriving wireless device, which lists the currently running collaborative activities of all of the ad hoc networks within its range. The ad hoc network discovery menu can select those ad hoc networks that are of particular interest to the arriving user. The ad hoc network discovery menu can also select those ad hoc networks that have the highest received signal quality.

Four example ad hoc network standards have been described to embody the invention, the Bluetooth standard, the IEEE 802.11 Wireless LAN standard, the HIPERLAN Type 1 standard, and the HIPERLAN Type 2 standard. However, in addition to these four standards, the invention also applies to other wireless standards. The invention's principle of an ad hoc network information provider that furnishes records characterizing the ad hoc network to inquiring devices, is equally useful in many other wireless standards. The invention applies, for example, to the Infrared Data Association (IrDA) standard, the Digital Enhanced Cordless Telecommunications (DECT) standard, the Shared Wireless Access Protocol (SWAP) standard, the IEEE 802.15 Wireless Personal Area Network (WPAN) standard, the Japanese 3rd Generation (3G) wireless standard, and the Multimedia Mobile Access Communication (MMAC) Systems standard of the Japanese Association of Radio Industries and Businesses. The invention enables each of these wireless standards to provide an ad hoc network information provider that furnishes records characterizing the ad hoc network to inquiring devices.

Although a specific embodiment of the invention has been disclosed, it will be understood by those having skill in the art that changes can be made to the specific embodiment without departing from the spirit and the scope of the invention.

What is claimed is:

1. A method comprising:

maintaining a list of service attributes characterizing preferred services for accessing through wireless connection;

discovering at least two wireless networks, each of the at least two wireless networks having a different network identifier;

gathering information characterizing the discovered at least two wireless networks by obtaining service information associated with each of the at least two wireless networks describing available services of wireless devices in the respective networks;

forming a compiled network discovery service list including characteristic information from each of the at least two wireless networks derived from the respective service information obtained from the at least two wireless networks, wherein the compiled network discovery list ranks the at least two wireless networks based on at least partly by matching service information obtained from each of the at least two wireless networks with the maintained list of service attributes and signal characteristics of the respective networks; and joining to one of the at least two wireless networks based on the compiled network discovery list.

2. The method of claim 1, further comprising:
sending an update message to one or more nodes in the joined network for updating the service information describing available services within said joined network.

3. The method of claim 2, further comprising:
sending the update message to one or more nodes in the joined network to enable updating a service registry in said joined network.

4. The method of claim 3, wherein the service registry is a Service Discovery Protocol (SDP) registry.

5. The method of claim 1, wherein said gathering further comprises:
selectively searching for networks containing devices having a specified class of device characteristic.

6. The method of claim 1, wherein said gathering further comprises:
selectively searching for networks containing devices having a specified service class.

7. The method of claim 1, wherein said gathering further comprises:
selectively searching for networks containing devices having a specified service attribute.

8. The method of claim 1, which further comprises:
forming and displaying a network discovery menu including said characteristic information of the at least two wireless networks.

9. The method of claim 8, which further comprises:
determining received signal quality of devices in said at least two wireless networks; and
ranking said characteristics displayed in said network discovery menu according to said received signal quality.

10. The method of claim 8, which further comprises:
associating with each of said characteristics displayed in said network discovery menu, corresponding information about accessing the at least two wireless networks.

11. A system comprising:
a wireless device including a memory configured for maintaining a list of service attributes characterizing preferred services for accessing through wireless connection;
at least two wireless networks, each of the at least two wireless networks having a different network identifier;
said wireless device configured for discovering the at least two wireless networks;
said wireless device configured for gathering information characterizing the discovered at least two wireless networks by obtaining service information associated with each of the at least two wireless networks describing available services of wireless devices in the respective networks;
said wireless device configured for forming a compiled network discovery service list including characteristic information from each of the at least two wireless networks derived from the respective service information obtained from the at least two wireless networks, wherein the compiled network discovery list ranks the at least two wireless networks based on at least partly by matching service information obtained from each of the at least two wireless networks with the maintained list of service attributes and signal characteristics of the respective networks; and
said wireless device configured for joining the wireless device to one of the at least two wireless networks based on the compiled network discovery list.

12. The system of claim 11, further comprising:
said wireless device configured for sending an update message to one or more nodes in the joined network by the wireless device for updating the service information describing available services within said joined network.

13. The system of claim 12, further comprising:
said update message enabling updating a service registry in said one or more nodes.

14. The system of claim 13, wherein the service registry is a Service Discovery Protocol (SDP) registry.

15. The system of claim 11, wherein said gathering further comprises:
said wireless device configured for selectively searching for other devices having a specified class of device characteristic.

16. The system of claim 11, wherein said gathering further comprises:
said wireless device configured for selectively searching for networks containing devices having a specified service class.

17. The system of claim 11, wherein said gathering further comprises:
said wireless device configured for selectively searching for networks containing devices having a specified service attribute.

18. The system of claim 11, which further comprises:
said wireless device configured for forming and displaying a network discovery menu including said characteristic information of the at least two wireless networks.

19. The system of claim 18, which further comprises:
said wireless device configured for determining received signal quality of devices in said at least two wireless networks; and
said wireless device configured for ranking said characteristics displayed in said network discovery menu according to said received signal quality.

20. The system of claim 18, which further comprises:
said wireless device configured for associating with each of said characteristics displayed in said network discovery menu, corresponding information about accessing the at least two wireless networks.

21. A computer readable medium having a stored computer program, comprising:
program code in said computer readable medium for maintaining a list of service attributes characterizing preferred services for accessing through wireless connection;
program code in said computer readable medium for discovering at least two wireless networks, each of the at least two wireless networks having a different network identifier;
program code in said computer readable medium for gathering information characterizing the discovered at least two wireless networks by obtaining service information associated with each of the at least two wireless networks describing available services of wireless devices in the respective networks;
program code in said computer readable medium for forming a compiled network discovery service list including characteristic information from each of the at least two wireless networks derived from the respective service information obtained from the at least two wireless networks, wherein the compiled network discovery list ranks the at least two wireless networks based on at least partly by matching service information obtained from each of the at least two wireless networks with the maintained list of service attributes and signal characteristics of the respective networks; and program code in said computer readable medium for joining to one of the at least two wireless networks based on the compiled network discovery list.

22. The computer readable medium of claim 21, further comprising:

program code in said computer readable medium for sending an update message to one or more nodes in the joined network for updating the service information describing available services within said joined network.

23. The computer readable medium of claim 22, further comprising:

program code in said computer readable medium for sending the update message to one or more nodes in the joined network to enable updating a service registry in said joined network.

24. The computer readable medium of claim 23, wherein the service registry is a Service Discovery Protocol (SDP) registry.

25. The computer readable medium of claim 21, wherein said gathering further comprises:

program code in said computer readable medium for selectively searching for networks containing devices having a specified class of device characteristic.

26. The computer readable medium of claim 21, wherein said gathering further comprises:

program code in said computer readable medium for selectively searching for networks containing devices having a specified service class.

27. The computer readable medium of claim 21, wherein said gathering further comprises:

program code in said computer readable medium for selectively searching for networks containing devices having a specified service attribute.

28. The computer readable medium of claim 21, which further comprises:

program code in said computer readable medium for forming and displaying a network discovery menu including said characteristic information of the at least two wireless networks.

29. The computer readable medium of claim 28, which further comprises:

program code in said computer readable medium for determining received signal quality of devices in said at least two wireless networks; and program code in said computer readable medium for ranking said characteristics displayed in said network discovery menu according to said received signal quality.

30. The computer readable medium of claim 28, which further comprises:

program code in said computer readable medium for associating with each of said characteristics displayed in said network discovery menu, corresponding information about accessing the at least two wireless networks.

31. A wireless device, comprising:

a wireless device including a processor, a memory for storing program code executable by the processor, a radio, and a user interface;

program code in said memeory configured for maintaining a list of service attributes characterizing preferred services for accessing through wireless connection;

program code in said memory configured for discovering at least two wireless networks, each of the at least two wireless networks having a different network identifier;

program code in said memory configured for gathering information characterizing the discovered at least two wireless networks by obtaining service information associated with each of the at least two wireless networks describing available services of wireless devices in the respective networks;

program code in said memory configured for forming a compiled network discovery service list including characteristic information fromn each of the at least two wireless networks derived from the respective service information obtained from the at least two wireless networks, wherein the compiled network discovery list ranks the at least two wireless networks based on at least partly by matching service information obtained from each of the at least two wireless networks with the maintained list of service attributes and signal characteristics of the respective networks; and program code in said memory configured for joining the wirless device to one of the at least two wireless networks based on the compiled network discovery list.

32. The wireless device of claim 31, further comprising:

program code in said memory configured for sending an update message to one or more nodes in the joined network by the wireless device for updating the service information describing available services within said joined network.

33. The wireless device of claim 32, further comprising:

said update message enabling updating a service registry in said one or more nodes.

34. The wireless device of claim 33, wherein the service registry is a Service Discovery Protocol (SDP) registry.

35. The wireless device of claim 31, wherein said gathering further comprises:

selectively searching for networks containing devices having a specified class of device characteristic.

36. The wireless device of claim 31, wherein said gathering further comprises:

selectively searching for networks containing devices having a specified service class.

37. The wireless device of 31, wherein said gathering further comprises:

selectively searching for networks containing devices having a specified service attribute.

38. The wireless device of claim 31, which further comprises:

program code in said memory configured for forming and displaying a network discovery menu including said characteristic information of the at least two wireless networks.

39. The wireless device of claim 38, which further comprises:

program code in said memory configured for determining received signal quality of devices in said at least two wireless networks; and program code in said memory configured for ranking said characteristics displayed in said network discovery menu according to said received signal quality.

40. The wireless device of claim 38, which further comprises:

program code in said memory configured for associating with each of said characteristics displayed in said network discovery menu, corresponding information about accessing the at least two wireless networks.

* * * * *

UNITED STATES PATENT AND TRADEMARK OFFICE
CERTIFICATE OF CORRECTION

PATENT NO. : 7,590,086 B2  Page 1 of 1
APPLICATION NO. : 10/979253
DATED : September 15, 2009
INVENTOR(S) : Olkkonen et al.

It is certified that error appears in the above-identified patent and that said Letters Patent is hereby corrected as shown below:

Column 49

In claim 31, line 60, "in said memeory configured to" should read, --in said memory configured to--.

Column 50

In claim 31, line 9, "information fromn each of the" should read, --information from each of the--;

line 19, "wirless device" should read, --wireless device--.

Signed and Sealed this

Twenty-second Day of December, 2009

David J. Kappos
*Director of the United States Patent and Trademark Office*